(12) United States Patent
Kuroda et al.

(10) Patent No.: US 11,925,968 B2
(45) Date of Patent: Mar. 12, 2024

(54) METHOD FOR MANUFACTURING PRESS-FORMED ARTICLE, PRESS-FORMED ARTICLE, AND PRESS-FORMING APPARATUS

(71) Applicant: NIPPON STEEL CORPORATION, Tokyo (JP)

(72) Inventors: Ryo Kuroda, Tokyo (JP); Yasuharu Tanaka, Tokyo (JP); Takashi Miyagi, Tokyo (JP); Misao Ogawa, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 11 days.

(21) Appl. No.: 17/642,842

(22) PCT Filed: Sep. 23, 2020

(86) PCT No.: PCT/JP2020/035792
§ 371 (c)(1),
(2) Date: Mar. 14, 2022

(87) PCT Pub. No.: WO2021/060274
PCT Pub. Date: Apr. 1, 2021

(65) Prior Publication Data
US 2022/0371070 A1   Nov. 24, 2022

(30) Foreign Application Priority Data
Sep. 24, 2019  (JP) ................................. 2019-172982

(51) Int. Cl.
*B21D 22/26* (2006.01)
*B21D 22/02* (2006.01)
(Continued)

(52) U.S. Cl.
CPC ............. *B21D 22/26* (2013.01); *B21D 37/08* (2013.01)

(58) Field of Classification Search
CPC ........ B21D 22/06; B21D 22/21; B21D 22/26; B21D 22/02; B21D 22/20; B21D 13/02; B21D 24/16
(Continued)

(56) References Cited

U.S. PATENT DOCUMENTS

| 2016/0199897 A1* | 7/2016 | Otsuka ................... B21D 22/02 72/352 |
| 2016/0279692 A1* | 9/2016 | Ito .......................... B21D 22/26 |
| 2018/0133778 A1* | 5/2018 | Tanaka ................... B21D 24/16 |

FOREIGN PATENT DOCUMENTS

| EP | 3 305 429 A1 | 4/2018 |
| JP | 63-168231 A | 7/1988 |

(Continued)

*Primary Examiner* — Matthew Katcoff
*Assistant Examiner* — Mohammed S. Alawadi
(74) *Attorney, Agent, or Firm* — Birch, Stewart, Kolasch & Birch, LLP

(57) ABSTRACT

A method for manufacturing a press-formed article (100) includes a first step for forming a base sheet portion, a first rising portion, and a first strip portion from a sheet-shaped workpiece having a first edge portion and a second edge portion; and a second step for forming a second rising portion by causing a strip-shaped first zone including the second edge portion to be disposed between a first upper die and a first lower die from both sides, causing a second zone adjacent to the first zone to be disposed between a second upper die and a second lower die from both sides, and moving the first upper die and the first lower die relative to the second upper die and the second lower die, wherein, in the second step, a part of the second rising portion which is connected to a vertical ridge line (108) is shear-deformed.

13 Claims, 43 Drawing Sheets

(51) Int. Cl.
*B21D 22/20* (2006.01)
*B21D 24/00* (2006.01)
*B21D 24/16* (2006.01)
*B21D 37/08* (2006.01)
*B21D 51/52* (2006.01)
*B60K 1/04* (2019.01)
*H01M 50/119* (2021.01)

(58) Field of Classification Search
USPC .................................................. 72/381, 383
See application file for complete search history.

(56) References Cited

FOREIGN PATENT DOCUMENTS

| | | |
|---|---|---|
| JP | 2002-208384 A | 7/2002 |
| JP | 2006-289453 A | 10/2006 |
| JP | 2013-154389 A | 8/2013 |
| JP | 2017-196952 A | 11/2017 |
| WO | WO2016/194963 A1 | 12/2016 |

* cited by examiner (a)

(b)

METHOD FOR MANUFACTURING PRESS-FORMED ARTICLE, PRESS-FORMED ARTICLE, AND PRESS-FORMING APPARATUS

TECHNICAL FIELD

The present invention relates to a method for manufacturing a press-formed article, a press-formed article, and a press-forming apparatus.

Priority is claimed on Japanese Patent Application No. 2019-172982, filed Sep. 24, 2019, the content of which is incorporated herein by reference.

BACKGROUND ART

Electric vehicles need to include large capacity batteries installed therein. Batteries are accommodated in, for example, box-shaped battery cases with vertical walls rising from the four sides of a rectangular bottom sheet below a seat (for example, refer to Patent Document 1). In such battery cases, strength and impact resistance are required to prevent damage to the batteries when the vehicles collide. On the other hand, if member thicknesses for strength and impact resistance are increased too much, the weight becomes large, which leads to a decrease in fuel efficiency. For this reason, high-strength materials are used as steel materials used for battery cases. Furthermore, in such battery cases, it is required to install as many batteries as possible in a minimum space due to space restrictions inside vehicles. That is to say, it is required to make the proportion by volume of batteries which can be accommodated in battery cases as high as possible with respect to the volume of the battery case. For this reason, in box-shaped members constituting battery cases, curved shapes of cross sections of ridge line portions formed by bottom sheets and vertical walls and ridge line portions formed by vertical walls are required to have radii of curvature which are as small as possible.

As one of methods for manufacturing a box-shaped battery case as described above, there is a method for press-forming a steel sheet. To be specific, a part which will be a vertical wall is formed by pressing a steel sheet using a die corresponding to a shape of a battery case to perform drawing. Such press-forming has an advantage in that it is possible to manufacture a battery case with a desired shape with a minimum number of parts and processes as compared with a case of welding members or assembling a plurality of members.

CITATION LIST

Patent Document

[Patent Document 1] Japanese Unexamined Patent Application, First Publication No. 2017-196952

SUMMARY OF THE INVENTION

Problems to be Solved by the Invention

However, when a corner at which three ridge lines which include two ridge lines connecting a bottom sheet and each of two vertical walls of a box-shaped battery case or the like and a ridge line connecting the vertical walls intersect is formed through press-forming, there are the following problems. That is to say, although parts which will be vertical walls may be formed from two edges connected to each other through draw forming in a workpiece formed in a rectangular shape such as a steel sheet, at that time, in the parts which will be corners, a material required for forming two vertical walls cannot flow into the vertical wall portion, resulting in a decrease in member thickness. Particular, as a radius of curvature of a curved shape of a cross section of each of the ridge line portions decreases, there are constraints on materials due to the ridge line portion and a sufficient amount of material cannot flow into the vertical wall portion, in which a decrease in member thickness becomes even more significant. Furthermore, if a high-strength material is utilized to achieve strength, impact resistance, and weight reduction together, forming becomes even more difficult. For this reason, a method for obtaining a shape formed so that the corner at which the three ridge lines which include the two ridge lines connecting the bottom sheet and each of the two vertical walls of a box-shaped battery case or the like and the ridge line connecting the vertical walls intersect is provided through press-forming while minimizing a decrease in member thickness is desired.

Therefore, the present invention was made in view of the above circumstances, and an object of the present invention is to provide a method for manufacturing a press-formed article, a press-formed article, and a press-forming apparatus in which a corner at which three ridge lines which include two ridge lines connecting a bottom sheet and each of two vertical walls and a ridge line connecting the vertical walls intersect is provided can be obtained through press-forming while minimizing a decrease in member thickness.

Means for Solving the Problem

The present invention employs the following means to solve the above-described problems.

That is to say, a method for manufacturing a press-formed article according to an aspect of the present invention includes: a first step of forming, from a sheet-shaped workpiece having one or more of first edge portion and one or more of second edge portion extending in a direction intersecting the first edge portion and is connected to the first edge portion, a base sheet portion, one or more of first rising portion rising from the base sheet portion on a side of the first edge portion via a first ridge line and extending to the second edge portion, and a first strip portion extending on a side opposite to the base sheet portion via a second ridge line extending to the second edge portion along an upper edge portion of the first rising portion; and a second step of forming one or more of second rising portion which rises between a first lower die and a second upper die as a whole on the same side as the first rising portion and connected to the first rising portion via a vertical ridge line by causing a strip-shaped first zone including the base sheet portion, the first rising portion, and the second edge portion of the first strip portion to be disposed between a first upper die and the first lower die from both sides along the second edge portion, causing a second zone adjacent to the first zone and including the base sheet portion, the first rising portion, and the first strip portion to be disposed between the second upper die and a second lower die from both sides, and moving the first upper die and the first lower die relative to the second upper die and the second lower die toward a side at which the first rising portion rises with respect to the base sheet portion, in which, in the second step, a portion of the second rising portion connected to the vertical ridge line is shear-deformed.

According to the method, in the first step, on the first edge portion side of a sheet-shaped workpiece, the first rising portion which is one vertical wall portion and the first strip portion are formed from the workpiece. Subsequently, in the second step, on the second edge portion side of the workpiece, the second rising portion which is the other vertical wall portion is formed by causing the first zone to be disposed between the first upper die and the first lower die and the second zone disposed between the second upper die and the second lower die and moving the first upper die and the first lower die relative to the second upper die and the second lower die. Here, in the zone which will be the base sheet portion in a state in which the zone has been subjected to the first step, it is possible to minimize a decrease in member thickness of the second rising portion by allowing a material of a part of a portion disposed between the first upper die and the first lower die to flow into the second rising portion as the second rising portion is formed. Furthermore, similarly, in the zone which will be the first strip portion in a state in which the zone has been subjected to the first step, it is possible to minimize a decrease in member thickness of the second rising portion by allowing a material of a part of a portion disposed between the first upper die and the first lower die to flow into the second rising portion as the second rising portion is formed. On the other hand, it is possible to plastically deform the portion in a desired shape to follow the formation of the second rising portion while minimizing a change in member thickness by causing the portion to shear-deform in the second step between the zone which has been the base sheet portion and the zone which has been the first strip portion of a portion which will be the second rising portion in a state in which the zone has been subjected to the first step, that is, in a portion of the second rising portion connected to the vertical ridge line to which the first rising portion and the second rising portion are connected.

Also, the method for manufacturing a press-formed article described above may include: a third step of increasing a rising height of the first rising portion by causing the first strip portion side of the workpiece which has been subjected to the second step to be disposed between a third upper die and a third lower die using the first ridge line as a boundary, causing the base sheet portion side to be disposed between a fourth upper die and a fourth lower die, and moving the third upper die and the third lower die relative to the fourth upper die and the fourth lower die, in which, in the third step, shear deformation may be caused in a zone of the second rising portion adjacent to the first strip portion and adjacent to a zone in which the shear deformation has been caused in the second step in a direction along the second edge portions.

According to the method, after the second step is performed, a height of the first rising portion is increased by causing the first strip portion side disposed between the third upper die and the third lower die, causing the base sheet portion side disposed between the fourth upper die and the fourth lower die, and moving the third upper die and the third lower die relative to the fourth upper die and the fourth lower die. For this reason, it is possible to minimize an amount of shear deformation in one processing in the second step by minimizing the height of the first rising portion in the first step and it is possible to form the first rising portion to have a prescribed height. At this time, when a material required for raising the first rising portion flows in from the first strip portion, a decrease in member thickness of the first rising portion is minimized. Here, when a zone of a portion of the second rising portion adjacent to the first strip portion adjacent to the zone which is shear-deformed in the second step is shear-deformed in the direction along the second edge portion, it is possible to plastically deform the portion in a desired shape to follow the formation of the first rising portion while minimizing a change in member thickness.

Also, in the method for manufacturing a press-formed article described above, after the third step is performed, the second step may be further performed and the second step and the third step may be alternately performed at least once each.

According to the method, when the second step and the third step are alternately performed at least once each, it is possible to divide the formation of the first rising portion and the second rising portion into a plurality of formations, and thus it is possible to minimize an amount of shear deformation in one processing in each process.

Furthermore, in the method for manufacturing a press-formed article described above, the workpiece may include two of the first edge portion so that the two of the first edge portion face each other and two of the second edge portion so that the two of the second edge portion face each other, and a box body whose one side is open so that two of the first rising portion and two of the second rising portion surround the base sheet portion may be formed by subjecting each of the two of the first edge portion to the first step, subjecting each of the two of second edge portions to the second step, and subjecting each of the two of first edge portions to the third step.

According to the method, for example, such as a battery case, it is possible to form a box-like body whose one side is open.

In addition, the method for manufacturing a press-formed article described above may include: a fourth step of cutting out the first rising portion along the first edge portion at a height position between a second strip portion disposed between the first upper die and the first lower die and the first strip portion after the step of the second step and the third step which is performed last; and a fifth step of bending a portion of the first rising portion rising above the first strip portion so that a surface continuous with the first strip portion is obtained after the fourth step is performed.

According to the method, it is possible form flange-shaped strip portions connected to the upper edges of the first rising portion and the second rising portion to form a continuous surface.

In the method for manufacturing a press-formed article, in the second step, each of the first upper die and the first lower die may be composed of one or more of end die having at least the first strip portion and the first rising portion of the workpiece disposed therebetween and a center die disposed at an interval with respect to the end die and having the base sheet portion side of the workpiece disposed therein with respect to the first rising portion, and the end dies of the first upper die and the first lower die may be moved to become closer to the center die as the first upper die and the first lower die are moved relative to the second upper die and the second lower die.

According to the method, when the end die is moved relative to the center die so that the gap between the end die and the center die is narrowed, it is possible to effectively shear-deform the portion of the second rising portion located between the center die and the end die when viewed in the direction along the first edge portion and connected to the vertical ridge line.

In the method for manufacturing a press-formed article, a gap between the end die and the center die may be formed to have a portion along the second edge portion in the middle in a direction along the first edge portion.

According to the method, in the second step, it is possible to effectively shear-deform the portion of the second rising portion connected to the vertical ridge line in accordance with the size of the gap and it is possible to prevent the surface pressure of the first upper die and the first lower die from decreasing in the zone in which the gap is formed.

In the method for manufacturing a press-formed article, an inner portion of the vertical ridge line may be formed in a concave curved shape having a radius of curvature of 20 mm or less when viewed in a top view.

According to the method, when the concave curved shape of the inner portion of the vertical ridge line is set to have the radius of curvature of 20 mm or less, it is possible to increase a volume of a space surrounded by the base sheet portion, the first rising portion, and the second rising portion.

In the method for manufacturing a press-formed article, in the second step, a surface pressure causing the workpiece to be disposed between the first upper die and the first lower die and surface pressure for causing the workpiece to be disposed between the second upper die and the second lower die may be obtained on the basis of Expression (1):

$$P = Y/590 \times t/1.4 \times P0 \qquad (1)$$

where, P: surface pressure (MPa) for causing workpiece to be disposed therebetween Y: tensile strength (MPa) of workpiece t: thickness (mm) of workpiece P0: reference surface pressure=0.1 MPa.

According to the method, it is possible to perform the second step by applying appropriate surface pressure in accordance with the strength and the thickness of the workpiece.

In the method for manufacturing a press-formed article, a tensile strength of a steel material forming the workpiece may be 440 MPa or more.

According to the method, it is possible to provide a high-strength press-formed product while minimizing a decrease in member thickness.

In the method for manufacturing a press-formed article, the portion in which shear deformation is caused may be formed to have a thickness of 85% or more of a thickness of the workpiece which has not been subjected to the first step.

According to the method, it is possible to provide a press-formed article having high strength and a smaller roundness at a corner in which three ridges intersect.

In the method for manufacturing a press-formed article, only the second rising portion may be shear-deformed.

According to the method, it is possible to provide a high-strength press-formed product while further minimizing a decrease in member thickness.

Also, a press-formed article according to an aspect of the present invention includes: a sheet-shaped bottom sheet portion; a first wall portion which rises from a first side edge of the bottom sheet portion via a first ridge line; and a second wall portion which rises from a second side edge extending in a direction intersecting the first side edge of the bottom sheet portion and is connected to the first side edge on the same side as the first wall portion as a whole via a second ridge line, and connected to the first wall portion via a vertical ridge line, in which a thickness of the first wall portion and the second wall portion is 85% or more of a thickness of a center of the bottom sheet portion, and a radius of curvature of an inner portion of the first ridge line is different from a radius of curvature of an inner portion of the second ridge line.

According to the constitution, the thickness of the first wall portion and the second wall portion is 85% or more of the thickness of the center of the bottom sheet portion, a decrease in member thickness is minimized, and it is possible to secure a constant and prescribed strength in each of portions including the portion in the vicinity of the corner in which the first wall portion and the first wall portion are connected.

The press-formed article described above may include: a first flange extending from an upper edge of each of the first wall portion toward a side opposite to the bottom sheet portion with respect to the first wall portion; a second flange extending from an upper edge of each of the second wall portion to a side opposite to the bottom sheet portion with respect to the second wall portion and integrally connected to the first flange, in which a thickness of the first flange and the second flange may be 85% or more of a thickness of a center of the bottom sheet portion.

According to the constitution, the thickness of the first flange and the second flange is 85% of the thickness of the center of the bottom sheet portion and it is possible to minimize a decrease in member thickness and secure a constant and prescribed strength.

In the press-formed article described above, a radius of curvature of an inner portion of a third ridge line connecting the first wall portion and the first flange may be different from a radius of curvature of an inner portion of a fourth ridge line connecting the second wall portion and the second flange.

According to the constitution, in each portion including the portion in the vicinity of the corner to which the first wall portion and the first wall portion are connected as well, it is possible to plastically deform the portion without the breakage even if a material having low elongation is used while a constant and prescribed strength is secured. Particularly, it is possible to further increase the height of the wall portion.

In the press-formed article described above, an inner portion of the vertical ridge line may be formed in a curved shape having a radius of curvature of 20 mm or less when viewed in a top view.

According to the constitution, when the concave curved shape of the inner portion of the vertical ridge line is set to have the radius of curvature of 20 mm or less, it is possible to increase a volume of a space surrounded by the base sheet portion, the first rising portion, and the second rising portion.

In the press-formed article described above, a tensile strength of a steel material forming the bottom sheet portion, the first wall portion, and the second wall portion may be 440 MPa or more.

According to the constitution, it is possible to provide a high-strength press-formed article.

Furthermore, a press-forming apparatus according to an aspect of the present invention includes: a first lower die including a first bottom surface, a first wall surface rising from the first bottom surface, and a first flange surface extending from an upper edge of the first wall surface toward a side opposite to the first bottom surface; a first upper die formed in a shape corresponding to the first lower die and having a workpiece disposed between the first upper die and the first lower die; a second lower die including a second bottom surface, a second wall surface rising from the second bottom surface, and a second flange surface extending from an upper edge of the second wall surface toward a side opposite to the second bottom surface and disposed adjacent to the first lower die; a second upper die formed in a shape corresponding to the second lower die and having a workpiece disposed between the second upper die and the second lower die; and a drive portion configured to move the second upper die and the second lower die relative to the first upper die and the first lower die from the first upper die side toward the first lower die side in a state in which an interval between the first upper die and the second upper die and an interval between the first lower die and the second lower die are maintained.

According to the constitution, when the workpiece on which the base sheet portion, the first rising portion, and the first strip portion are formed is caused to be disposed between the first lower die and the first upper die, is caused to be disposed between the second upper die and the second lower die, and the second upper die and the second lower die are moved relative to the first upper die and the first lower die using the drive portion, it is possible to perform the second step described above.

In the press-forming apparatus described above, the first lower die may include a lower end die including at least the first wall surface and the first flange surface and a lower center die having an interval with respect to the lower end die and holding a portion of the workpiece opposite to the second flange surface with respect to the second wall surface, the first upper die may include an upper end die corresponding to the lower end die of the first lower die and an upper center die corresponding to the lower center die of the first lower die, and the drive portion may move the upper end die and the upper end die to become closer to the lower center die and the upper center die with respect to the first lower die and the first upper die, respectively, as the second upper die and the second lower die are moved relative to the first upper die and the first lower die.

According to the constitution, when the lower end die and the upper end die are moved closer to the lower center die and the upper center die with respect to the first lower die and the first upper die using the drive portion, it is possible to plastically deform the portion of the second rising portion between the zone which has been the base sheet portion and the zone which has been the first strip portion, that is, which is connected to the vertical ridge line to which the first rising portion and the second rising portion are connected to have a desired shape by shear-deforming the portion to follow the formation of the second rising portion while minimizing a change in member thickness.

The press-forming apparatus described above may further include: a third lower die including a third bottom surface, a third wall surface rising from the third bottom surface, and a third flange surface extending from an upper edge of the third wall surface toward a side opposite to the third bottom surface; a third upper die formed in a shape corresponding to the third lower die and having a workpiece between the third upper die and the third lower die; a fourth lower die including a fourth bottom surface, a fourth wall surface rising from the fourth bottom surface, and a fourth flange surface extending from an upper edge of the fourth wall surface toward a side opposite to the fourth bottom surface and disposed adjacent to the third lower die; and a fourth upper die formed in a shape corresponding to the fourth lower die and having a workpiece between the fourth upper die and the fourth lower die, wherein a set of the first lower die, the first upper die, the second lower die, and the second upper die may be capable of being replaced with a set of the third lower die, the third upper die, the fourth lower die, and the fourth upper die, and the drive portion may move the fourth upper die and the fourth lower die relative to the third upper die and the third lower die.

According to the constitution, when the set of the first lower die, the first upper die, the second lower die, and the second upper die is replaced with the set of the third lower die, the third upper die, the fourth lower die, and the fourth upper die and the fourth upper die and the fourth lower die are moved relative to the third upper die and the lower die using the drive portion, it is possible to perform the third step described above.

Effects of the Invention

According to the present invention, a corner at which three ridge lines which include two ridge lines connecting a bottom sheet and each of two vertical walls and a ridge line connecting the vertical walls intersect is provided can be obtained through press-forming while minimizing a decrease in member thickness.

EMBODIMENT(S) FOR IMPLEMENTING THE INVENTION

First Embodiment

Figure 1:
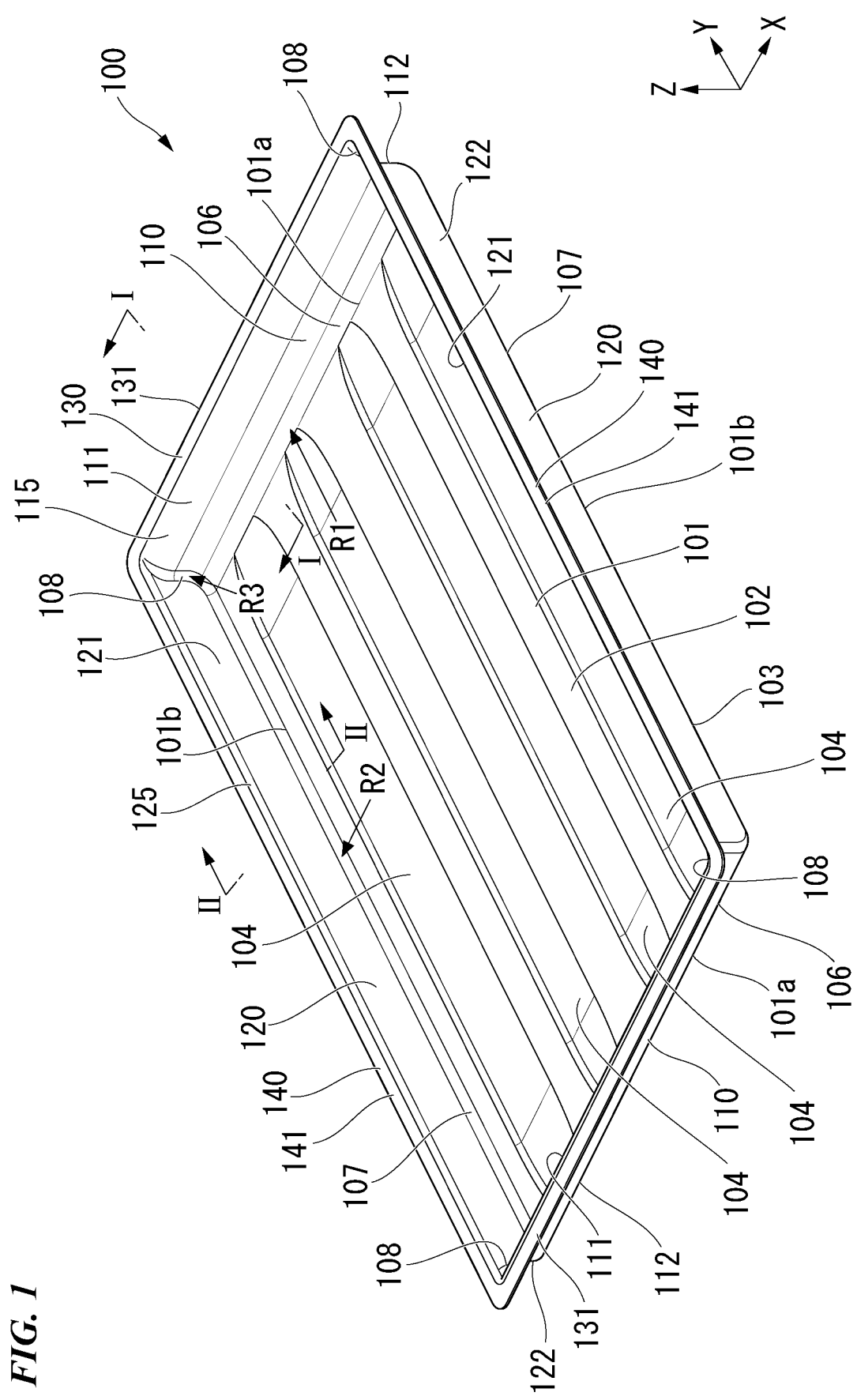
FIG. 1 is a perspective view when viewed from above showing an example of a press-formed article manufactured by a method for manufacturing a press-formed article according to a first embodiment.

A first embodiment according to the present invention will be described below with reference to FIGS. 1 to 27. FIG. 1 shows an example of a press-formed article 100 manufactured by a method for manufacturing the press-formed article 100 according to the embodiment. As shown in FIG. 1, the press-formed article 100 in the embodiment is, for example, a battery accommodating case disposed below a seat in an electric vehicle and configured to accommodate a battery. As shown in FIGS. 1 to 4, the press-formed article 100 includes a bottom sheet portion 101, first wall portions 110 and second wall portions 120 disposed along side edges of the bottom sheet portion 101, and a first flange 130 and a second flange 140 disposed along upper edges of the first wall portions 110 and the second wall portions 120. The bottom sheet portion 101 is formed in a sheet shape in which the bottom sheet portion 101 has an upper surface 102 and a lower surface 103. In the embodiment, the bottom sheet portion 101 is formed in a rectangular shape in which the bottom sheet portion 101 has a pair of first side edges 101a and a pair of second side edges 101b orthogonal to the first side edges 101a. Furthermore, grooves 104 extending along the second side edges 101b are formed in the upper surface 102 of the bottom sheet portion 101. A plurality of grooves 104 are respectively disposed at intervals along the first side edges 101a. In addition, ridges 105 extending along the second side edges 101b are formed on the lower surface 103 of the bottom sheet portion 101 to correspond to the grooves 104. In the following description, a direction in which the first side edges 101a extends is referred to as a "first direction X," a direction in which the second side edges 101b extends and which is orthogonal to the first direction X is referred to as a "second direction Y," and a direction which is orthogonal to the first direction X and the second direction Y, that is, which is an upward/downward direction orthogonal to the upper surface 102 and the lower surface 103 of the bottom sheet portion 101, is referred to as a "third direction Z."

Figure 2:
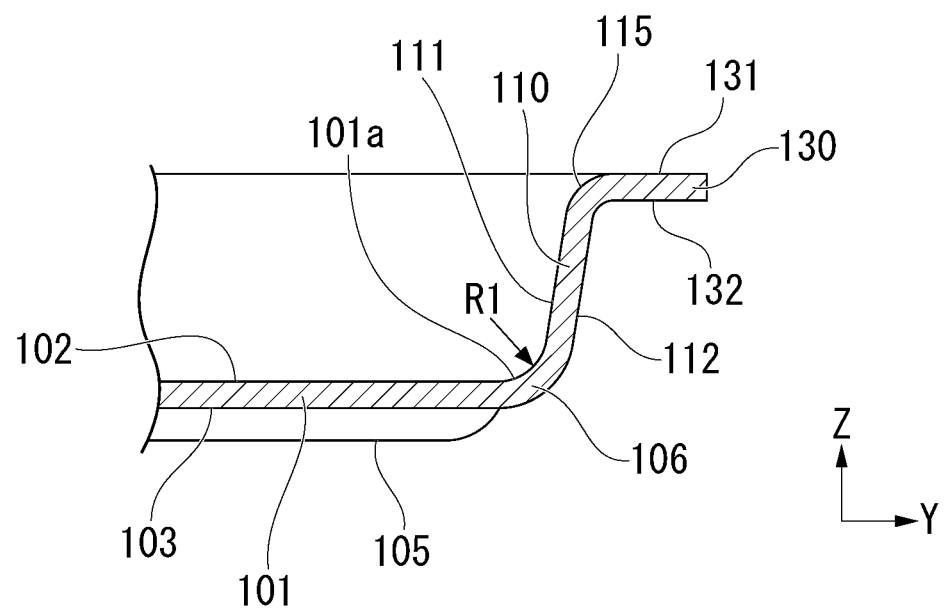
FIG. 2 is a cross-sectional view taken along cross-sectional line I-I shown in FIG. 1 when viewed in a first direction.
Figure 3:
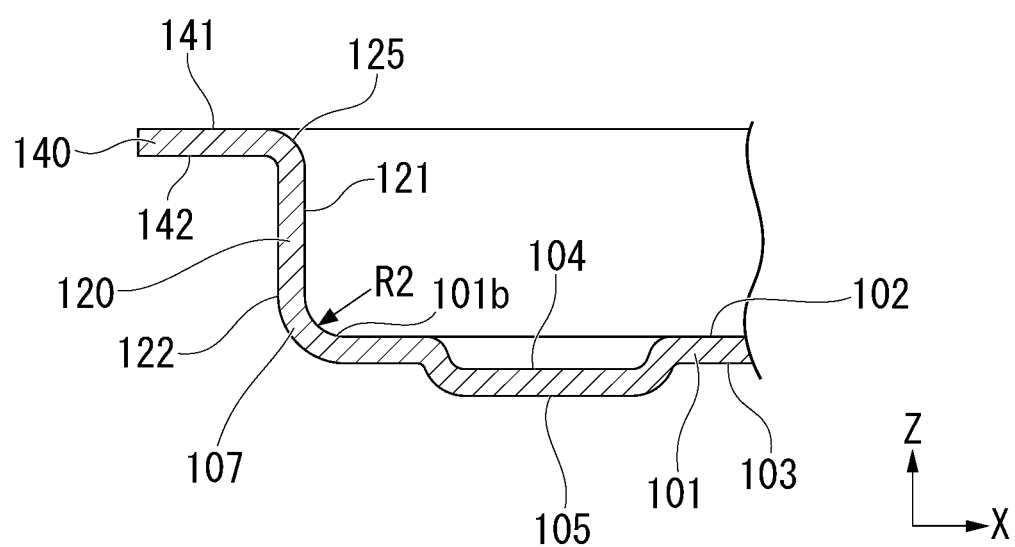
FIG. 3 is a cross-sectional view taken along cross-sectional line II-II shown in FIG. 1 when viewed in a second direction.
Figure 4:
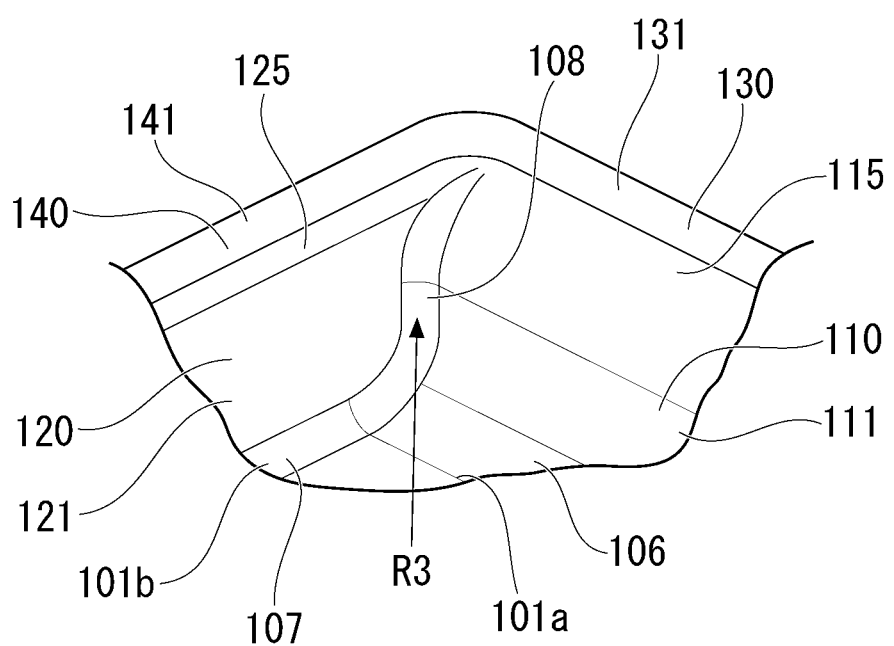
FIG. 4 is an enlarged partial perspective view of the vicinity of a vertical ridge line shown in FIG. 1 when viewed from above.

As shown in FIG. 1, the pair of first wall portions 110 rise upward in the third direction Z from the first side edges 101a located on both sides of the bottom sheet portion 101 in the second direction Y. When viewed in a top view (when viewed in the third direction Z), edge portions of the bottom sheet portion 101 on both sides in the second direction Y are defined as the first side edges 101a. The first wall portions 110 and the bottom sheet portion 101 are connected via a first ridge line 106. Each of the first wall portions 110 has a first inner surface 111 connected to the upper surface 102 of the bottom sheet portion 101 and a first outer surface 112 connected to the lower surface 103 of the bottom sheet portion 101. As shown in FIG. 2, the first ridge line 106 is formed in a concave curve shape on an inner portion to which the upper surface 102 of the bottom sheet portion 101 and the first inner surface 111 of the first wall portion 110 are connected. Furthermore, the first ridge line 106 is formed in a convex curve shape on an outer portion to which the lower surface 103 of the bottom sheet portion 101 and the first outer surface 112 of the first wall portion 110 are connected. A radius of curvature R1 of an inner portion of the first ridge line 106 is preferably 40 mm or less in view of increasing the accommodation volume of the inside of the press-formed article 100. Furthermore, the radius of curvature R1 of the inner portion of the first ridge line 106 is preferably 20 mm or less in view of obtaining a geometric structure for a corner at which three ridge lines intersect, consisting of flat surfaces, which is able to be formed of a high-strength material, in view of protection of an internal filler and materials from an impact force. In addition, the pair of second wall portions 120 rise upward in the third direction Z from the second side edges 101b located on both sides of the bottom sheet portion 101 in the first direction X. When viewed in a top view (when viewed in the third direction Z), the edge portions of the bottom sheet portion 101 on both sides in the first direction X are defined as the second side edges 101b. The second wall portions 120 and the bottom sheet portion 101 are connected via a second ridge line 107. Each of the second wall portions 120 has a second inner surface 121 connected to the upper surface 102 of the bottom sheet portion 101 and a second outer surface 122 connected to the lower surface 103 of the bottom sheet portion 101. As shown in FIG. 3, the second ridge line 107 is formed in a concave curve shape at an inner portion to which the upper surface 102 of the bottom sheet portion 101 and the second inner surface 121 of the second wall portion 120 are connected. Furthermore, the second ridge line 107 is formed in a convex curve shape at an outer portion to which the lower surface of the bottom sheet portion 101 and the second outer surface 122 of the second wall portion 120 are connected. A radius of curvature R2 of an inner portion of the second ridge line 107 is preferably 20 mm or less in view of increasing the capacity which can be accommodated inside the press-formed article 100. In addition, the radius of curvature R2 of the inner portion of the second ridge line 107 is preferably 10 mm or less in that a structure of a corner at which three ridges intersect, consisting of flat surfaces, is easily obtained as a structure in which a high-strength material and a deployable surface which does not require notch cutting, joining, or overlapping are provided. Furthermore, as shown in FIG. 4, the first wall portion 110 and the second wall portion 120 are connected via a vertical ridge line 108 extending in the third direction Z. As shown in FIG. 4, the vertical ridge line 108 is formed in a concave curve shape at an inner portion to which the first inner surface 111 and the second inner surface 121 are connected. In addition, the vertical ridge line 108 is formed in a convex curve shape at an outer portion to which the first outer surface 112 and the second outer surface 122 are connected. The radius of curvature R3 of the inner portion of the vertical ridge line 108 is preferably 20 mm or less when viewed in a top view (when viewed in the third direction Z) in view of increasing the capacity which can be accommodated inside the press-formed article 100. It is preferable that the radius of curvature R1 of the inner portion of the first ridge line 106 be different from the radius of curvature R2 of the inner portion of the second ridge line 107 in that a shape of a corner is easily obtained, from a single flat sheet, as a structure in which a high-strength material and a deployable surface which does not require notch cutting, joining, or overlapping are provided, in view of establishing a geometrical relationship between a third ridge line 115 and a fourth ridge line 125 which will be described later. The radius of curvature R1 is a radius of curvature of the inner portion of the first ridge line 106 when viewed in a cross-sectional view in a direction along the first ridge line 106. The radius of curvature R2 is a radius of curvature of the inner portion of the second ridge line 107 when viewed in a cross-sectional view in a direction along the second ridge line 107.

As shown in FIG. 1, the first flange 130 projects from an upper edge of each of the pair of first wall portions 110 toward a side opposite to the bottom sheet portion 101, that is, outward with respect to the first wall portion 110. The first flange 130 extends in the first direction X along the upper edge of the first wall portion 110. The first flange 130 has a first upper surface 131 connected to the first inner surface 111 and a first lower surface 132 connected to the first outer surface 112. The first flange 130 and the first wall portion 110 are connected via the third ridge line 115. As shown in FIG. 2, the third ridge line 115 is formed in a convex curve shape at an inner portion to which the first inner surface 111 of the first wall portion 110 and the first upper surface 131 of the first flange 130 are connected. Furthermore, the third ridge line 115 is formed in a concave curve shape at an outer portion to which the first outer surface 112 of the first wall portion 110 and the first lower surface 132 of the first flange 130 are connected.

As shown in FIG. 1, the second flange 140 projects from the upper edge of each of the pair of second wall portions 120 toward the side opposite to the bottom sheet portion 101, that is, outward with respect to the second wall portion 120. The second flange 140 extends along the upper edge of the second wall portion 120 in the second direction Y. The second flange 140 has a second upper surface 141 connected to the second inner surface 121 and a second lower surface 142 connected to the second outer surface 122. The second flange 140 and the second wall portion 120 are connected via the fourth ridge line 125. As shown in FIG. 3, the fourth ridge line 125 is formed in a convex curve shape at an inner portion to which the second inner surface 121 of the second wall portion 120 and the second upper surface 141 of the second flange 140 are connected. Furthermore, the fourth ridge line 125 is formed in a concave curve shape at an outer portion to which the second outer surface 122 of the second wall portion 120 and the second lower surface 142 of the second flange 140 are connected. The first upper surface 131 of the first flange 130 and the second upper surface 141 of the second flange 140 are connected so as to be flush with each other. It is preferable that a radius of curvature R4 of an inner portion of the third ridge line 115 be different from a radius of curvature R5 of an inner portion of the fourth ridge line 125 in that a shape of a corner consisting of flat surfaces is easily obtained as a structure in which a high-strength material and a deployable surface which does not require notch cutting, joining, or overlapping are provided. The radius of curvature R4 is a radius of curvature of the inner portion of the third ridge line 115 when viewed in a cross-sectional view in a direction along the third ridge line 115. The radius of curvature R5 is a radius of curvature of the inner portion of the fourth ridge line 125 when viewed in a cross-sectional view in a direction along the fourth ridge line 125. The radius of curvature R4 is preferably 40 mm or less in that a shape of a corner consisting of flat surfaces is easily obtained as a structure in which a high-strength material and a deployable surface which does not require notch cutting, joining, or overlapping are provided. Furthermore, the radius of curvature R5 is preferably 10 mm or less in that a shape of a corner consisting of flat surfaces is easily obtained as a structure in which a high-strength material and a deployable surface which does not require notch cutting, joining, or overlapping are provided.

A material for forming the press-formed article 100 as described above is a metal material which can be plastically processed when press-formed by the method for manufacturing the press-formed article 100 which will be described later and is, for example, a steel material. Furthermore, when the press-formed article 100 is applied to the battery accommodating case as described above or the like, a tensile strength of the material for forming the press-formed article 100 is preferably 440 MPa or more in view of protecting a battery in the event of a vehicle collision. In addition, the tensile strength of the material for forming the press-formed article 100 may be 1180 MPa or less in view of improving workability. Moreover, the first wall portion 110 of the press-formed article 100 preferably has a thickness of 85% or more of a thickness of a center of the bottom sheet portion 101. The second wall portion 120 of the press-formed article 100 preferably has a thickness of 85% or more of the thickness of the center of the bottom sheet portion 101. It is preferable that the first flange 130 of the press-formed article 100 have a thickness of 85% or more of the thickness of the center of the bottom sheet portion 101. A thickness of the second flange 140 of the press-formed article 100 preferably has a thickness of 85% or more of the thickness of the center of the bottom sheet portion 101. Although the thickness of the first wall portion 110, the second wall portion 120, the first flange 130, or the second flange 140 is defined using the thickness of the center of the bottom sheet portion 101 as a reference, when performing press-forming from a blank 1 using the method for manufacturing the press-formed article 100 which will be described later, if there is another portion which does not change from a thickness of the blank 1, the thicknesses may be defined using the other portion as a reference.

Figure 5:
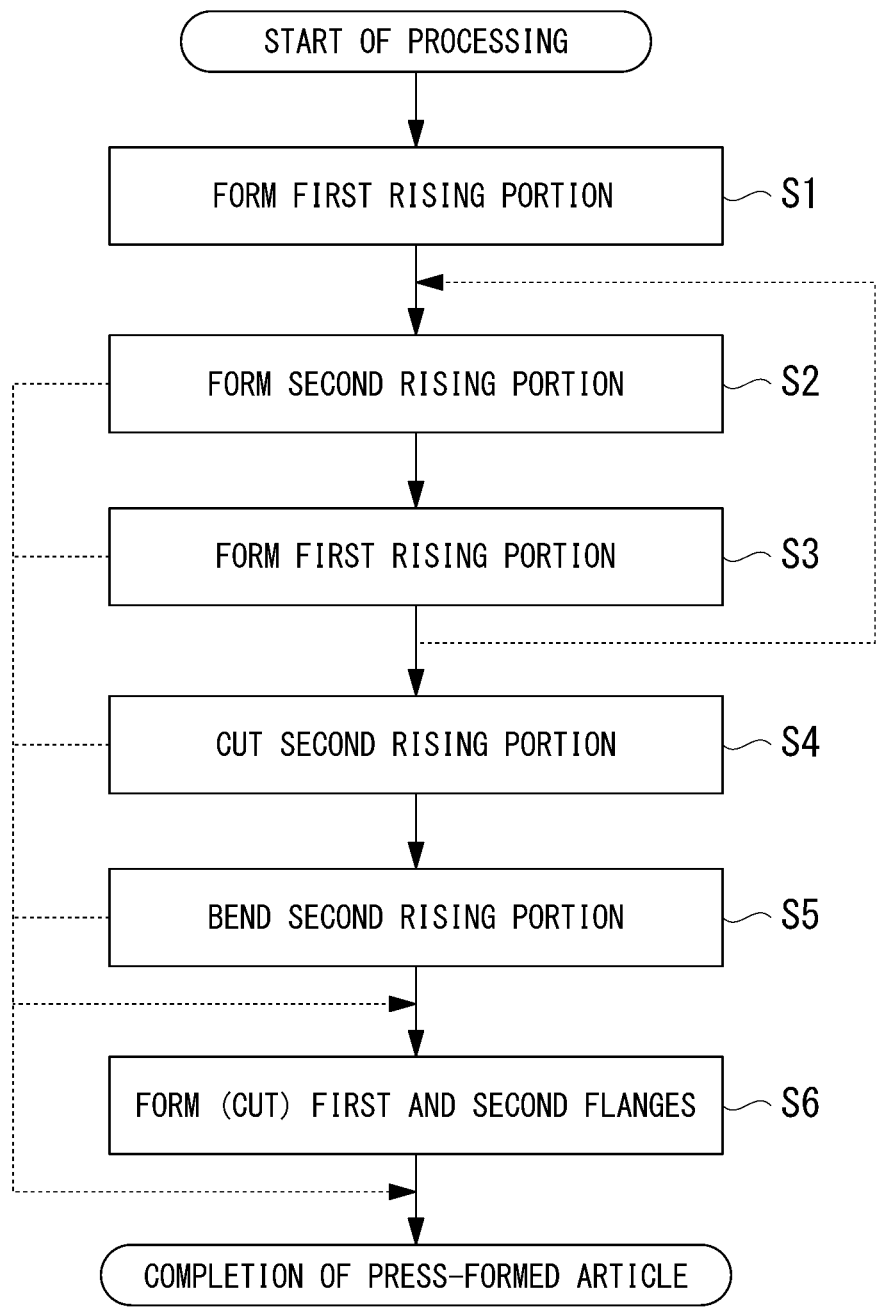
FIG. 5 is a flowchart showing the method for manufacturing a press-formed article according to the first embodiment.

The method for manufacturing the press-formed article 100 according to the embodiment will be described below. As shown in FIG. 5, the method for manufacturing the press-formed article 100 according to the embodiment includes a first step S1 for forming a portion corresponding to the first wall portion 110, a second step S2 for forming a portion corresponding to the second wall portion 120, a third step S3 for forming a portion corresponding to the first wall portion 110, a fourth step S4 and a fifth step S5 for forming the second flange 140, and a sixth step S6 for making the first flange 130 and the second flange 140 to have desired shapes. Each of the steps will be described in detail below. An article formed in an unprocessed flat sheet shape before the first step S1 is performed is referred to as a "blank," an article obtained by subjecting the blank to processing in each of the steps is referred to as an "intermediate press-formed article," and an article obtained through the performing of each of the steps formed to have a desired shape is referred to as a "press-formed article." Furthermore, as a concept in which the blank and the intermediate press-formed article are provided, an object on which each of the steps of the method for manufacturing the press-formed article 100 according to the embodiment is performed is referred to as a "workpiece."

Figure 6:
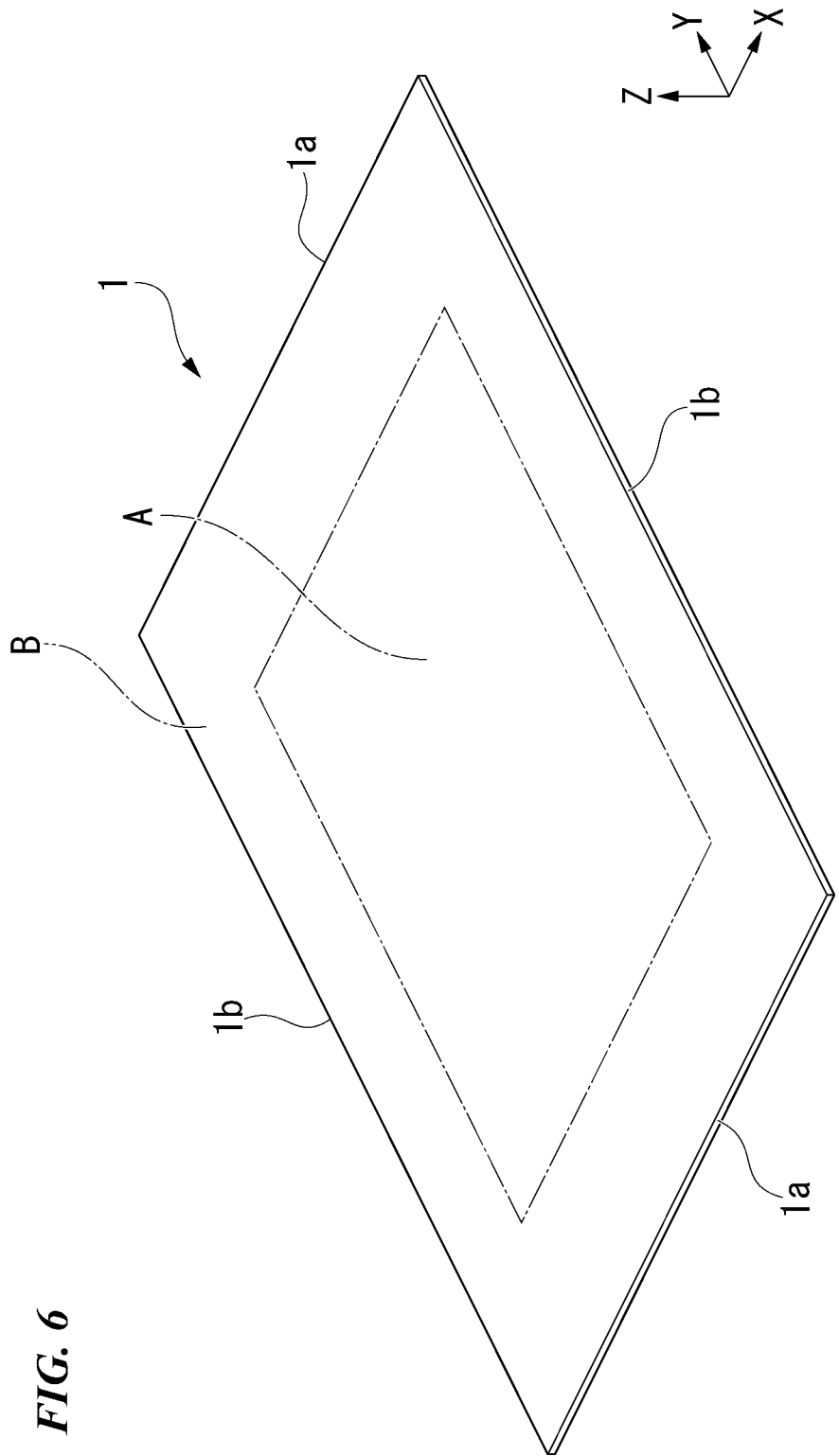
FIG. 6 is a perspective view showing a blank used in the method for manufacturing a press-formed article according to the first embodiment when viewed from above.
Figure 8:
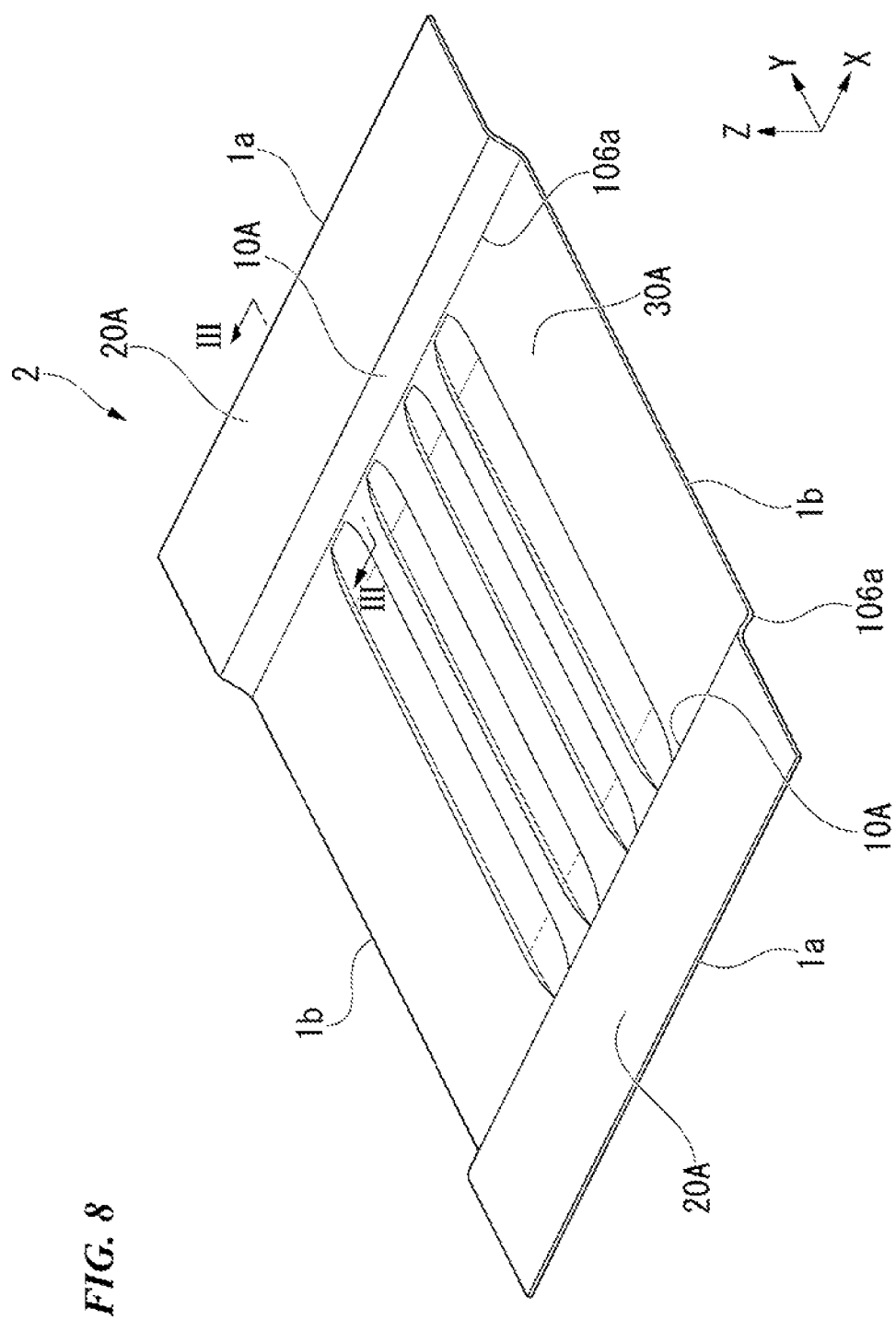
FIG. 8 is a perspective view showing a first intermediate press-formed article which has been subjected to the first step when viewed from above in the method for manufacturing a press-formed article according to the first embodiment.

In the first step S1, from the flat sheet-shaped blank 1 as shown in FIG. 6, a first rising portion 10A is formed as a portion corresponding to the first wall portion 110 as shown in FIG. 8, a first strip portion 20A is formed as a portion corresponding to the first flange 130, and a first intermediate press-formed article is formed. The blank 1 includes a pair of first edge portions 1a in the first direction X and a pair of second edge portions 1b connected to the pair of first edge portions 1a and extending in the second direction Y. In the blank 1, the bottom sheet portion 101 of the press-formed article 100 shown in FIG. 1 is formed using a zone A surrounded by an alternate long and two short dashed line shown in a center and the first wall portion 110, the second wall portion 120, the first flange 130, and the second flange 140 are formed using a zone B around the zone A by performing the first step S1 to the sixth step S6. The first step S1 corresponds to a shape construction for performing the second step S2 and can be performed through various processing methods such as stamping forming. Moreover, a forming method in which a member thickness of a first intermediate press-formed article 2 which has been subjected to the first step S1 is a thickness of 85% or more of a member thickness of the blank 1 which has not been subjected to the first step S1 is preferable. It is preferable that the first rising portion 10A be formed by performing the first step S1, a die be changed, and then a second rising portion 40A which will be described later be formed by performing the second step S2 in that forming is performed more accurately, that is, in a state in which there is little decrease/ increase in sheet thickness due to processing expansion/ contraction and the sheet thicknesses are close to the original sheet thickness. Furthermore, if the first intermediate press-formed article 2 can be formed from the blank 1 when the blank 1 is disposed in a die used in the second step S2 which will be described later at the time of performing the second step S2, it is not necessary to perform the first step S1 independently of the second step S2 and the first step S1 may be performed together with the second step S2.

Figure 7:
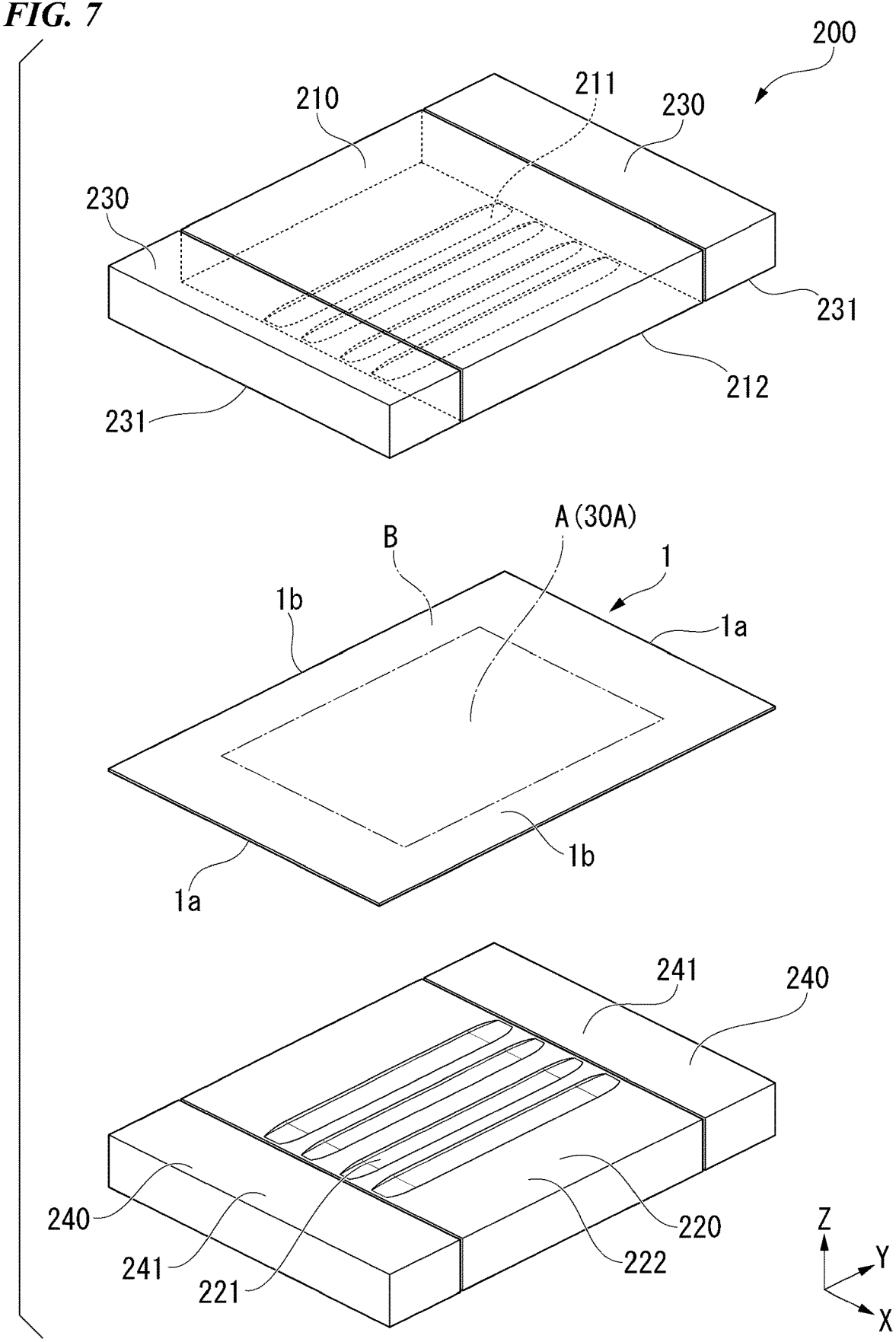
FIG. 7 is an exploded perspective view showing a die used in a first step in the method for manufacturing a press-formed article according to the first embodiment when viewed from above.

FIG. 7 shows an outline of a die of a first set 200 composed of the die used in the first step S1. The die of the first set 200 includes a bottom sheet upper die 210 and a bottom sheet lower die 220 having a base sheet portion 30A including the portion corresponding to the bottom sheet portion 101 disposed therebetween in the third direction Z and a side upper die 230 and a side lower die 240 which form the first rising portion 10A and the first strip portion 20A. The bottom sheet upper die 210 and the bottom sheet lower die 220 and the side upper die 230 and the side lower die 240 are away from each other in the second direction Y by a dimension according to a thickness of the first rising portion 10A formed in this step and gaps are formed between them. The bottom sheet upper die 210 has a press surface 212 on which a convex portion 211 in which the groove 104 can be formed to correspond to the upper surface 102 of the bottom sheet portion 101 is formed. Furthermore, the bottom sheet lower die 220 has a press surface 222 in which a concave portion 221 in which the ridge 105 can be formed to correspond to the lower surface 103 of the bottom sheet portion 101 is formed. The bottom sheet upper die 210 and the bottom sheet lower die 220 have the blank 1 disposed therebetween as a whole in the first direction X and have only a portion which will be the base sheet portion 30A disposed therebetween in the second direction Y. Both sides of a zone included between the bottom sheet upper die 210 and the bottom sheet lower die 220 in the second direction Y are disposed between the side upper die 230 and the side lower die 240.

The pair of side upper die 230 and side lower die 240 are provided to correspond to the pair of first rising portions 10A and the first strip portion 20A. The side upper die 230 and the side lower die 240 have portions which will be the first rising portion 10A and the first strip portion 20A corresponding thereto disposed therebetween. Furthermore, surface pressure is applied to the blank 1 by the bottom sheet upper die 210, the bottom sheet lower die 220, the side upper die 230, and the side lower die 240. In this state, the bottom sheet upper die 210 and the bottom sheet lower die 220 are moved downward in the third direction Z relative to the side upper die 230 and the side lower die 240. A magnitude of the surface pressure is obtained, for example, through Expression (1) in the second step S2 which will be described later. Although the side upper die 230 and the side lower die 240 are fixed and the bottom sheet upper die 210 and the bottom sheet lower die 220 are moved downward in the third direction Z in the embodiment, the present invention is not limited thereto. In addition, the bottom sheet upper die 210 and the bottom sheet lower die 220 may be fixed and the side upper die 230 and the side lower die 240 may be moved upward in the third direction Z. Furthermore, the two sets of the side upper die 230 and the side lower die 240 and the bottom sheet upper die 210 and the bottom sheet lower die 220 may be moved in the third direction Z to be relatively moved.

Figure 9:
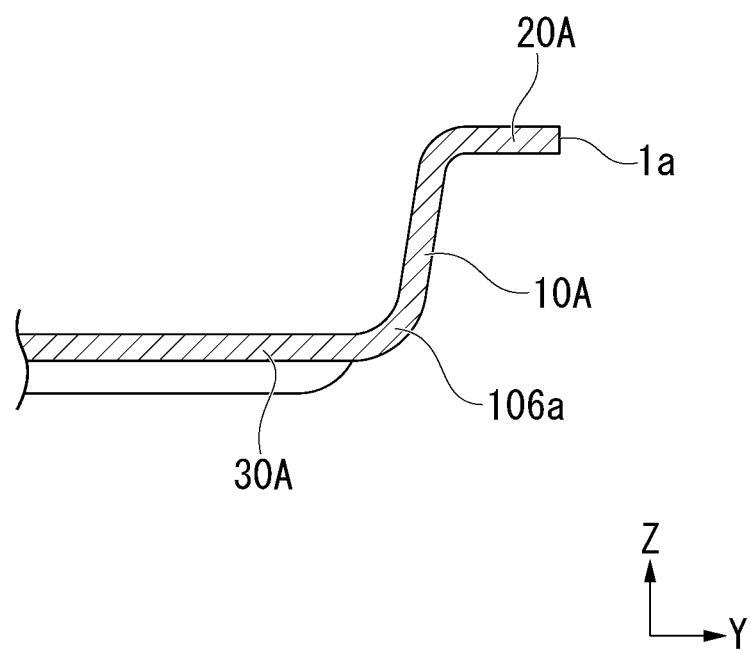
FIG. 9 is a cross-sectional view taken along cross-sectional line shown in FIG. 8 when viewed in the first direction.

Also, when the first rising portion 10A reaches a prescribed height, the movement of the bottom sheet upper die 210 and the bottom sheet lower die 220 relative to the side upper die 230 and the side lower die 240 stops. Thus, the first intermediate press-formed article 2 shown in FIGS. 8 and 9 is formed. That is to say, the first rising portion 10A connected via the first ridge line 106a extending in the first direction X in the base sheet portion 30A and extending upward in the third direction Z is formed between the pair of second edge portions 1b in the first direction X. Furthermore, a portion remaining in a state that the portion is disposed between the side upper die 230 and the side lower die 240 forms the first strip portion 20A extending along an upper edge of the first rising portion 10A and projecting outward in the second direction Y. A height of the first rising portion 10A which has been subjected to the first step S1 may be lower than a height of the first wall portion 110 of the press-formed article 100 which is a finished article.

Figure 10:
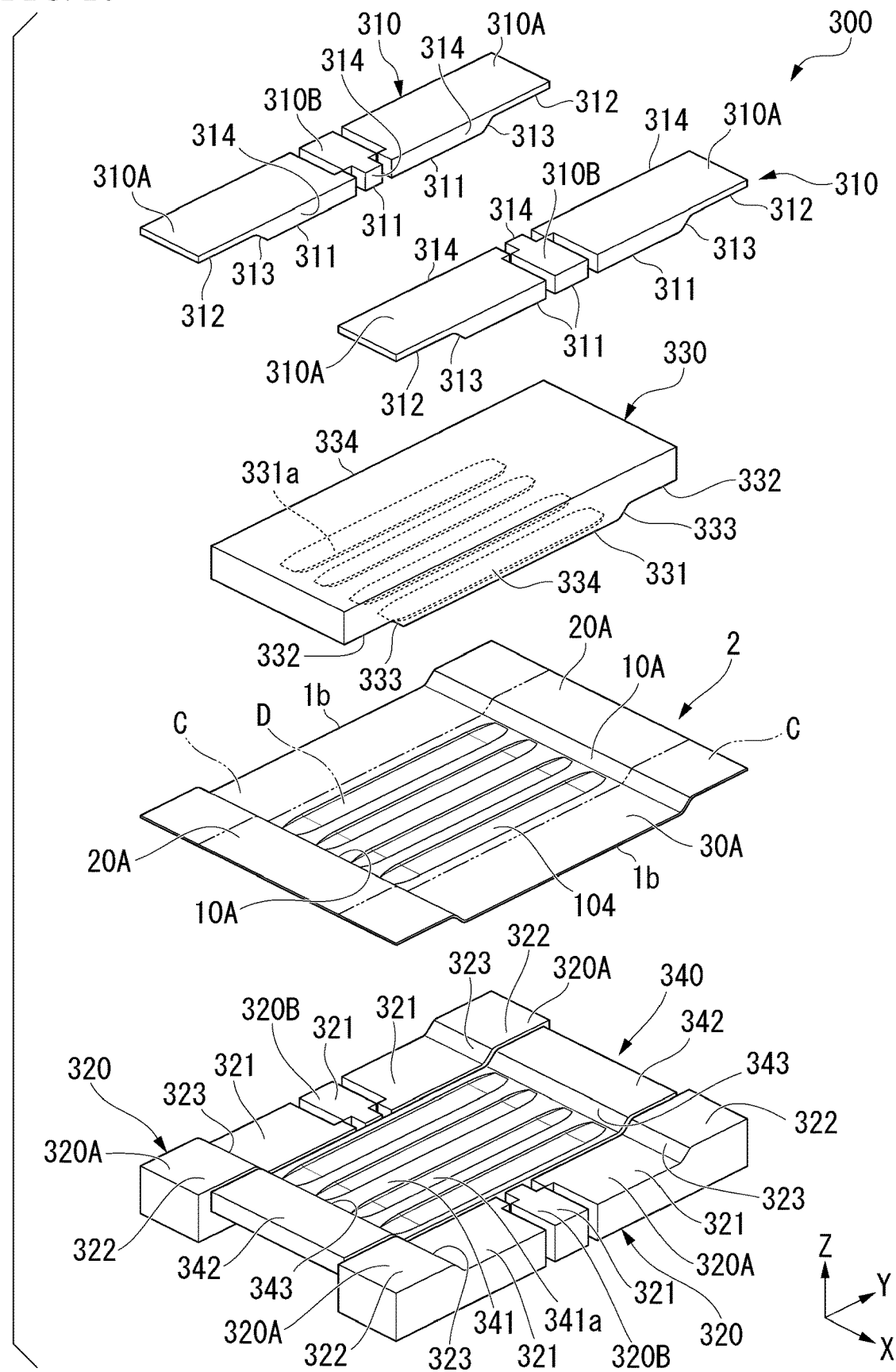
FIG. 10 is an exploded perspective view showing a die used in a second step in the method for manufacturing a press-formed article according to the first embodiment when viewed from above.

Subsequently, the second step S2 is performed. In the second step S2, the second rising portion 40A is formed as a portion corresponding to the second wall portion 120 from the first intermediate press-formed article 2 formed in the first step S1 and a second strip portion 50A is formed as a portion corresponding to the second flange 140. When the second step S2 and the third step S3 subsequent thereto are repeatedly performed as will be describe later, in the second step S2 after the third step S3 has been performed, a third intermediate press-formed article 4 which has been subjected to the third step S3 is utilized. FIG. 10 shows an outline of a die of a second set 300 composed of the die used in the second step S2. As shown in FIG. 10, the die of the second set 300 includes a first upper die 310, a first lower die 320, a second upper die 330, and a second lower die 340. The first upper die 310 and the first lower die 320 have strip-shaped first zones C including the second edge portions 1b of the base sheet portion 30A, the first rising portion 10A, and the first strip portion 20A disposed therebetween from both sides in the third direction Z along a second edge portion 1b in the base sheet portion 30A. The pair of first zones C are provided to correspond to the pair of second edge portions 1b. Furthermore, the second upper die 330 and the second lower die 340 have a second zone D including the base sheet portion 30A, the first rising portion 10A, and the first strip portion 20A adjacent to the first zones C disposed therebetween from both sides in the third direction Z. In the embodiment, the second zone D is a zone between the pair of the first zones C.

Figure 11:
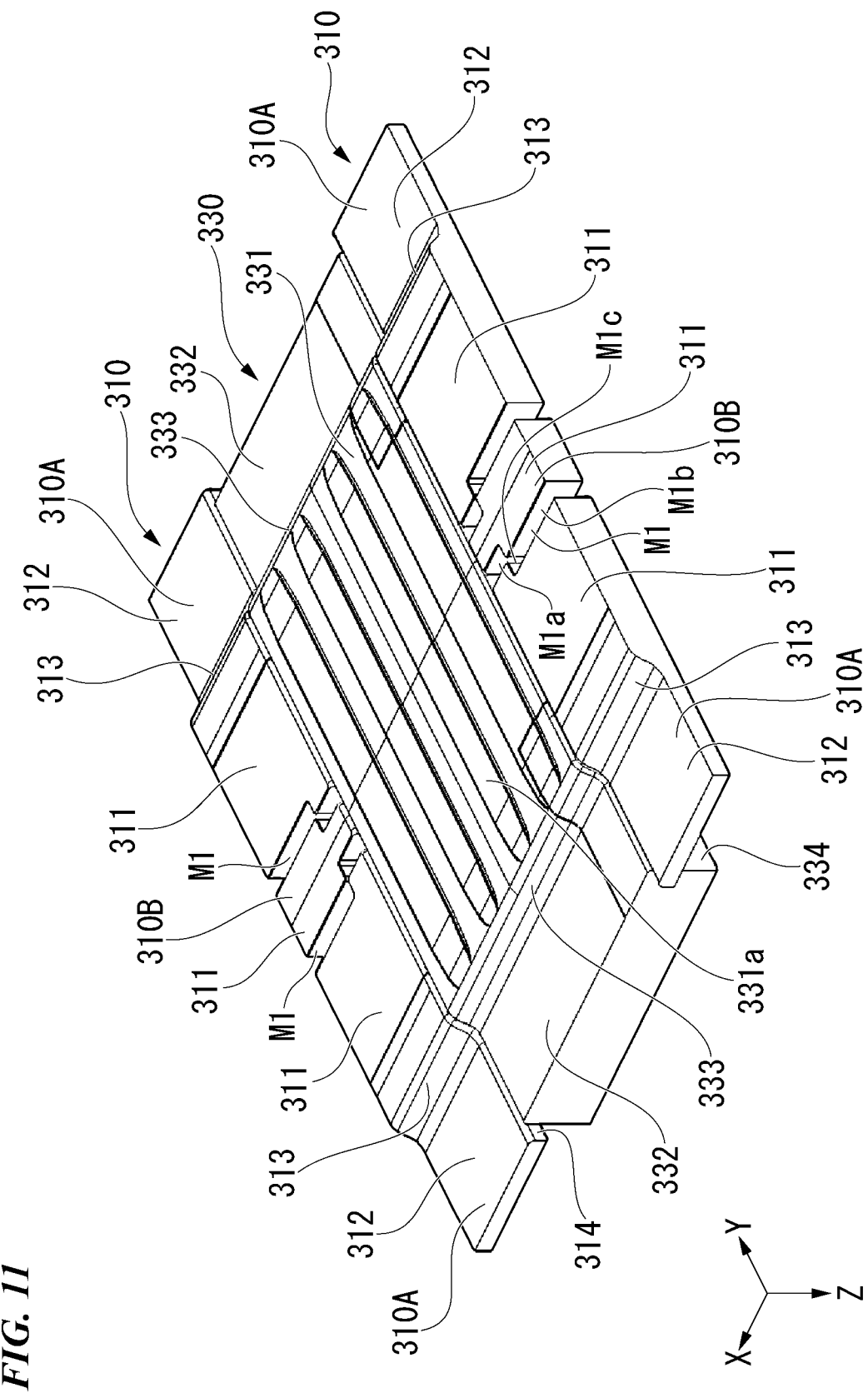
FIG. 11 is a perspective view showing an upper die of a die used in the second step in the method for manufacturing a press-formed article according to the first embodiment when viewed from below.
Figure 12:
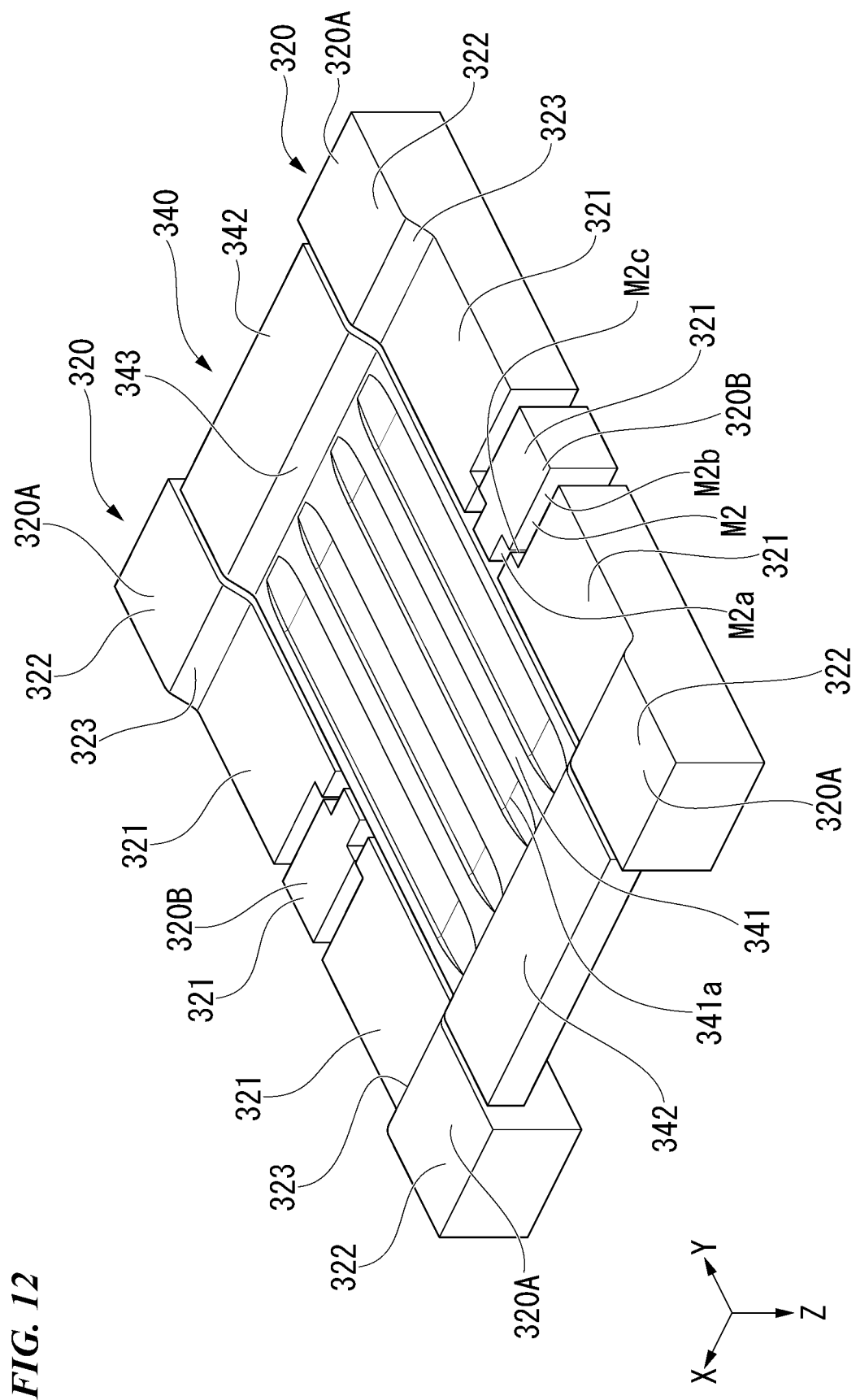
FIG. 12 is a perspective view showing a lower die of the die used in the second step in the method for manufacturing a press-formed article according to the first embodiment when viewed from above.
Figure 13:
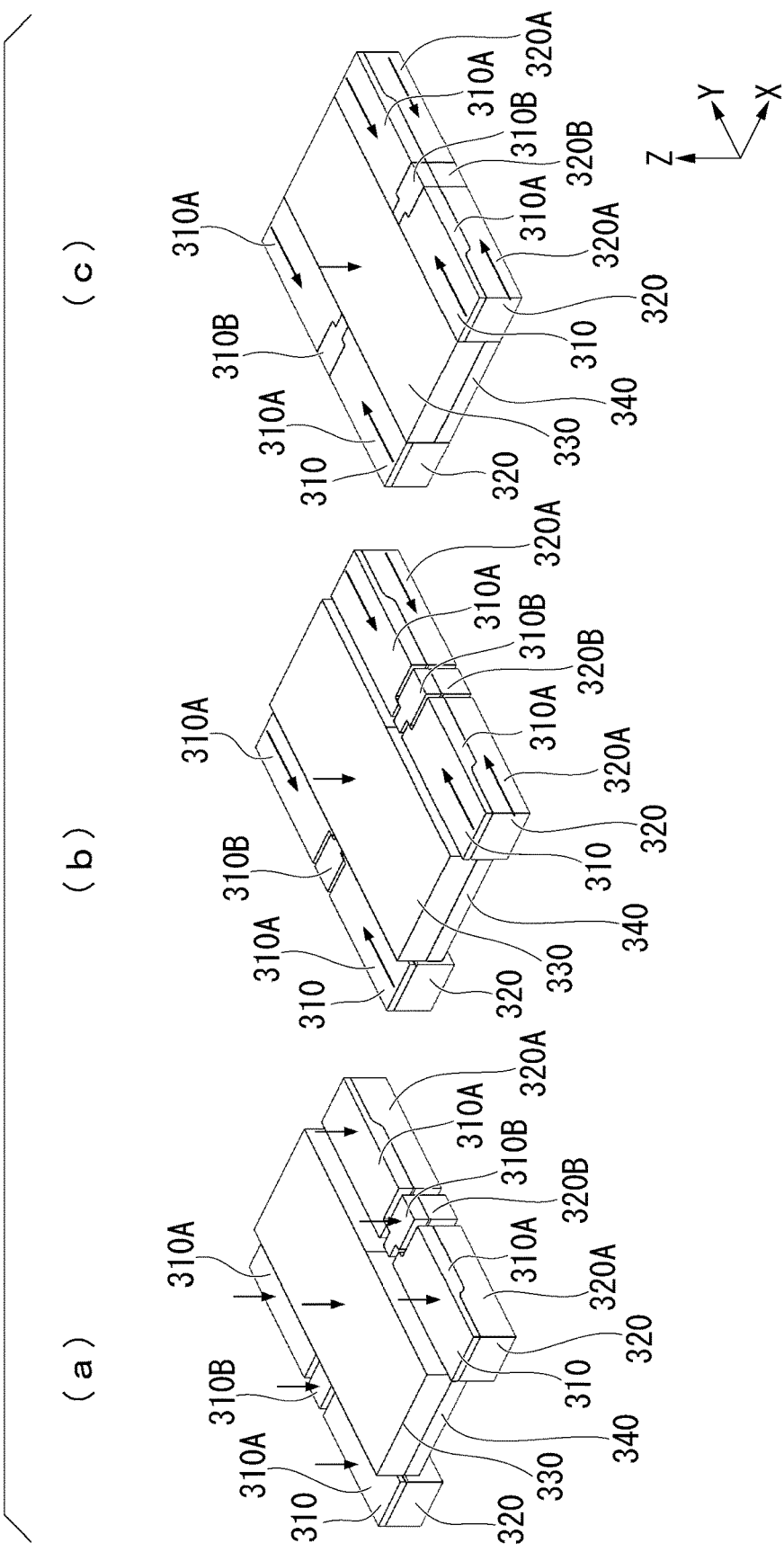
FIG. 13 is perspective views showing states of the die in the second step in the method for manufacturing a press-formed article according to the first embodiment when viewed from above, in which (a) of FIG. 13 shows a state of the die which has not been subjected to the second step, (b) of FIG. 13 shows a state of the die which is being subjected to the second step, and (c) of FIG. 13 shows a state of the die which has been subjected to the second step.
Figure 14:
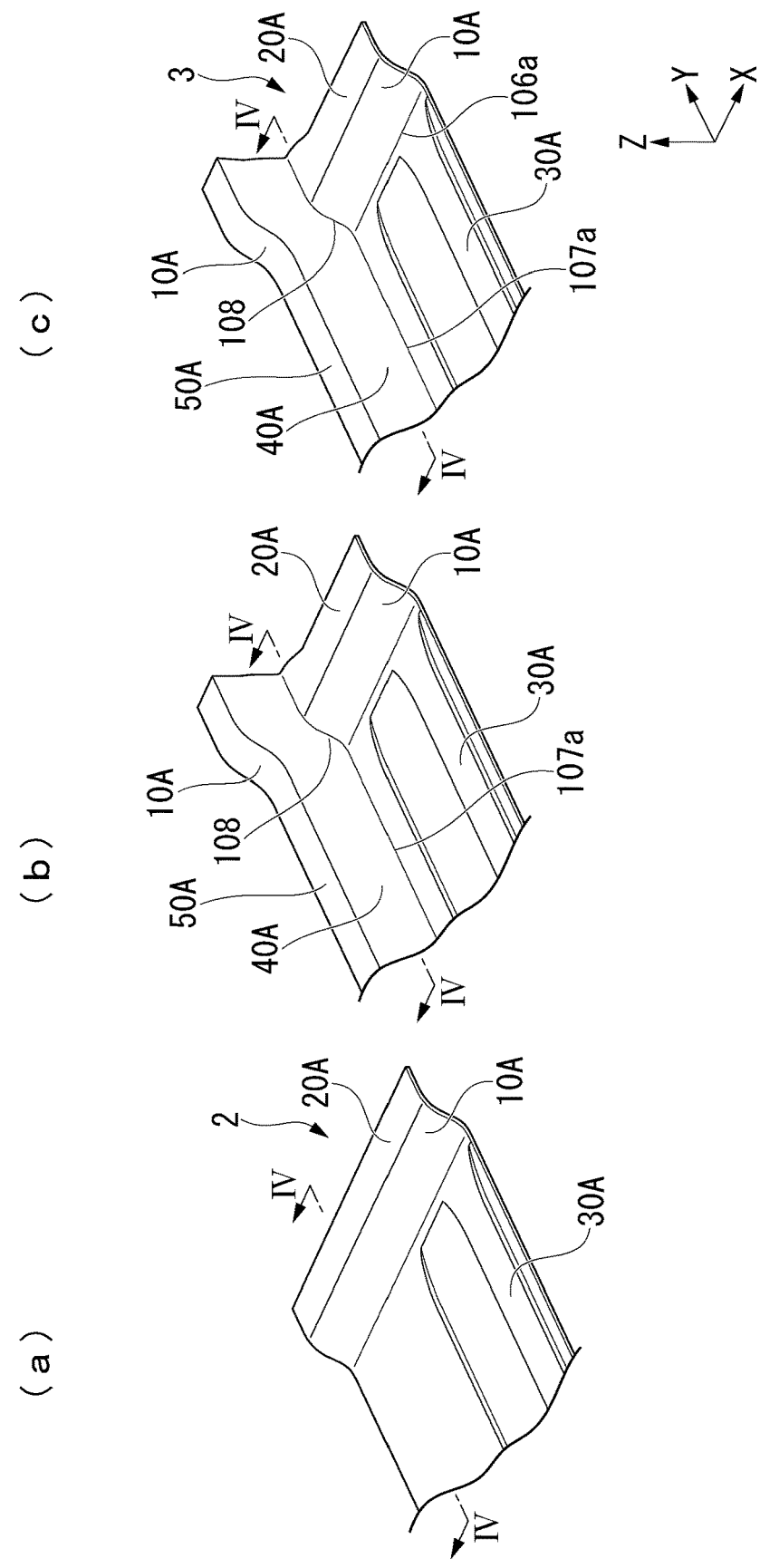
FIG. 14 is perspective views showing states of an intermediate press-formed article in the second step in the method for manufacturing a press-formed article according to the first embodiment when viewed from above, in which (a) of FIG. 14 shows a state of the intermediate press-formed article which has not been subjected to the second step, (b) of FIG. 14 shows a state of the intermediate press-formed article which is being subjected to the second step, and (c) of FIG. 14 shows a state of the intermediate press-formed article which has been subjected to the second step.

As shown in FIGS. 10 and 11, the second upper die 330 has a base sheet portion-side press surface 331 in contact with an upper surface of the base sheet portion 30A, a strip portion-side press surface 332 in contact with an upper surface of the first strip portion 20A, and a stepped portion 333 formed between the base sheet portion-side press surface 331 and the strip portion-side press surface 332 and formed along the first rising portion 10A. Furthermore, the second upper die 330 has a guide surface 334 forming the second rising portion 40A on the first upper die 310 side in the second direction Y. The guide surface 334 is formed to cross the base sheet portion-side press surface 331, the stepped portion 333, and the strip portion-side press surface 332 as a whole in the second direction Y. A convex portion 331a corresponding to the groove 104 formed in the first step S1 is formed on the base sheet portion-side press surface 331 of the second upper die 330. As shown in FIGS. 10 and 12, the second lower die 340 has a base sheet portion-side press surface (second bottom surface) 341 in contact with a lower surface of the base sheet portion 30A, a strip portion-side press surface (second flange surface) 342 in contact with a lower surface of the first strip portion 20A, and a stepped portion (second wall surface) 343 formed between the base sheet portion-side press surface 341 and the strip portion-side press surface 342 and formed along the first rising portion 10A. The strip portion-side press surface 342 extends from an upper edge of the stepped portion 343 toward a side opposite to the base sheet portion-side press surface 341. The first rising portion 10A formed in the first step S1 is disposed between the stepped portion 333 of the second upper die 330 and the stepped portion 343 of the second lower die 340. Furthermore, a concave portion 341a corresponding to the groove 104 formed in the first step S1 is formed in the base sheet portion-side press surface 341 of the second lower die 340.

As shown in FIGS. 10 and 11, the first upper die 310 has base sheet portion-side press surface 311 in contact with the upper surface of the base sheet portion 30A, a strip portion-side press surface 312 in contact with the upper surface of the first strip portion 20A, and a stepped portion 313 formed between the base sheet portion-side press surface 311 and the strip portion-side press surface 312 and formed along the first rising portion 10A. Furthermore, the first upper die 310 has a guide surface 314 forming the second rising portion 40A to face the guide surface 334 of the second upper die 330 adjacent thereto. The guide surface 314 is formed to cross the base sheet portion-side press surface 331, the stepped portion 333, and the strip portion-side press surface 332 as a whole in the second direction Y. The guide surface 314 of the first upper die 310 is away from the guide surface 334 of the second upper die 330 in the first direction X by a dimension according to a thickness of the second rising portion 40A formed in this step and a gap is formed between them. As shown in FIGS. 10 and 12, the first lower die 320 has a base sheet portion-side press surface (first bottom surface) 321 in contact with the lower surface of the base sheet portion 30A, a strip portion-side press surface (first flange surface) 322 in contact with the lower surface of the first strip portion 20A, and a stepped portion (first wall surface) 323 formed between the base sheet portion-side press surface 321 and the strip portion-side press surface 322 and formed along the first rising portion 10A. The strip portion-side press surface 322 extends from an upper edge of the stepped portion 323 toward a side opposite to the base sheet portion-side press surface 321. Furthermore, the first rising portion 10A formed in the first step S1 is disposed between the stepped portion 313 of the first upper die 310 and the stepped portion 323 of the first lower die 320.

Here, in the embodiment, both of the first upper die 310 and the first lower die 320 are divided into a plurality of dies in the second direction Y. To be specific, the first upper die 310 is composed of a pair of end dies (upper end dies) 310A and a center die (upper center die) 310B. The pair of end dies 310A include the strip portion-side press surface 312, the stepped portion 313, and a partial zone in the base sheet portion-side press surface 311 adjacent to the stepped portion 313. The center die 310B is disposed adjacent to the end dies 310A. The center die 310B has a portion of a workpiece on a side opposite to the strip portion-side press surface 322 with respect to the stepped portion 323 disposed therebetween. The center die 310B is disposed so that gaps M1 are formed between the center die 310B and the pair of end dies 310A. Each of the gaps M1 between the center die 310B and the end dies 310A crosses in the first direction X, but is not formed in a straight line shape. To be specific, the gap M1 has an inner portion M1a reaching the guide surface 314 which is an inner side in the first direction X, an outer portion M1b reaching an outer side of the first upper die 310 on a side opposite to the guide surface 314 in the first direction X, and an intermediate portion M1c connecting the inner portion M1a and the outer portion M1b and formed in the second direction Y. Similarly, the first lower die 320 is composed of a pair of end dies (lower end dies) 320A and a center die (lower center die) 320B. The pair of end dies 320A include the strip portion-side press surface 332, the stepped portion 333, and a partial zone in the base sheet portion-side press surface 331 adjacent to the stepped portion 333. The center die 320B is disposed adjacent to the end dies 320A. Similarly, also in the first lower die 320, the center die 320B is disposed so that gaps M2 are formed between the center die 320B and the pair of end dies 320A. Moreover, each of the gaps M2 between the center die 320B and the end dies 320A crosses in the first direction X, but is not formed in a straight line shape. To be specific, the gap M2 has an inner portion M2a reaching an inner side in the first direction X, an outer portion M2b reaching an outer side of the first upper die 310, and an intermediate portion M2c connecting the inner portion M2a and the outer portion M2b and formed in the second direction Y. The end dies 310A and 320A of the first upper die 310 and the first lower die 320 are movable in the second direction Y.

With the constitution of the die as described above, press-forming is performed in the second step S2 as follows. That is to say, first, the first intermediate press-formed article 2 is disposed between the first upper die 310 and the first lower die 320 and the first intermediate press-formed article 2 is disposed between the second upper die 330 and the second lower die 340.

To be specific, for example, as shown in FIG. 13(a), the first lower die 320 and the second lower die 340 are fixed and the first intermediate press-formed article 2 is sandwiched by moving down the first upper die 310 and the second upper die 330. As described above, instead of causing the first intermediate press-formed article 2 formed by independently performing the first step S1 to be sandwiched, the first intermediate press-formed article 2 may be formed by causing the blank 1 to be disposed between the first upper die 310, the first lower die 320, the second upper die 330, and the second lower die 340 and by performing the first step S1 while causing the blank 1 to be disposed therebetween.

Also, surface pressure in which out-of-plane deformation is prevented is applied to the first intermediate press-formed article 2 and the first strip portion 20A. Such surface pressure can be obtained by, for example, the following expression:

$$P = Y/590 \times t/1.4 \times P0 \qquad (1)$$

where P: surface pressure (MPa) causing intermediate press-formed article disposed therebetween
Y: tensile strength (MPa) of intermediate press-formed article
t: thickness (mm) of intermediate press-formed article
P0: reference surface pressure=0.1 MPa In this state, the second upper die 330 and the second lower die 340 are moved downward in the third direction Z relative to the first upper die 310 and the first lower die 320 so that a state transitions from the state of FIG. 13(a) to the state of FIG. 13(c) through the state of FIG. 13(b). Although the first upper die 310 and the first lower die 320 are fixed in the third direction Z and the second upper die 330 and the second lower die 340 are moved downward in the third direction Z in the embodiment, the present invention is not limited thereto. The second upper die 330 and the second lower die 340 may be fixed and the first upper die 310 and the first lower die 320 may be moved upward in the third direction Z. In addition, the two sets of the first upper die 310 and the first lower die 320 and the second upper die 330 and the second lower die 340 may be moved in the third direction Z to be relatively moved. Furthermore, as shown in FIGS. 13(b) and 13(c), in the embodiment, the second upper die 330 and the second lower die 340 are moved downward in the third direction Z relative to the first upper die 310 and the first lower die 320 and the end dies 310A and 320A of the first upper die 310 and the first lower die 320 are moved inward in the second direction Y so that the end dies 310A and 320A thereof approach the center dies 310B and 320B. Thus, it is possible to apply a load to the first intermediate press-formed article 2 so that the first rising portion 10A disposed between the stepped portions 313 and 323 of the first upper die 310 and the first lower die 320 is moved inward in the second direction Y.

Here, in the first intermediate press-formed article 2, sufficient frictional resistance in which a material of the base sheet portion 30A disposed between the second upper die 330 and the second lower die 340 as it was is not moved toward both sides in the first direction X is exerted to the base sheet portion 30A disposed between the second upper die 330 and the second lower die 340. Such frictional resistance is exerted through surface pressure applied through the second upper die 330 and the second lower die 340 and a coefficient of friction between the second upper die 330 and the second lower die 340 and the first intermediate press-formed article 2. The coefficient of friction can be adjusted using the surface roughness of each of the press surfaces 331, 332, 341, and 342 of the second upper die 330 and the second lower die 340, a type of lubricant between the second upper die 330 and the second lower die 340 and the first intermediate press-formed article 2, or the like.

Also, a portion disposed between the first upper die 310 and the first lower die 320 undergoes surface pressure in which the portion is prevented from being subjected to out-of-plane deformation (deformation in the third direction Z) through the first upper die 310 and the first lower die 320. Furthermore, in the portion disposed between the first upper die 310 and the first lower die 320, the coefficient of friction between the first upper die 310 and the first lower die 320 and the first intermediate press-formed article 2 is adjusted so that the portion can be moved toward the base sheet portion 30A, along with the press-forming in the second step S2. The coefficient of friction can be adjusted using the surface roughness of each of the press surfaces 311, 312, 321, and 322 of the first upper die 310 and the first lower die 320, a type of lubricant between the first upper die 310 and the first lower die 320 and the first intermediate press-formed article 2, or the like.

Figure 16:
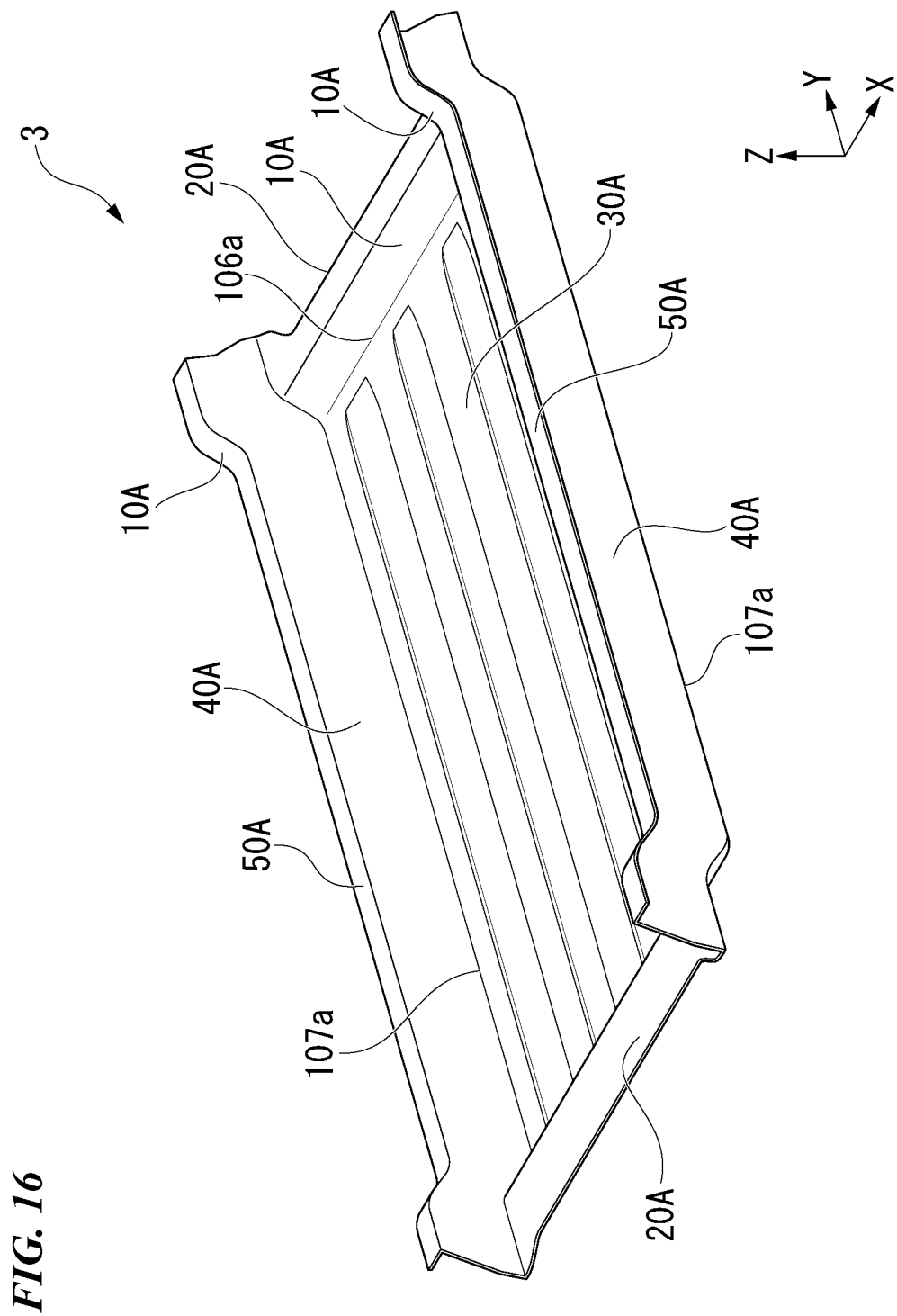
FIG. 16 is a perspective view showing a second intermediate press-formed article which has been subjected to the second step in the method for manufacturing a press-formed article according to the first embodiment when viewed from above.

Therefore, when the second upper die 330 and the second lower die 340 is moved relative to the first upper die 310 and the first lower die 320 downward in the third direction Z, a portion disposed between the first upper die 310 and the first lower die 320 flows toward the base sheet portion 30A side while minimizing out-of-plane deformation and the second rising portion 40A which rises from the base sheet portion 30A upward in the third direction Z is formed. The entire second rising portion 40A is formed on a side on which the first rising portion 10A rises from the base sheet portion 30A. Along with the formation of the second rising portion 40A, although tensile plastic deformation may be included as a deformation mode in the second rising portion 40A and the second strip portion 50A, it is preferable that the tensile plastic deformation be within a zone in which the member thickness after the second step S2 is performed is 85% or more as compared with that before the second step S2 is performed. Moreover, when the second rising portion 40A reaches a prescribed height, the relative movement of the second upper die 330 and the second lower die 340 with respect to the first upper die 310 and the first lower die 320 stops. Thus, a second intermediate press-formed article 3 as shown in FIG. 16 is formed. That is to say, the second rising portion 40A connected via the base sheet portion 30A and the second ridge line 107a, extending upward in the third direction Z, and connected via the first rising portion 10A and the vertical ridge line 108 is formed between the pair of first edge portions 1a in the second direction Y. Furthermore, the remaining portion of the portion in a state in which the portion is disposed between the first upper die 310 and the first lower die 320 forms the second strip portion 50A extending along an upper edge of the second rising portion 40A and projecting outward. In the embodiment, a height of the second rising portion 40A which has been subjected to the second step S2 is made higher than a height of the first rising portion 10A which has been subjected to the first step S1 which is an immediately previous step.

Here, as described above, the second upper die 330 and the second lower die 340 are moved relative to the first upper die 310 and the first lower die 320 downward in the third direction Z and the end dies 310A and 320A of the first upper die 310 and the first lower die 320 are moved inward in the second direction Y to approach the center dies 310B and 320B. For this reason, a deformation mode of a portion of the second rising portion 40A formed in the second step S2 connected to the vertical ridge line 108 is different from that of the other portions. FIGS. 14(a) to 14(c) show the details of the second rising portion 40A corresponding to states of the dies of FIGS. 13(a) to 13(c). Furthermore, FIGS. 15(a) to 15(c) show states of the intermediate press-formed article when viewed in a cross-sectional view in the first direction X in the vicinity of the vertical ridge line 108 corresponding to the states of the dies of FIGS. 13(a) to 13(c). The second rising portion 40A is gradually formed from the first intermediate press-formed article 2 which has not been subjected to the second step S2 shown in FIGS. 14(a) and 15(a) to the states shown in FIGS. 14(b) and 15(b) and the states in which the second step S2 are completed as shown in FIGS. 14(c) and 15(c). In addition, as the second rising portion 40A is formed, a portion of the first rising portion 10A disposed between the first upper die 310 and the first lower die 320 is away from a portion of the first rising portion 10A disposed between the second upper die 330 and the second lower die 340 in both the third direction Z and the second direction Y while a material flows from the first strip portion 20A into the second rising portion 40A.

For this reason, shear deformation can be effectively generated within a zone E in the second rising portion 40A connected to the vertical ridge line 108, in other words, a zone between a portion of the first rising portion 10A disposed between the second upper die 330 and the second lower die 340 and a portion of the first rising portion 10A disposed between the first upper die 310 and the first lower die 320. In the shear deformation, the deformation occurs without changing an area (or in a state in which a change in area is minimized). Thus, the deformation is possible without a change in member thickness (or so that a change in member thickness is minimized). Thus, it is possible to perform press-forming while minimizing a change in member thickness also within the zone E in the second rising portion 40A connected to the vertical ridge line 108 and constrained by a shape due to the first rising portion 10A.

Figure 17:
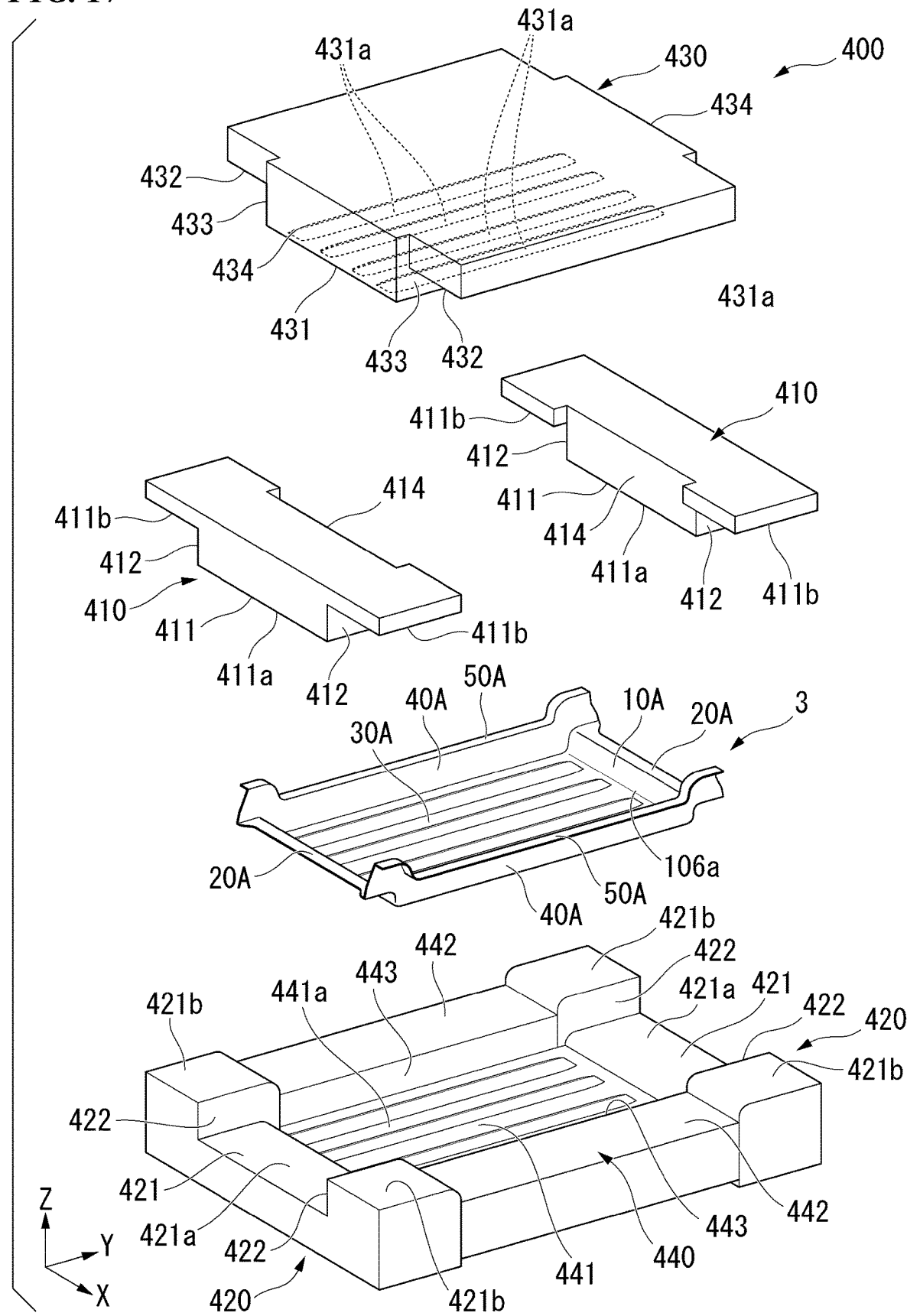
FIG. 17 is an exploded perspective view showing a die used in a third step in the method for manufacturing a press-formed article according to the first embodiment when viewed from above.

Subsequently, the third step S3 is performed. In the third step S3, a height of the first rising portion 10A from the second intermediate press-formed article 3 shown in FIG. 16 formed in the second step S2 increases. FIG. 17 shows an outline of a die of a third set 400 composed of the die used in the third step S3. As shown in FIG. 17, the die of the third set 400 includes a third upper die 410, a third lower die 420, a fourth upper die 430, and a fourth lower die 440. The third upper die 410 and the third lower die 420 have the first strip portion 20A side between the third upper die 410 and the third lower die 420 disposed from both sides using the first ridge line 106a between the base sheet portion 30A and the first rising portion 10A as a boundary. The fourth upper die 430 and the fourth lower die 440 have the base sheet portion 30A side disposed therebetween using the first ridge line 106a as a boundary.

Figure 18:
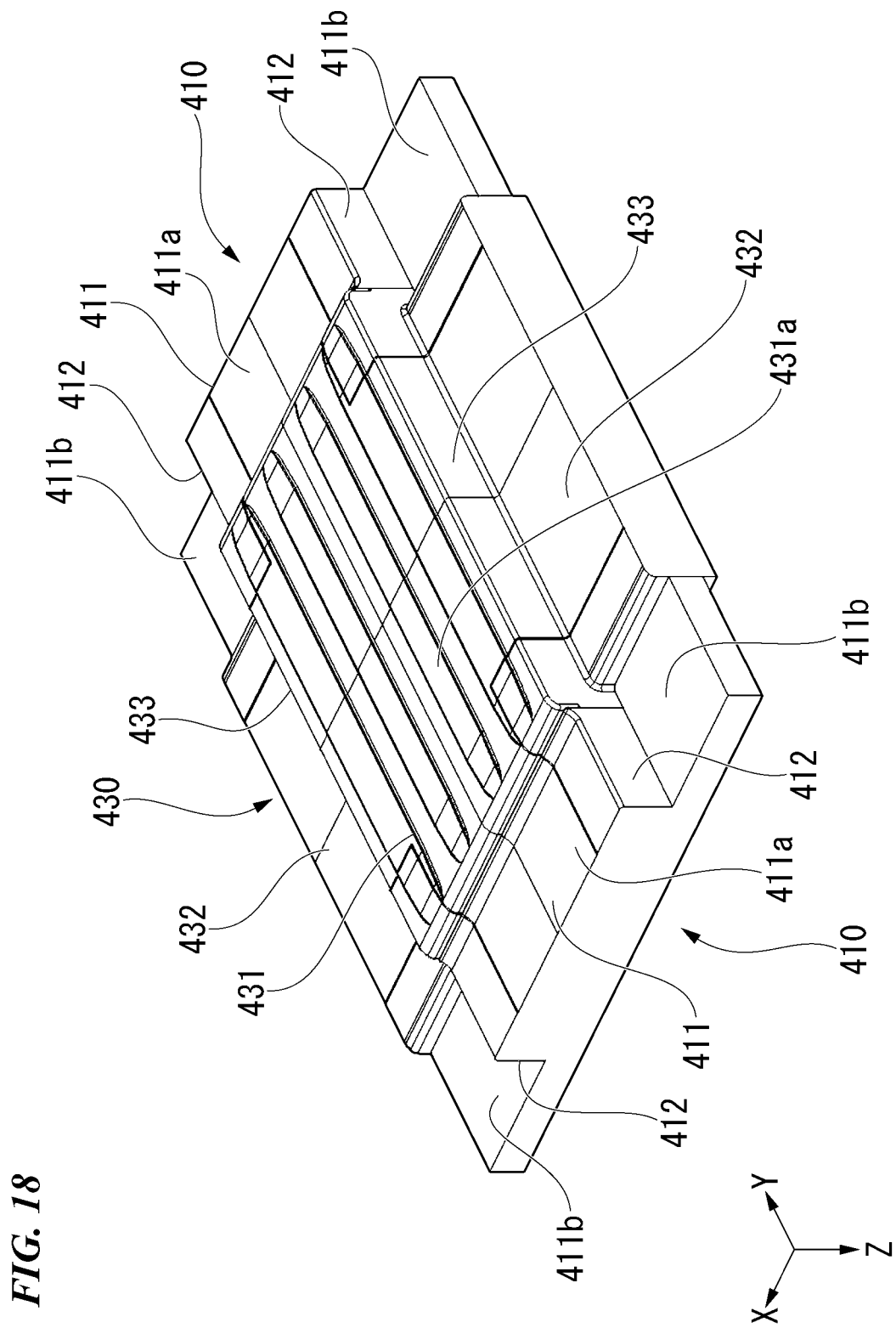
FIG. 18 is a perspective view showing an upper die of a die used in the third step in the method for manufacturing a press-formed article according to the first embodiment when viewed from below.
Figure 19:
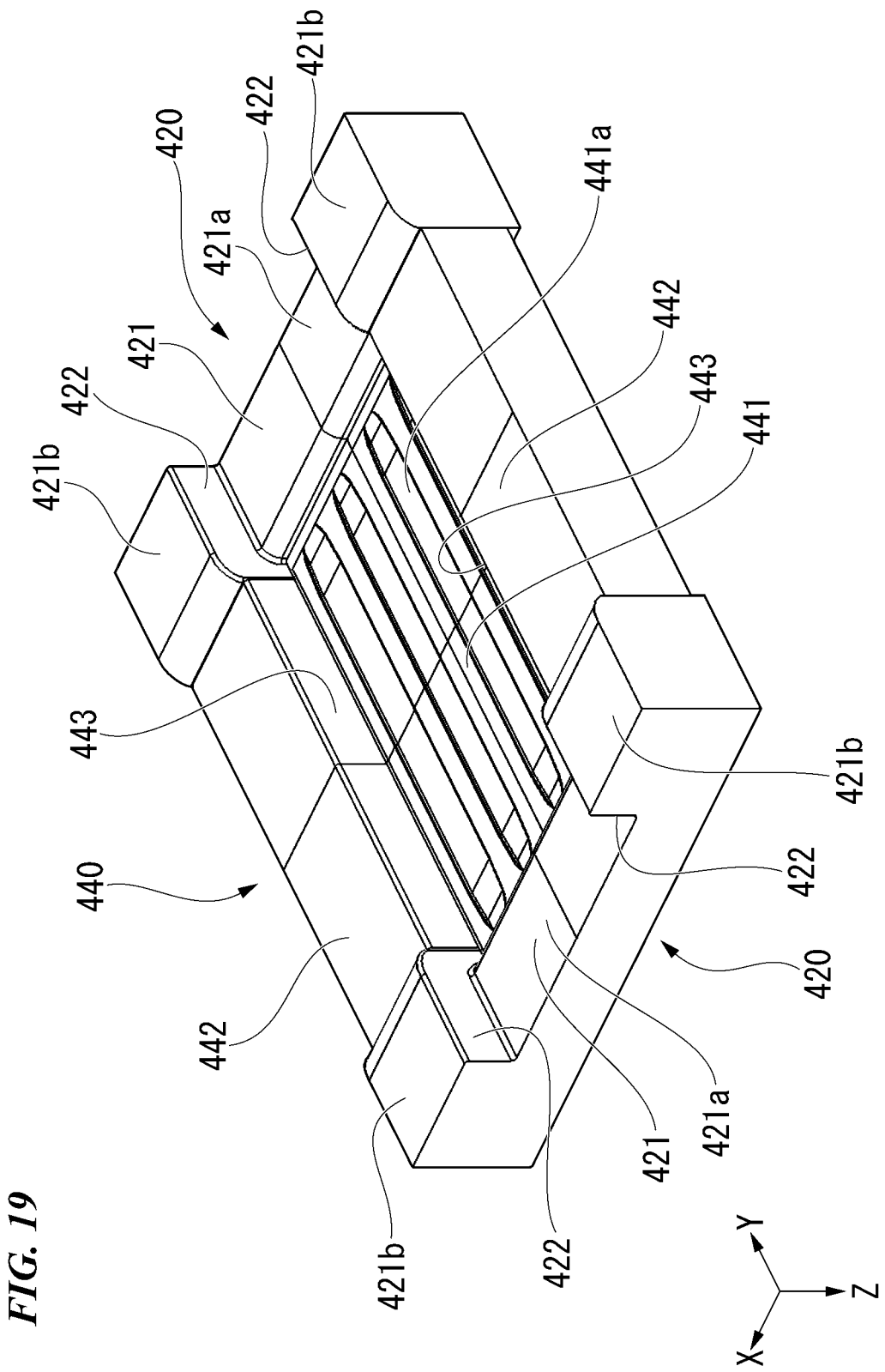
FIG. 19 is a perspective view showing a lower die of the die used in the third step in the method for manufacturing a press-formed article according to the first embodiment when viewed from above.
Figure 20:
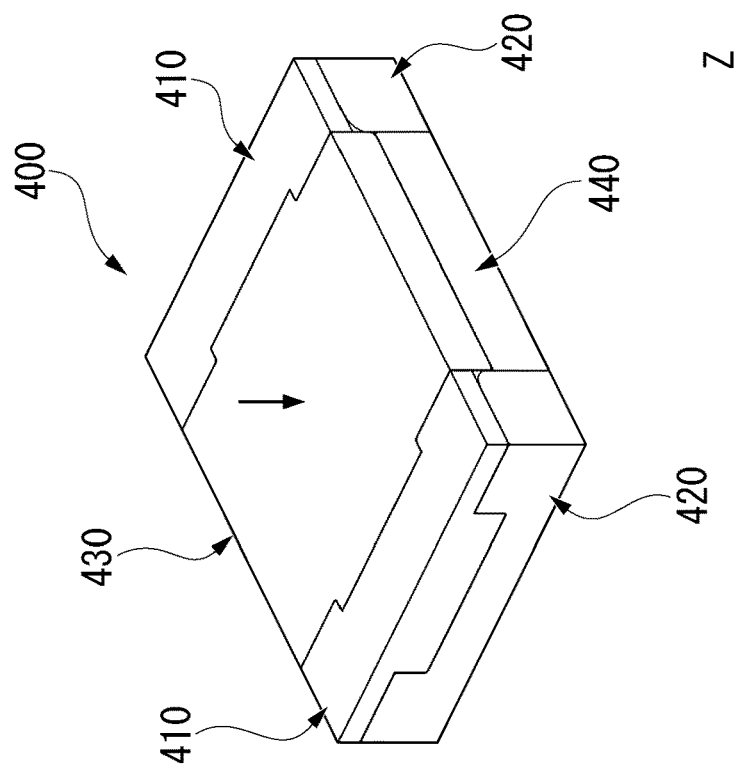
FIG. 20 is perspective views showing states of the die in the third step in the method for manufacturing a press-formed article according to the first embodiment when viewed from above, in which (a) of FIG. 20 shows a state of the die which has not been subjected to the third step and (b) of FIG. 20 shows a state of the die which has been subjected to the third step.
Figure 20:
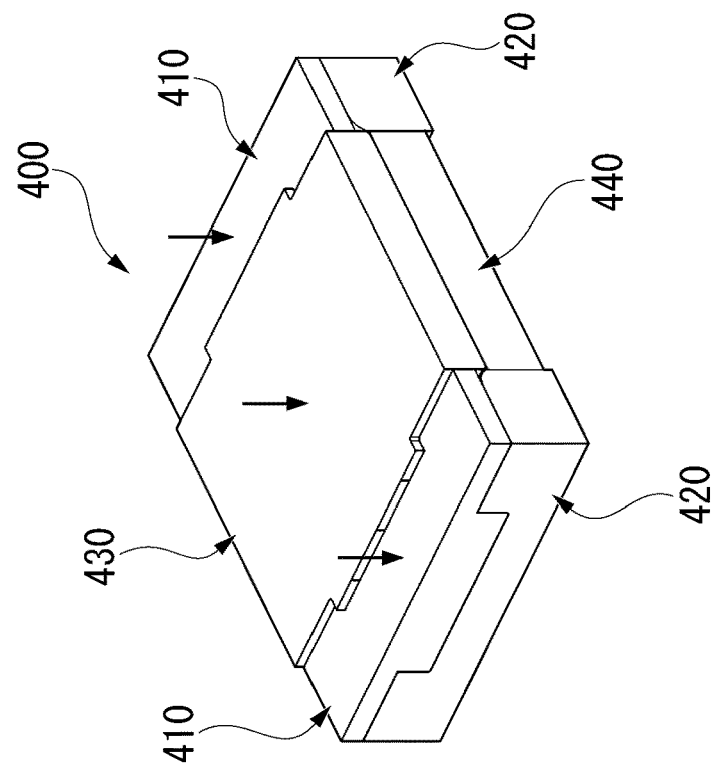

As shown in FIGS. 17 and 18, the fourth upper die 430 has a base sheet portion-side press surface 431 in contact with the upper surface 102 of the base sheet portion 30A, a strip portion-side press surface 432 in contact with an upper surface of the second strip portion 50A, and a stepped portion 433 formed between the base sheet portion-side press surface 431 and the strip portion-side press surface 432 and formed along the second rising portion 40A. Furthermore, the fourth upper die 430 has a guide surface 434 forming the first rising portion 10A. The guide surface 434 is formed on both sides in the second direction Y to cross the base sheet portion-side press surface 431, the stepped portion 433, and the strip portion-side press surface 432 as a whole in the first direction X. A convex portion 431a corresponding to the groove 104 formed in the first step S1 is formed in the base sheet portion-side press surface 431 of the fourth upper die 430. As shown in FIGS. 17 and 19, the fourth lower die 440 has a base sheet portion-side press surface (fourth bottom surface) 441 in contact with the lower surface of the base sheet portion 30A, a strip portion-side press surface (fourth flange surface) 442 in contact with a lower surface of the second strip portion 50A, and a stepped portion (fourth wall surface) 443 formed between the base sheet portion-side press surface 441 and the strip portion-side press surface 442 and formed along the second rising portion 40A. The strip portion-side press surface 442 extends from the stepped portion 443 toward a side opposite to the base sheet portion-side press surface 441. Furthermore, the second rising portion 40A formed in the second step S2 is disposed between the stepped portion 433 of the fourth upper die 430 and the stepped portion 443 of the fourth lower die 440. In addition, a concave portion 441a corresponding to the groove 104 formed in the first step S1 is formed in the base sheet portion-side press surface 441 of the fourth lower die 440.

As shown in FIGS. 17 and 18, the third upper die 410 has a strip portion-side press surface 411 in contact with the upper surface of the first strip portion 20A and a stepped portion 412 formed along the second rising portion 40A connected to the first strip portion 20A. The strip portion-side press surface 411 is separated into a first portion 411a and second portions 411b disposed on both sides of the first portion 411a in the first direction X by the stepped portion 412. Furthermore, the third upper die 410 has a guide surface 414 forming the first rising portion 10A. The guide surface 414 is formed to face the guide surface 434 of the neighboring fourth upper die 430 and cross the strip portion-side press surface 411 and the stepped portion 412 as a whole in the first direction X. The guide surface 414 of the third upper die 410 is away from the guide surface 434 of the fourth upper die 430 in the second direction Y by a dimension according to the thickness of the first rising portion 10A formed in this step and a gap is formed between them. As shown in FIGS. 17 and 19, the third lower die 420 has a strip portion-side press surface 421 in contact with the lower surface of the first strip portion 20A and a stepped portion (third wall surface) 422 formed along the second rising portion 40A connected to the first strip portion 20A. A portion of the second rising portion 40A formed in the second step S2 connected to the first strip portion 20A is disposed between the stepped portion 412 of the third upper die 410 and the stepped portion 422 of the third lower die 420. That is to say, the strip portion-side press surface 421 is separated into a first portion (third bottom surface) 421a and second portions (third flange surfaces) 421b disposed on both sides of the first portion 421a in the first direction X by the stepped portion 422. The second portions 421b extends from an upper edge of the stepped portion 422 toward a side opposite to the first portion 421a.

With the constitution of the die as described above, press-forming is performed in the third step S3 as follows. That is to say, first, the second intermediate press-formed article 3 is disposed between the third upper die 410 and the third lower die 420 and the second intermediate press-formed article 3 is disposed between the fourth upper die 430 and the fourth lower die 440. To be specific, for example, as shown in FIG. 20(a), the second intermediate press-formed article 3 is disposed therebetween by fixing the third lower die 420 and the fourth lower die 440 and moving down the third upper die 410 and the fourth upper die 430. Furthermore, surface pressure is applied to the first strip portion 20A and the second strip portion 50A of the second intermediate press-formed article 3 to prevent out-of-plane deformation. A magnitude of the surface pressure is obtained, for example, on the basis of Expression (1) as in the second step S2. In this state, the fourth upper die 430 and the fourth lower die 440 are moved relative to the third upper die 410 and the third lower die 420 downward in the third direction Z so that transition is performed from the state of FIG. 20(a) to the state of FIG. 20(b). Although the third upper die 410 and the third lower die 420 are fixed in the third direction Z and the fourth upper die 430 and the fourth lower die 440 are moved downward in the third direction Z in the embodiment, the present invention is not limited thereto. The fourth upper die 430 and the fourth lower die 440 may be fixed and the third upper die 410 and the third lower die 420 may be moved upward in the third direction Z or the two sets of the third upper die 410 and the third lower die 420 and the fourth upper die 430 and the fourth lower die 440 may be moved in the third direction Z to be relatively moved.

Here, in the second intermediate press-formed article 3, sufficient frictional resistance in which a material is prevented from flowing into both sides in the second direction Y is exerted to the base sheet portion 30A and the second strip portion 50A disposed between the fourth upper die 430 and the fourth lower die 440. The frictional resistance is provided by the surface pressure applied by the fourth upper die 430 and the fourth lower die 440 and the coefficient of friction between the fourth upper die 430 and the fourth lower die 440 and the second intermediate press-formed article 3. The coefficient of friction can be adjusted using the surface roughness of each of the press surfaces of the fourth upper die 430 and the fourth lower die 440, a type of lubricant between the fourth upper die 430 and the fourth lower die 440 and the second intermediate press-formed article 3, or the like.

Also, the first strip portion 20A disposed between the third upper die 410 and the third lower die 420 has surface pressure in which the portion is prevented from being subjected to out-of-plane deformation (deformation in the third direction Z) applied by the third upper die 410 and the third lower die 420. On the other hand, in the first strip portion 20A disposed between the third upper die 410 and the third lower die 420, the coefficient of friction between the third upper die 410 and the third lower die 420 and the second intermediate press-formed article 3 is adjusted so that the portion can be moved toward the base sheet portion 30A with the press-forming in the third step S3. The coefficient of friction can be adjusted using the surface roughness of each of the press surfaces of the third upper die 410 and the third lower die 420, a type of lubricant between the third upper die 410 and the third lower die 420 and the second intermediate press-formed article 3, or the like.

Figure 23:
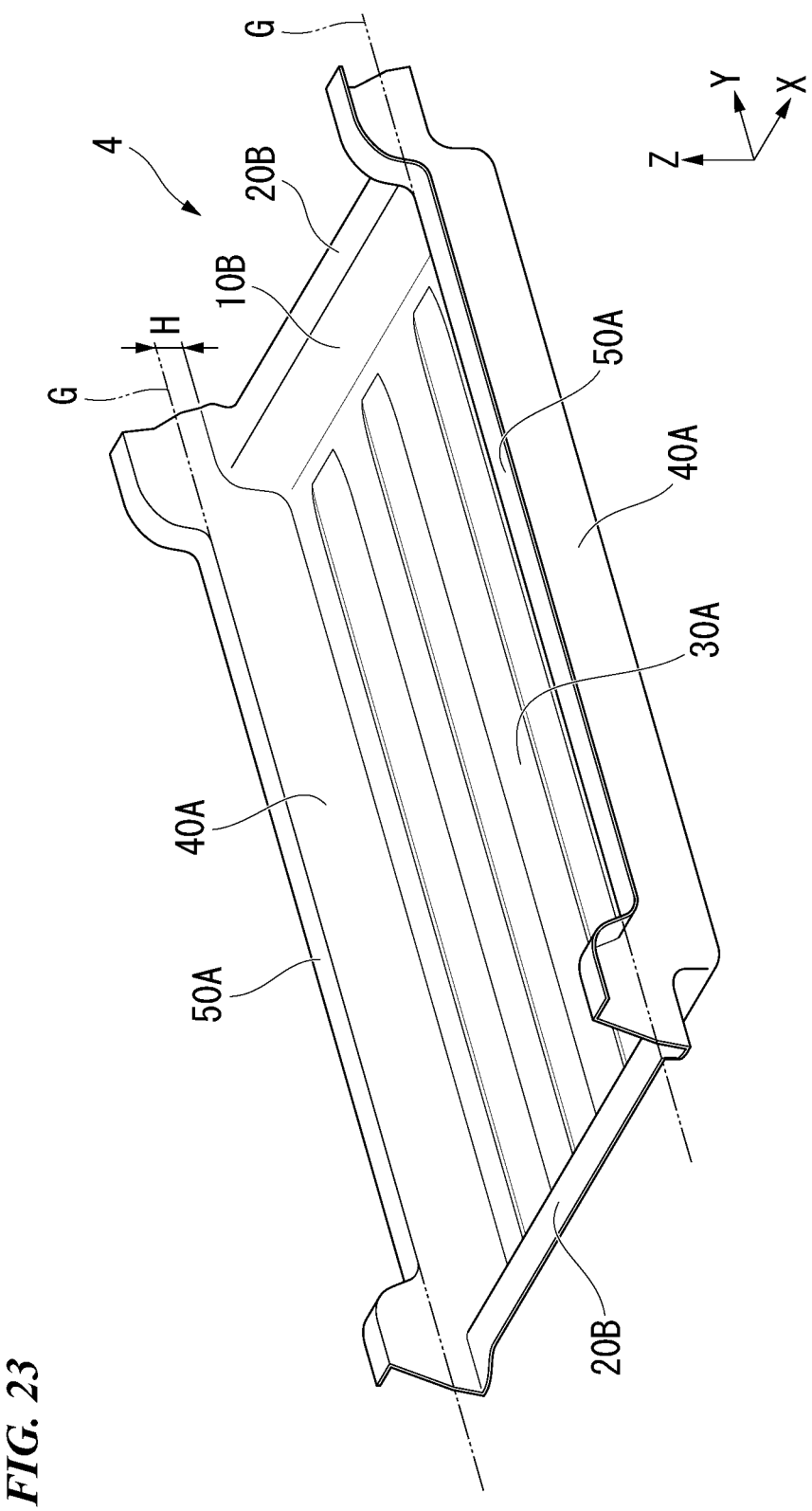
FIG. 23 is a perspective view showing a third intermediate press-formed article which has been subjected to the third step in the method for manufacturing a press-formed article according to the first embodiment when viewed from above.

Therefore, the first strip portion 20A disposed between the third upper die 410 and the third lower die 420 flows into the base sheet portion 30A side while minimizing out-of-plane deformation by moving the fourth upper die 430 and the fourth lower die 440 relative to the third upper die 410 and the third lower die 420 downward in the third direction Z and a first rising portion 10B rising upward in the third direction Z from the base sheet portion 30A is formed to be higher. Furthermore, the remaining portion in a state in which the first strip portion 20A is disposed between the third upper die 410 and the third lower die 420 forms a first strip portion 20B. Although tensile plastic deformation may be included as a deformation mode in the first rising portion 10B and the first strip portion 20B with the formation of the first rising portion 10B, it is preferable that the tensile plastic deformation is in a zone in which the member thickness after the third step S3 is performed is 85% or more as compared with that before the third step S3 is performed. Furthermore, when the first rising portion 10B reaches a prescribed height, the relative movement of the fourth upper die 430 and the fourth lower die 440 with respect to the third upper die 410 and the third lower die 420 stops. Thus, the third intermediate press-formed article 4 shown in FIG. 23 is formed. In the embodiment, a height of the first rising portion 10B which has been subjected to the third step S3 is lower than a height of the second rising portion 40A which has been subjected to the second step S2 which is an immediately previous step and is equal to a height of the first wall portion 110 of the press-formed article 100 as a finished article. In addition, a width of the first strip portion 20B is the same as or larger than a width of the first flange 130 as a finished article.

Figure 21:
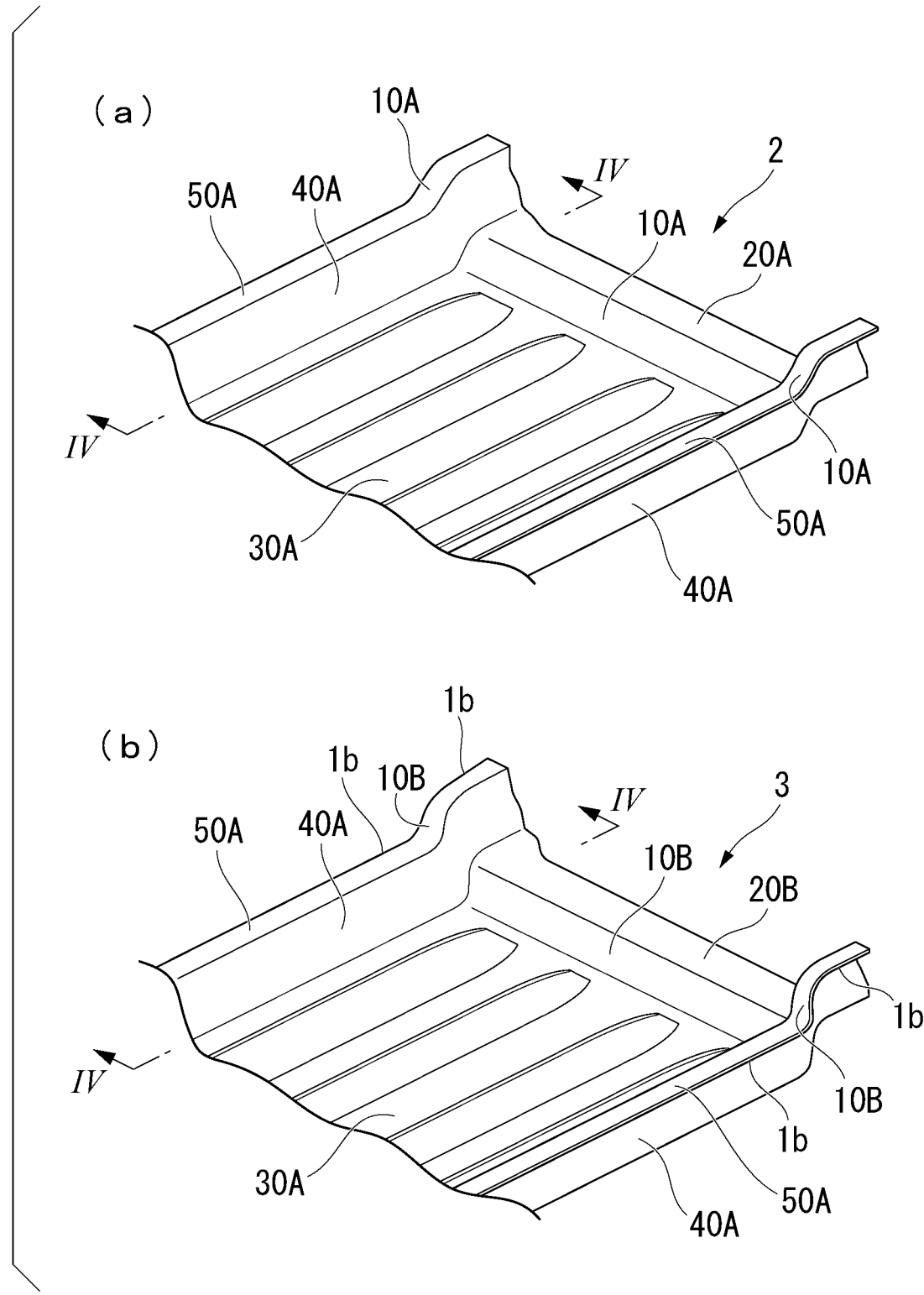
FIG. 21 is perspective views showing states of an intermediate press-formed article in the third step in the method for manufacturing a press-formed article according to the first embodiment when viewed from above, in which (a) of FIG. 21 shows a state of the intermediate press-formed article which has not been subjected to the third step and (b) of FIG. 21 shows a state of the intermediate press-formed article which has been subjected to the third step.
Figure 22:
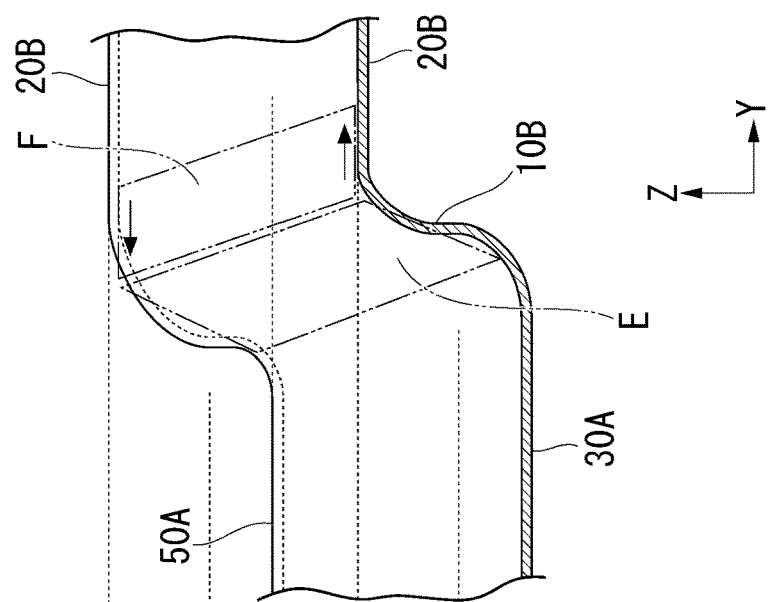
FIG. 22 is cross-sectional views taken along cross-sectional line IV-IV shown in FIG. 21 when viewed in the first direction, in which (a) of FIG. 22 shows a state of the intermediate press-formed article which has not been subjected to the third step and (b) of FIG. 22 shows a state of the intermediate press-formed article which has been subjected to the third step.
Figure 22:
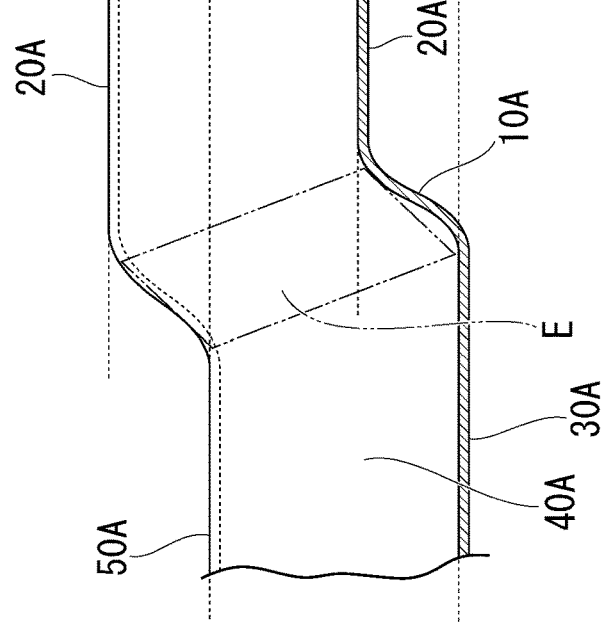

Here, in the third step S3, as the first rising portion 10B is formed, the second rising portion 40A also deforms in a zone in the vicinity of the first rising portion 10B. FIGS. 21(a) and 21(b) are detailed views showing details of the second rising portion 40A corresponding to the state of the die of FIGS. 20(a) and 20(b). Furthermore, FIGS. 22(a) and 22(b) show a state of the intermediate press-formed article when viewed in a cross-sectional view in the first direction X in the vicinity of the vertical ridge line 108 corresponding to the state of the die of FIGS. 20(a) and 20(b). As shown in FIGS. 21 and 22, of a portion of the first strip portion 20A adjacent to the second rising portion 40A, a portion located below the second rising portion 40A is constrained by the second rising portion 40A and an inflow of a material into the first rising portion 10A is relatively minimized as compared with the other portions. On the other hand, of a portion of the first strip portion 20A adjacent to the second rising portion 40A, a portion located above the second rising portion 40A is similarly constrained by the second rising portion 40A, but has a relatively small constrain force because the portion is in the vicinity of the second edge portion 1b which is a free end. For this reason, a zone F of the second rising portion 40A adjacent to the first strip portion 20A and adjacent to the zone E shear-deforming in the second step S2 can be affected by a relative difference between portions of the first strip portions 20A on both sides thereof, shear-deform in a direction along the second edge portion 1b, and follow a change in height of the first rising portion 10B. For this reason, it is possible to prevent the member thickness from decreasing due to the tensile plastic deformation of the second rising portion 40A in the vicinity of the first rising portion 10B.

Figure 24:
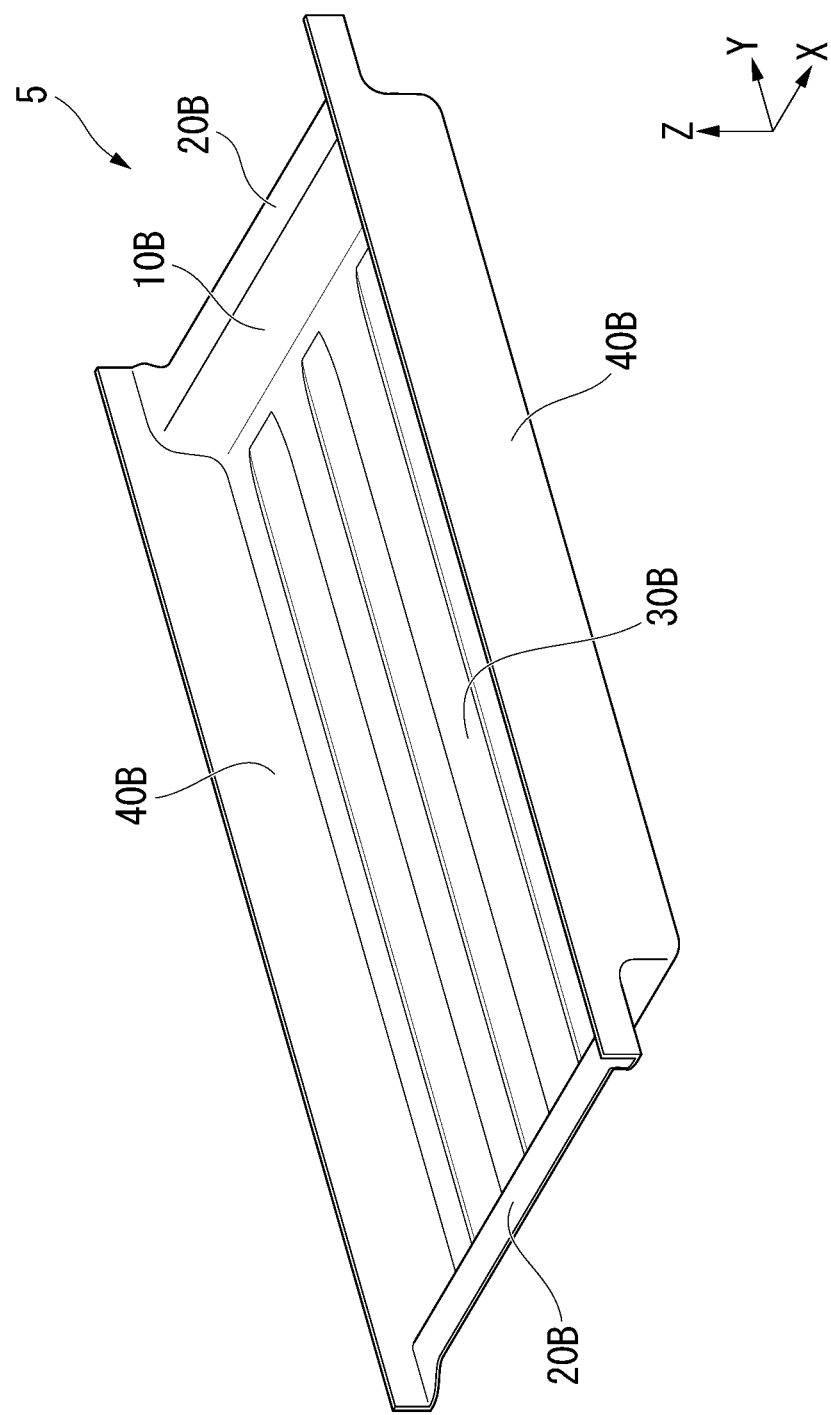
FIG. 24 is a perspective view showing a fourth intermediate press-formed article which has been subjected to a fourth step in the method for manufacturing a press-formed article according to the first embodiment when viewed from above.

Subsequently, the fourth step S4 is performed. In the fourth step S4, an unnecessary portion of the intermediate press-formed article formed when the first step S1 to the third step S3 are performed is cut out. To be specific, as shown in FIG. 23, in the embodiment, the second rising portion 40A of the third intermediate press-formed article 4 which has been subjected to the third step S3 is cut out along a cutting line G having a prescribed height H from an upper surface of the first strip portion 20B. The prescribed height H is set to have a size of a width or more of the second flange 140 of the press-formed article 100 which is a finished article. Thus, as shown in FIG. 24, the remaining portion of the second rising portion 40A obtained by removing a portion thereof higher than the prescribed height H from the first strip portion 20B is a second rising portion 40B and a fourth intermediate press-formed article 5 from which the second strip portion 50A is removed is formed.

Figure 25:
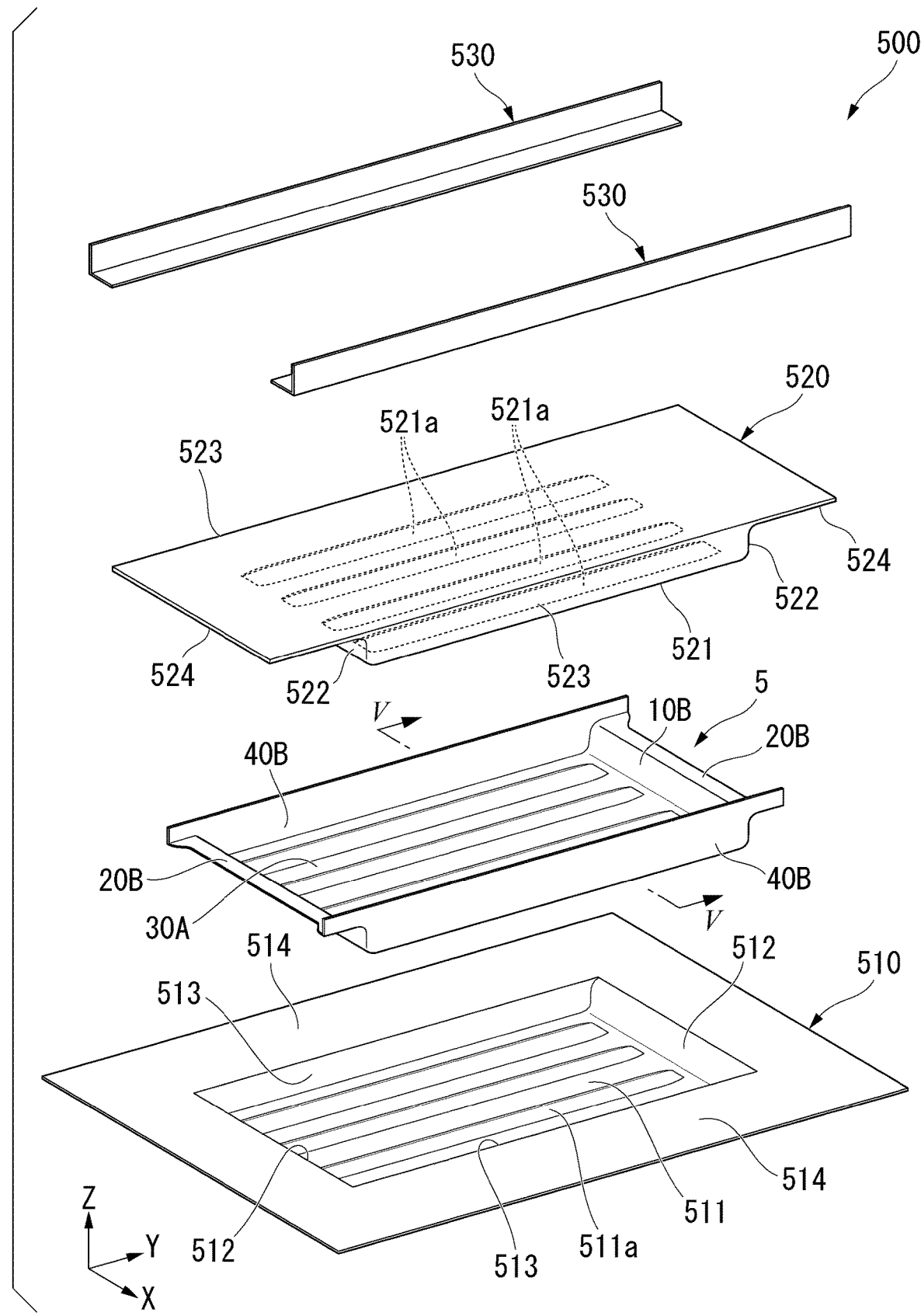
FIG. 25 is an exploded perspective view showing a die used in a fifth step in the method for manufacturing a press-formed article according to the first embodiment when viewed from above.

Subsequently, the fifth step S5 is performed. In the fifth step S5, a portion which will be the second flange 140 is formed from the fourth intermediate press-formed article 5. FIG. 25 shows an outline of a die 500 used in the fifth step S5. As shown in FIG. 25, the die 500 used in the fifth step S5 has a punch 510 which supports the fourth intermediate press-formed article 5, a pad 520 which has the fourth intermediate press-formed article 5 disposed between the pad 520 and the punch 510, and dies 530 in which the second rising portion 40B can be bent. The punch 510 includes a first support surface 511 which supports the lower surface of the base sheet portion 30A of the fourth intermediate press-formed article 5, a second support surface 512 which supports the first rising portion 10B, a third support surface 513 which supports the second rising portion 40B of the fourth intermediate press-formed article 5, and a fourth support surface 514 which supports a portion which will be the second flange 140 which has been subjected to bending processing using the first strip portion 20B and the dies 530. A concave portion 511a corresponding to the ridge 105 formed in the first step S1 is formed in the first support surface 511. Furthermore, the pad 520 has a first contact surface 521 which is in contact with the upper surface of the base sheet portion 30A of the fourth intermediate press-formed article 5, a second contact surface 522 which supports the first rising portion 10B, a third contact surface 523 which is in contact with the second rising portion 40B of the fourth intermediate press-formed article 5, and a fourth contact surface 524 which is in contact with the first strip portion 20B. A convex portion 521a corresponding to the groove 104 formed in the first step S1 is formed on the first contact surface 521. Furthermore, the pair of dies 530 are provided to correspond to the second rising portion 40B and disposed in the second direction Y. The pair of dies 530 can be moved in the first direction X so that a separation distance from each other is a distance in which the pair of dies 530 is close to each other.

Figure 26:
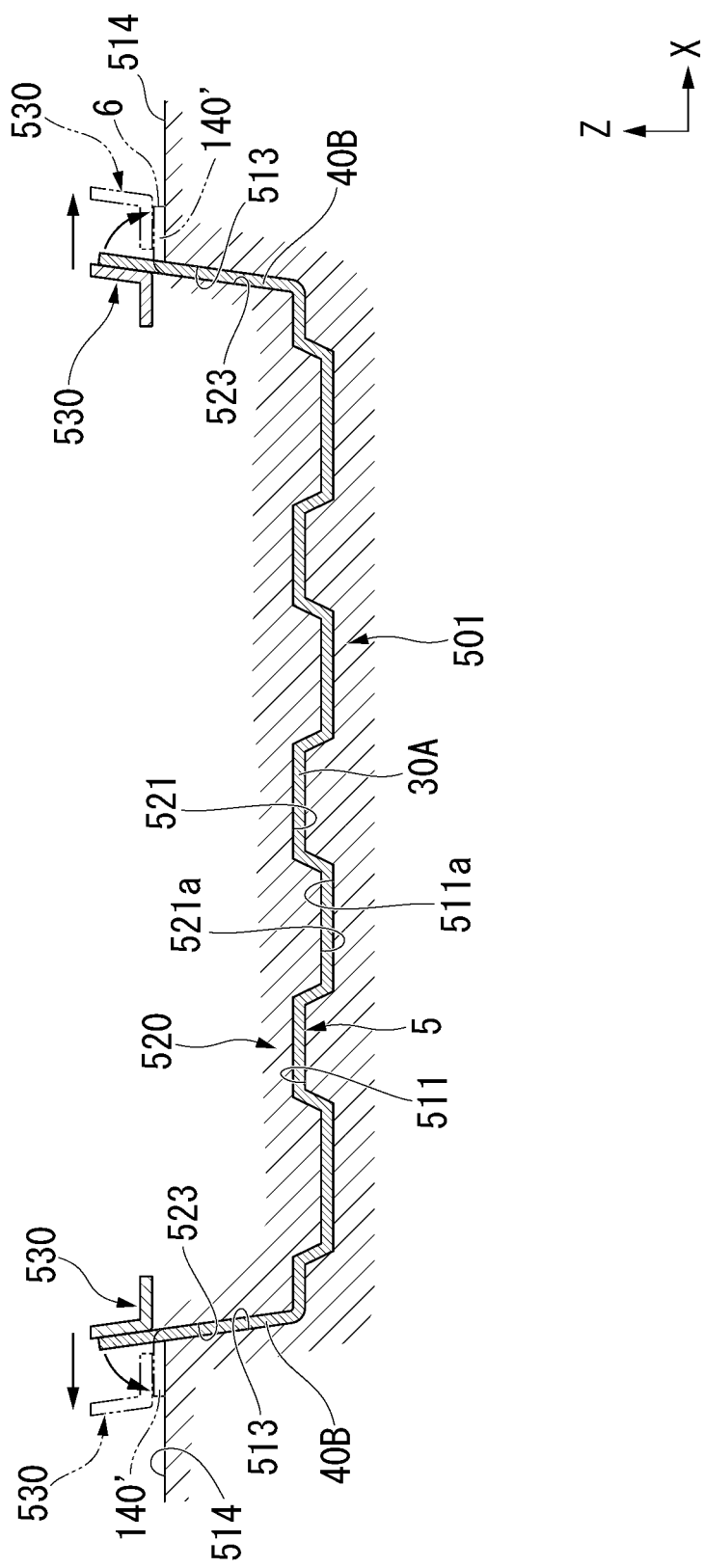
FIG. 26 is a cross-sectional view taken along cross-sectional line V-V shown in FIG. 25 when viewed in the second direction.

Also, the fourth intermediate press-formed article 5 is disposed on the punch 510 and is disposed between the pad 520 and the punch 510. In this state, as shown in FIG. 26, a fifth intermediate press-formed article 6 shown in FIG. 27 in which a portion 140' which will be the second flange 140 is formed is formed by bending a portion of the second rising portion 40B further projecting than the first strip portion 20B outward by disposing the dies 530 inside the second rising portion 40A in the first direction X and moving them outward in the first direction X. At this time, an upper surface of the portion 140' which will be the second flange 140 and the upper surface of the first strip portion 20A are bent to be continuous on the same surface.

Figure 27:
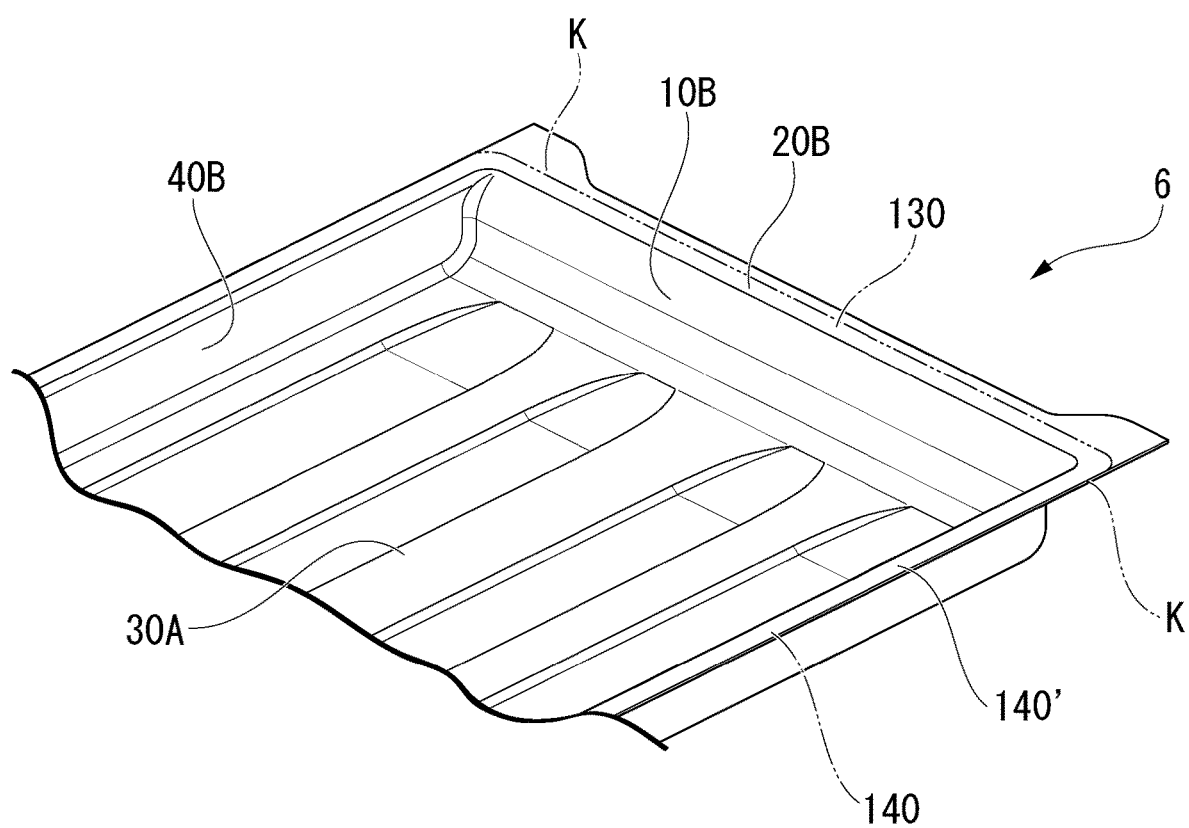
FIG. 27 is a partial perspective view showing a fifth intermediate press-formed article which has been subjected to the fifth step in the method for manufacturing a press-formed article according to the first embodiment when viewed from above.

Finally, as the sixth step S6, as shown in FIG. 27, the press-formed article 100 shown in FIG. 1 is completed by cutting out an outer edge side of the first strip portion 20A to have a necessary width as the first flange 130 using a cutting line K and cutting out an outer edge side of the portion 140' which will be the second flange 140 formed in the fifth step S5 to have a necessary width as the second flange 140 using the cutting line K.

As described above, according to a method for manufacturing the press-formed article 100 according to the embodiment, in the second step S2, in the zone which has been the base sheet portion 30A in the state after the first step S1, it is possible to minimize a decrease in member thickness of the second rising portion 40A by allowing a material of a part of the portion disposed between the first upper die 310 and the first lower die 320 to flow into the second rising portion 40A as the second rising portion 40A is formed. Furthermore, similarly, in the zone which has been the first strip portion 20A in the state after the first step S1, it is possible to minimize a decrease in member thickness of the second rising portion 40A by allowing a material of a part of the portion disposed between the first upper die 310 and the first lower die 320 to flow into the second rising portion 40A as the second rising portion 40A is formed. On the other hand, of a portion which will be the second rising portion 40A in the state after the first step S1, a portion between a zone which has been the base sheet portion 30A and a zone which has been the first strip portion 20A, that is, a portion of the second rising portion 40A connected to the vertical ridge line 108 to which the first rising portion 10A and the second rising portion 40A are connected, is shear-deformed in the second step S2. Thus, it is possible to perform plastic deformation to have a desired shape to follow the formation of the second rising portion 40A while minimizing a change in member thickness. Moreover, when a place which has shear-deformed is formed to have a thickness of 85% or more of a thickness of a workpiece (blank) which has not been the first step S1, it is possible to minimize a decrease in member thickness to a minimum.

Also, as described above, in the second step S2, each of the first upper die 310 and the first lower die 320 is composed of the end dies 310A and 320A of a workpiece (intermediate press-formed article) having at least the first strip portion 20A and the first rising portion 10A disposed therebetween and the center dies 310B and 320B disposed at intervals with respect to the end dies 310A and 320A and having the base sheet portion 30A side of the workpiece disposed between with respect to the first rising portion 10A thereof and the end dies 310A and 320A of the first upper die 310 and the first lower die 320 are moved to become closer to the center dies 310B and 320B as the first upper die 310 and the first lower die 320 are moved relative to the second upper die 330 and the second lower die 340. In this way, when the end dies 310A and 320A are moved relative to the center dies 310B and 320B so that a gap between them narrows, it is possible to effectively shear-deform a portion of the second rising portion 40A located between the center dies 310B and 320B and the end dies 310A and 320A and connected to the vertical ridge line 108 when viewed in a direction along a first edge portion 1a (first direction X). Furthermore, when the gaps M1 and M2 between the end dies 310A and 320A and the center dies 310B and 320B are formed to have the intermediate portions M1c and M2c along the second edge portion 1b in the middle of the direction along the first edge portion 1a, it is possible to prevent the surface pressure of the first upper die 310 and the first lower die 320 from decreasing in the zone in which the gaps M1 and M2 are formed.

The number of divisions of the first upper die 310 and the first lower die 320 is not limited to three divisions such as the pair of end dies 310A and 320A and the center dies 310B and 320B as described above. As the first upper die 310 and the first lower die 320 are moved relative to the second upper die 330 and the second lower die 340 in the third direction Z, the end dies 310A and 320A moving in the second direction Y may be constituted to include the first rising portion 10A and have the workpiece disposed therebetween. For example, the pair of end dies 310A and 320A may have a gap and the center die may be omitted or the pair of end dies 310A and 320A may be disposed to have a plurality of center dies disposed in the second direction Y with gaps from each other. Furthermore, the gap M1 has the outer portions M1$a$ and M2$a$ and the inner portions M1$b$ and M2$b$ in the first direction X and the intermediate portions M1$c$ and M2$c$ in the second direction Y, but the present invention is not limited thereto. For example, also when the gap M1 is formed to have a straight line shape to be inclined in the second direction Y with respect to the first direction X, it is possible to prevent the surface pressure from decreasing at a position in which the gap M1 is formed in the second direction Y. In addition, when an influence of the decrease in surface pressure is small, the gap M1 may be a gap having a straight line shape in which the gap extends in the first direction X.

Also, in the embodiment, when the third step S3 is performed, it is possible to minimize an amount of shear-deformation in one processing in the second step S2 by minimizing the height of the first rising portion 10A in the first step S1 and it is possible to form the first rising portion 10B at a prescribed height. At this time, as the first rising portion 10A rises, when a necessary material flows in from the first strip portion 20A, a decrease in member thickness of the first rising portion 10A is minimized. Here, in a portion of the second rising portion 40A adjacent to the first strip portion 20A, when a zone adjacent to a zone which has shear-deformed in the second step S2 is shear-deformed in a direction along the second edge portion 1$b$ (second direction Y), it is possible to plastically deform the portion to have a desired shape to follow the formation of the first rising portion 10A while minimizing a change in member thickness. Moreover, when the portion to be shear-deformed is formed to have a thickness of 85% or more of the thickness of the workpiece before the second step S2 is performed, it is possible to minimize a decrease in member thickness to a minimum.

Figure 28:
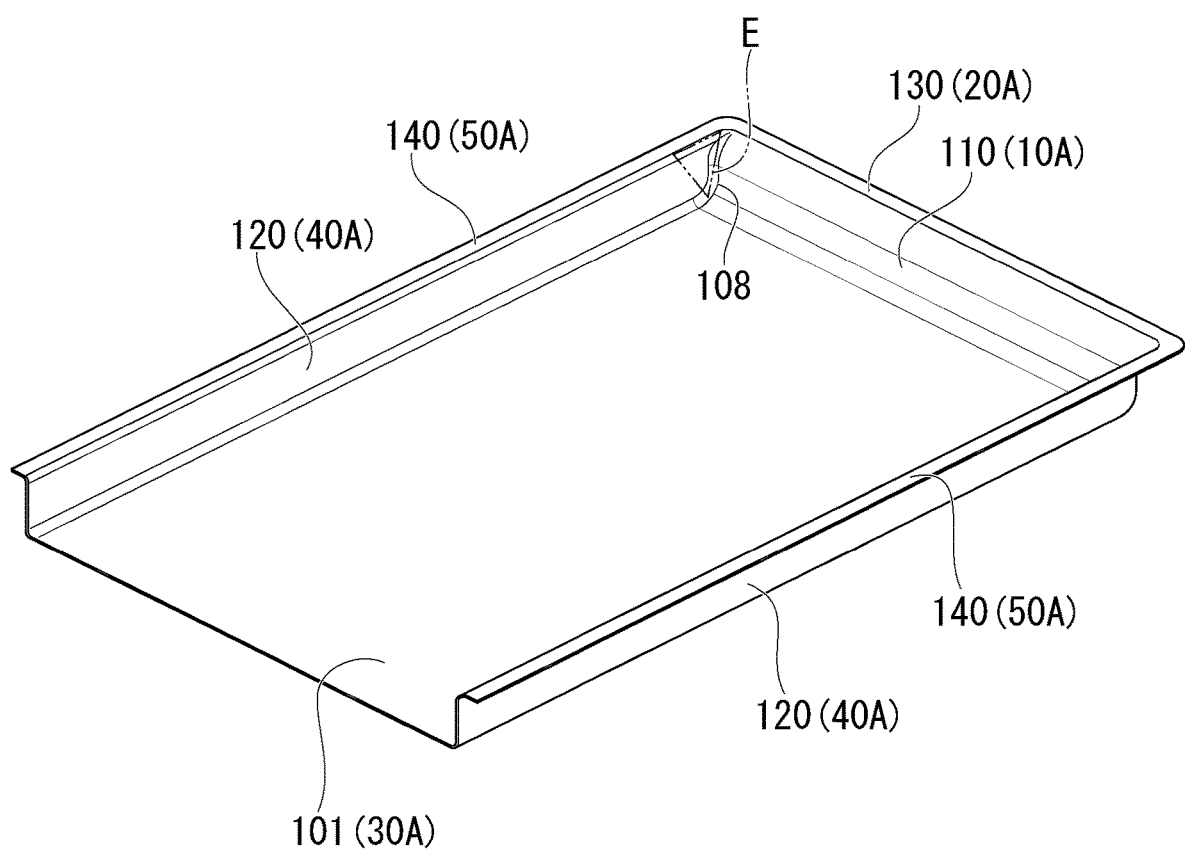
FIG. 28 is a perspective view showing a first modified example of the press-formed article manufactured in the method for manufacturing a press-formed article according to the first embodiment when viewed from above.
Figure 29:
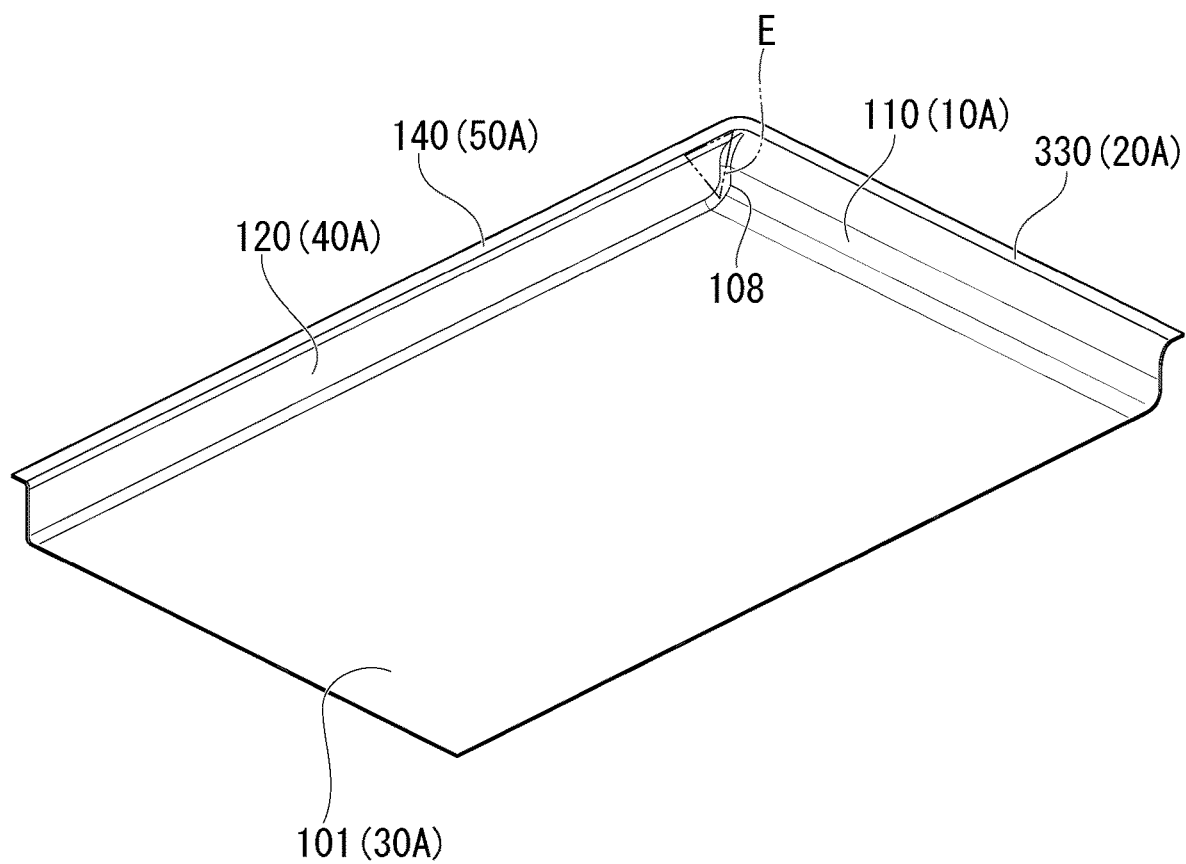
FIG. 29 is a perspective view showing a second modified example of the press-formed article manufactured in the method for manufacturing a press-formed article according to the first embodiment when viewed from above.

Also, in the embodiment, when each of the pair of first edge portions 1$a$ is subjected to the first step S1, each of the pair of second edge portions 1$b$ is subjected to the second step S2, and each of the pair of the first edge portion 1$a$ is subjected to the third step S3, it is possible to form a box body so that the pair of first rising portions 10A and the pair of second rising portions 40A surround the base sheet portion 30A, and thus for example, it is possible to form a box body whose one side is open such as a battery case while minimizing a decrease in member thickness. The method for manufacturing a press-formed article in the embodiment is not limited to the method for producing a box body and can be applied to the shapes shown in FIGS. 28 and 29. That is to say, as shown in FIG. 28, a portion rising from the bottom sheet portion 101 (base sheet portion 30A) may be formed in a U shape when viewed in the third direction Z so that the first wall portion 110 (first rising portion 10A or 10B) is formed on only one side of the rectangular bottom sheet portion 101 (base sheet portion 30A) and the second wall portions 120 (second rising portions 40A) are formed on both sides of the first wall portion 110 (first rising portion 10A or 10B). Furthermore, as shown in FIG. 29, a portion rising from the bottom sheet portion 101 (base sheet portion 30A) may be formed in an L shape when viewed in the third direction Z so that the first wall portion 110 (first rising portion 10A or 10B) is formed on only one side of the rectangular bottom sheet portion 101 (base sheet portion 30A) and the second wall portion 120 (second rising portion 40A) is formed on one side of the first wall portion 110 (first rising portion 10A or 10B). In addition, although the bottom sheet portion 101 (base sheet portion 30A) is formed in a rectangular shape and the first wall portion 110 (first rising portion 10A or 10B) and the second wall portion 120 (second rising portion 40A) are formed to be orthogonal to each other when viewed in the third direction Z in the embodiment, the present invention is not limited thereto. The bottom sheet portion 101 (base sheet portion 30A) may be a parallelogram, a rhombus, or a polygon other than a rectangle and the first wall portion 110 (first rising portion 10A or 10B) and the second wall portion 120 (second rising portion 40A) may intersect each other at an angle other than a right angle when viewed in the third direction Z. It is applicable when two wall portions rising from side edges of the bottom sheet portion 101 (base sheet portion 30A) adjacent to each other are formed and the same effect can be obtained by performing shear deformation in a zone including the vertical ridge line 108 connected to the first rising portion 10A when at least the second rising portion 40A is formed.

Furthermore, in the embodiment, the fourth step S4 of cutting out the second rising portion 40A, along the second edge portion 1$b$, at a height position between the second strip portion 50A disposed between the first upper die 310 and the first lower die 320 and the first strip portion 20A after the step of the second step S2 and the third step S3 which has been finally performed and the fifth step S5 of bending a portion of the second rising portion 40A rising above the first strip portion 20A so that the portion is a surface continuous with the first strip portion 20A after the fourth step S4 is performed are performed. Thus, flange-shaped strip portions connected to upper edges of the first rising portion 10A and the second rising portion 40A can be formed to form a continuous surface.

Here, although the press-formed article 100 is manufactured by performing the first step S1 to the sixth step S6 in the embodiment, the present invention is not limited thereto. At least the first step S1 and the second step S2 are performed, and in the second step S2, the press-formed article having a desired shape may be formed by shear-deforming the zone E in the second rising portion 40A shown in FIG. 14 connected to the vertical ridge line 108. That is to say, a press-formed article which is a finished article may have a shape after the second step S2 is performed or a shape after the third step S3 is performed. In addition, a press-formed article which is a finished article may have a shape after any of the steps is performed by performing the fourth step S4, the fourth and fifth steps S4 and S5 or the fourth step S4 to the sixth step S6 after the second step S2 is performed or after the third step S3 is performed.

Furthermore, the second step S2 may be further performed after the third step S3 is performed, the third step S3 may be further performed after the second step S2 is performed, the second step S2 and the third step S3 may be alternately performed at least once each, or any one of the second step S2 and the third step S3 may be performed a plurality of times. In this way, when the formation of the first rising portion 10A and the second rising portion 40A is divided into a plurality of times, it is possible to minimize an amount of shear-deformation in one process in each process. Moreover, after any one of the second step S2 and the third step S3 is performed a plurality of times, a press-formed article which is a finished article may have a shape after the performing. In addition, a press-formed article which is a finished article may have a shape after any of the steps is performed by performing the fourth step S4, the fourth and fifth steps S4 and step S5, or the fourth step S4 to the sixth step S6 after the second step S2 is performed or after the third step S3 is performed.

Figure 15:
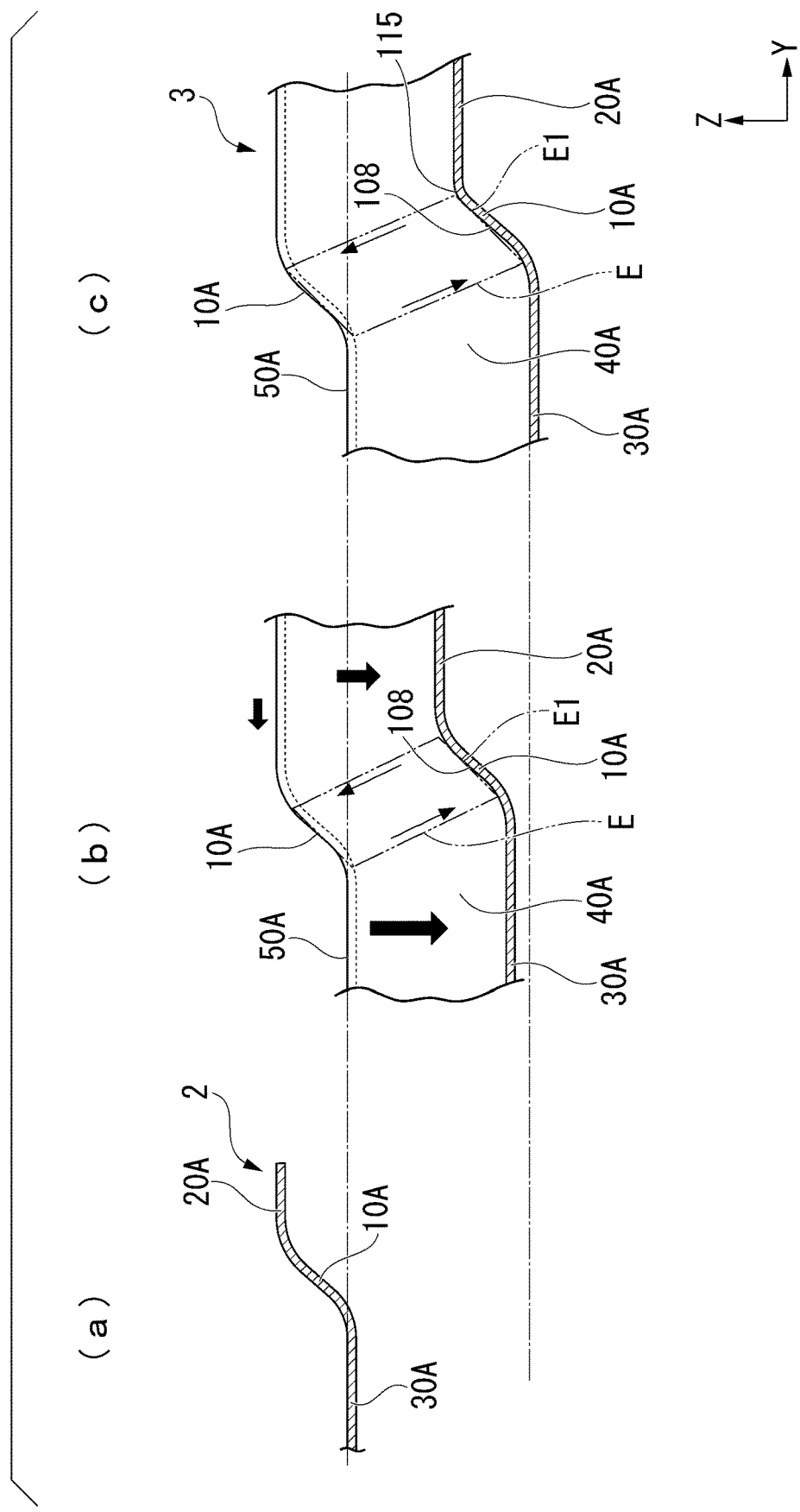
FIG. 15 is cross-sectional views taken along cross-sectional line IV-IV shown in FIG. 14 when viewed in the first direction, in which (a) of FIG. 15 shows a state of the intermediate press-formed article which has not been subjected to the second step, (b) of FIG. 15 shows a state of the intermediate press-formed article which is being subjected to the second step, and (c) of FIG. 15 shows a state of the intermediate press-formed article which has been subjected to the second step.
Figure 30:
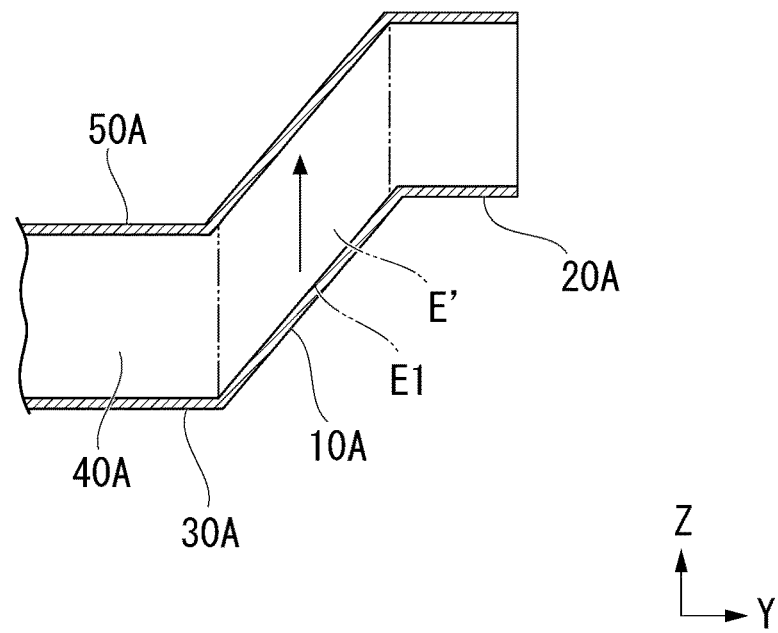
FIG. 30 is a cross-sectional view showing a third modified example of a deformation mode of shear deformation performed in the second step in the method for manufacturing a press-formed article according to the first embodiment when viewed in the first direction.
Figure 31:
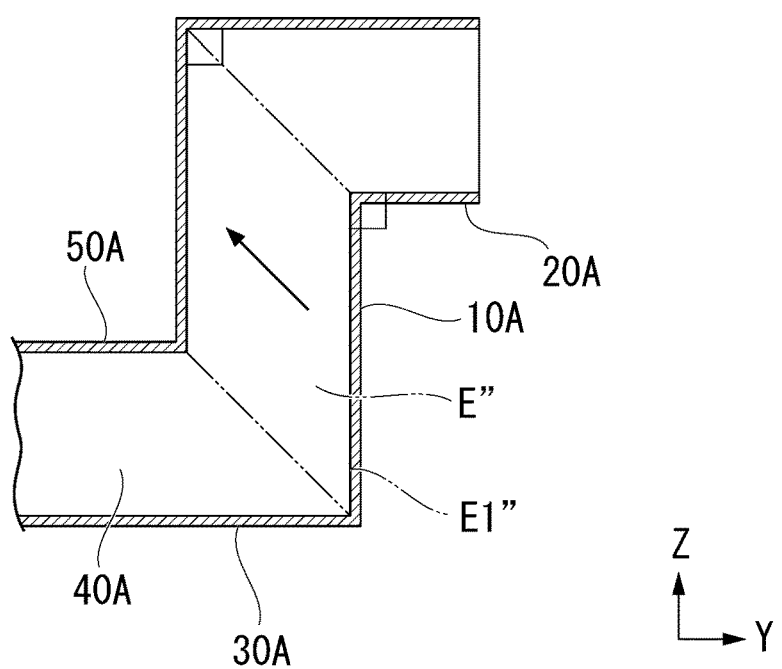
FIG. 31 is a cross-sectional view showing a fourth modified example of a deformation mode of shear deformation performed in the second step in the method for manufacturing a press-formed article according to the first embodiment when viewed in the first direction.

Also, as shown in FIG. 15, although the zone E of the second rising portion 40A connected to the vertical ridge line 108 is defined as a zone of a parallelogram in which a side E1 is parallel-translated in a direction inclined in the second direction Y with respect to the third direction Z, a convex curved portion forming the third ridge line 115 between the first wall portion 110 and the first flange 130 in the press-formed article 100 being defined as the side E1 inclined in the third direction Z in a portion of the press-formed article 100 including the convex curved portion and connecting the first rising portion 10A to the second rising portion 40A, and shear deformation is performed on the zone E in the second step S2 described above, the present invention is not limited thereto. FIGS. 30 and 31 show modified examples. As shown in FIG. 30, shear deformation may be performed in a zone E' of the parallelogram in which the inclined side E1 is parallel-translated in the third direction Z. For example, in the second step S2 described above, it is possible to realize it by moving the second upper die 330 and the second lower die 340 relative to the first upper die 310 and the first lower die 320 in the third direction Z without moving the end dies with respect to the center die. Furthermore, the shear deformation is not limited to the zone of the parallelogram including the inclined side. As shown in FIG. 31, one side of the zone E" in which shear deformation is caused may be set as a side E1" parallel to the third direction Z and the side may be shear-deformed as a zone of a parallelogram in which the side is parallel-translated in a direction inclined in the second direction Y with respect to the third direction Z. Shear deformation may be caused in a zone in which at least a direction along the side forming the vertical ridge line 108 connecting the first rising portion 10A to the second rising portion 40A formed in the second step S2 and a direction in which shear deformation is caused are not parallel or orthogonal to each other.

Second Embodiment

A second embodiment of the present invention will be described below. FIGS. 32 to 35 show the second embodiment of the present invention. Members in this embodiment that are the same as the members used in the embodiment described above are denoted by the same reference numerals and description thereof will be omitted.

Figure 32:
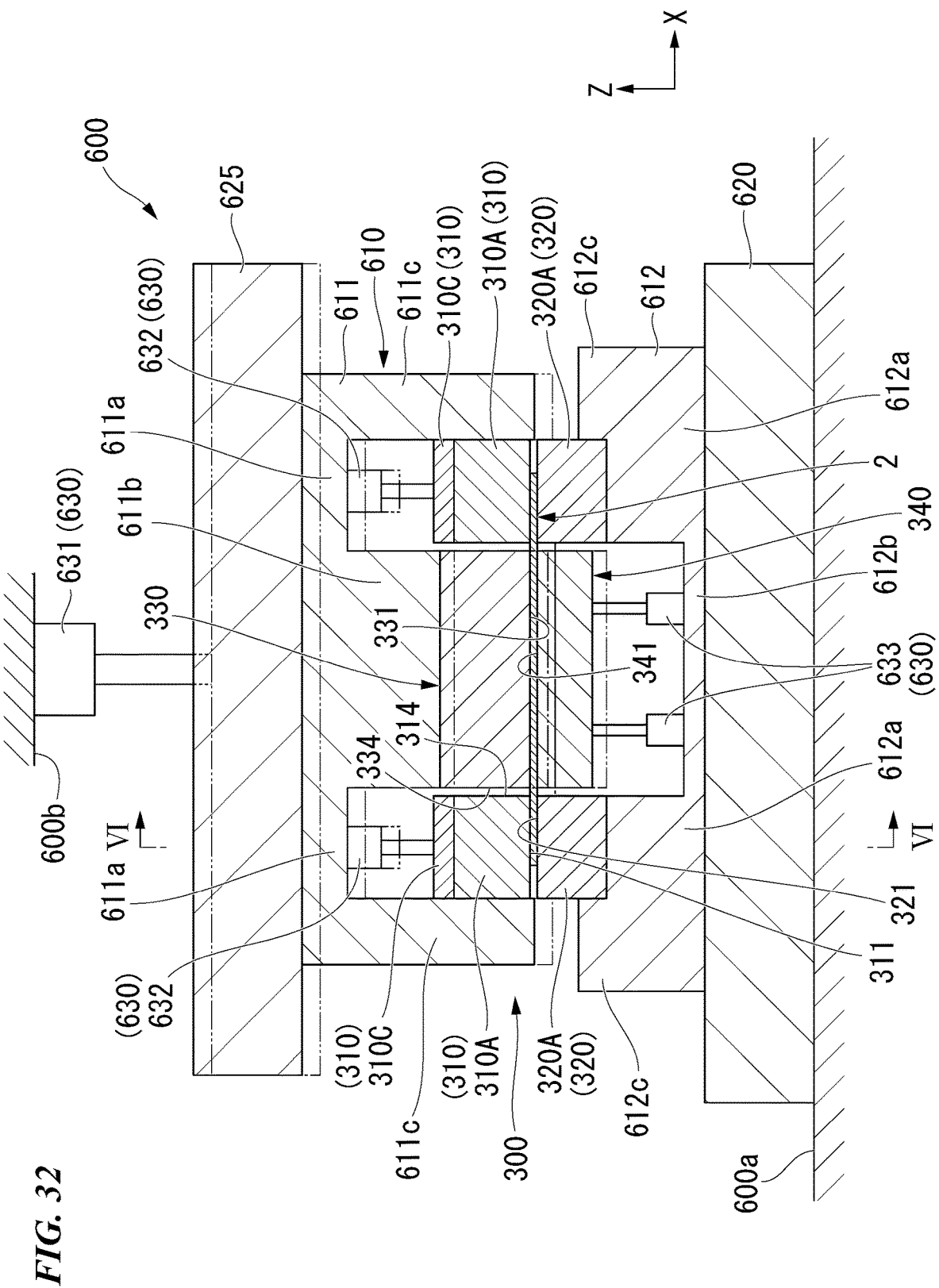
FIG. 32 shows an outline of a press-forming apparatus according to a second embodiment, shows an apparatus used in the second step in the method for manufacturing a press-formed article according to the first embodiment, and is a cross-sectional view taken along cross-sectional line VII-VII in FIG. 33.
Figure 33:
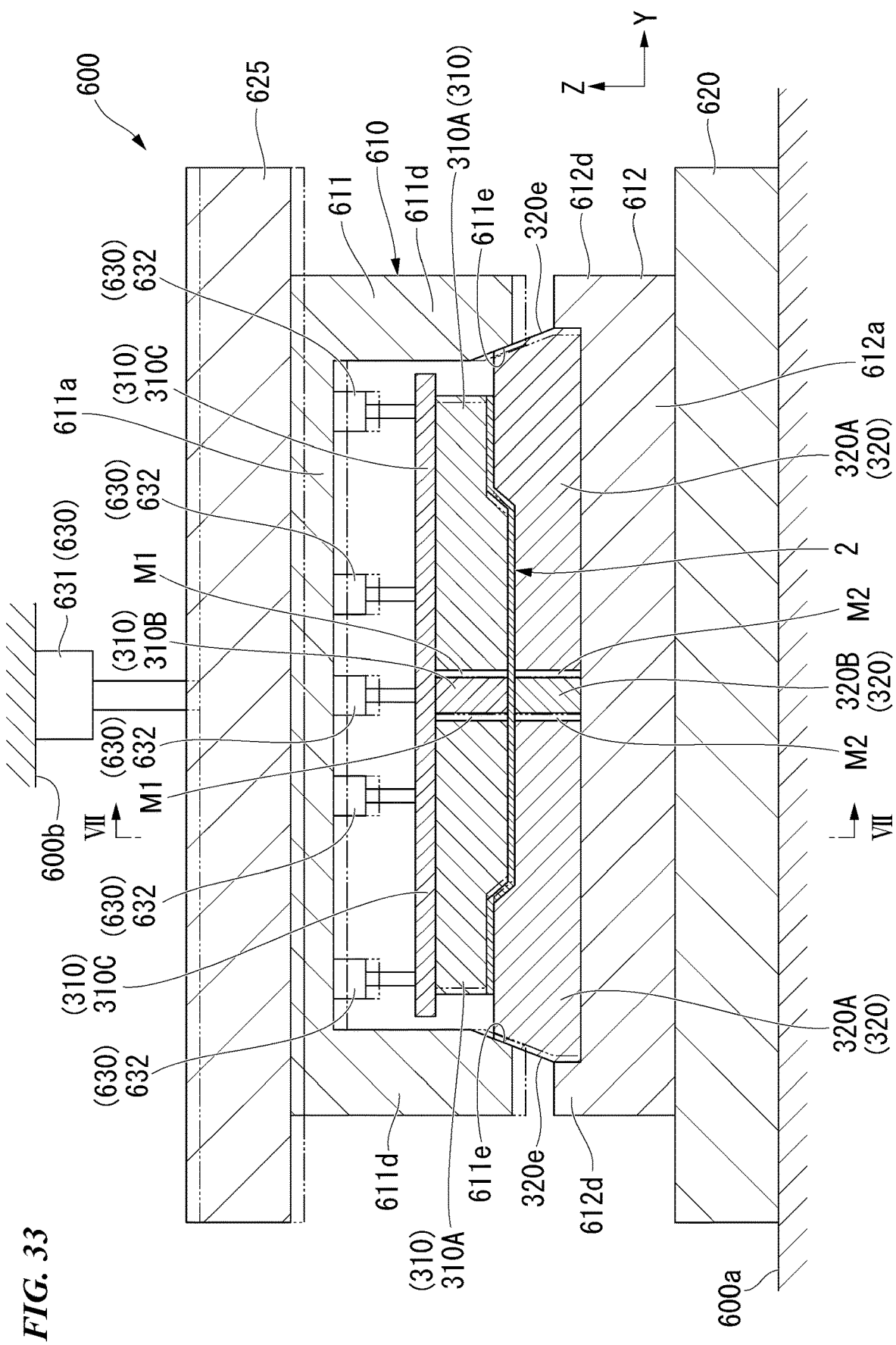
FIG. 33 shows an outline of the press-forming apparatus according to the second embodiment, shows the device used in the second step in the method for manufacturing a press-formed article according to the first embodiment, and is a cross-sectional view taken along cross-sectional line VI-VI in FIG. 32.
Figure 34:
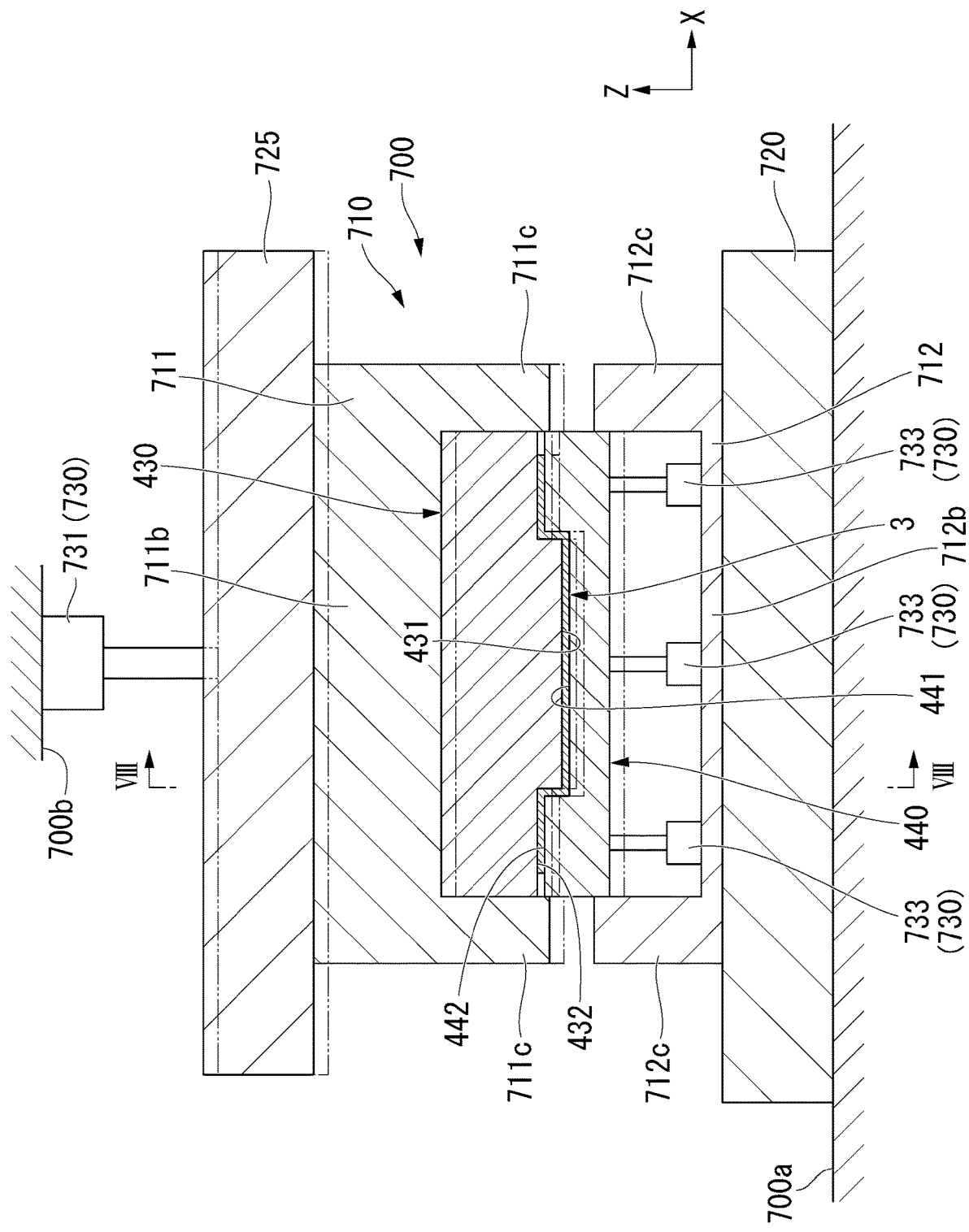
FIG. 34 shows an outline of the press-forming apparatus according to the second embodiment, shows an apparatus used in the third step in the method for manufacturing a press-formed article according to the first embodiment, and is a cross-sectional view taken along cross-sectional line IX-IX in FIG. 35.
Figure 35:
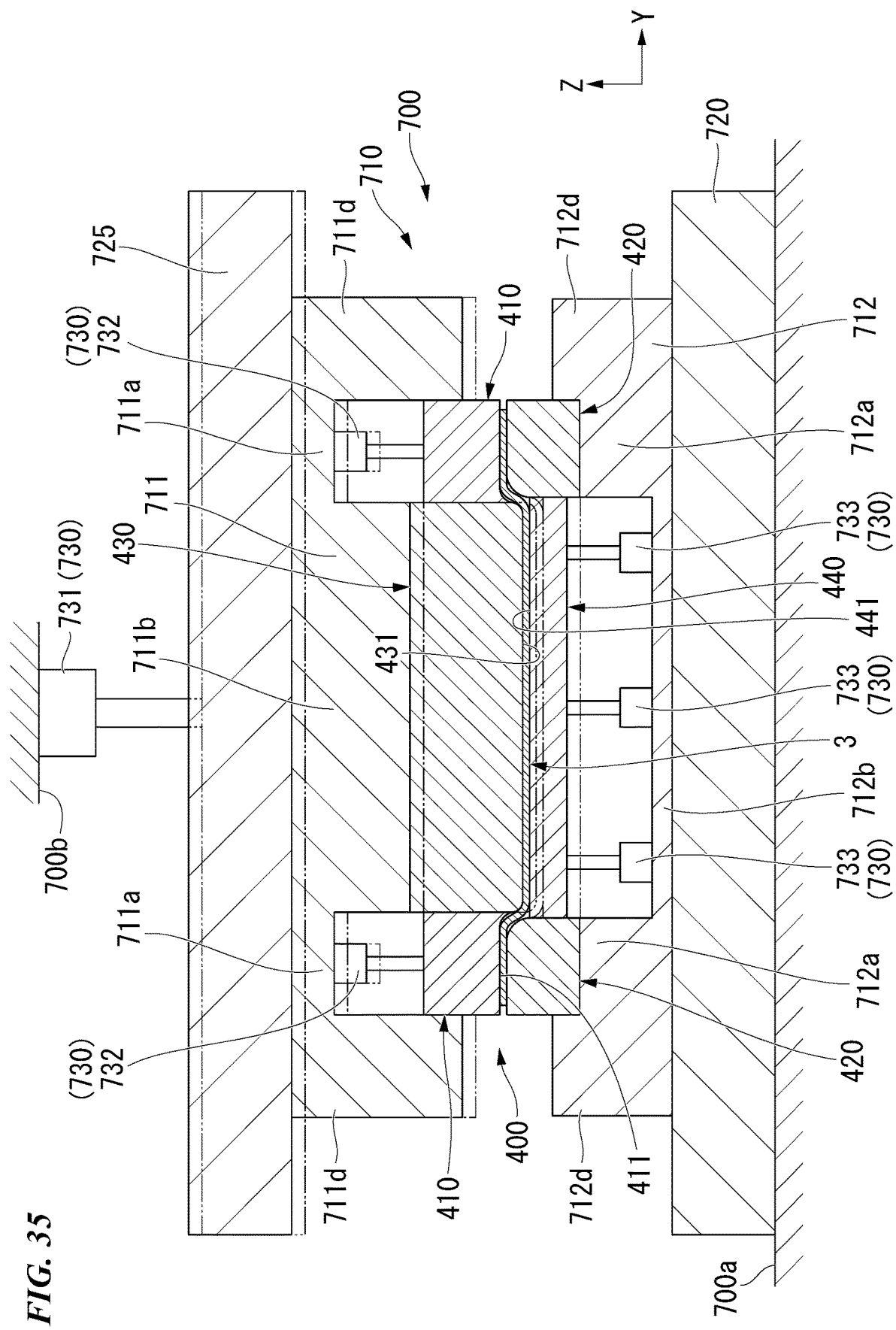
FIG. 35 shows an outline of the press-forming apparatus according to the second embodiment, shows the apparatus used in the third step in the method for manufacturing a press-formed article according to the first embodiment, and a cross-sectional view taken along cross-sectional line VIII-VIII in FIG. 34.

FIGS. 32 and 33 show an example of the press-forming apparatus used in the second step S2 in the method for manufacturing a press-formed article in the first embodiment. Furthermore, FIGS. 34 and 35 show an example of the press-forming apparatus used in the third step S3 in the method for manufacturing a press-formed article in the first embodiment. As shown in FIGS. 32 and 33, a first press-forming apparatus 600 used in the second step S2 includes the die of the second set 300 shown in FIGS. 10 to 12, a die attachment portion 610 configured to attach the die, a bolster 620 and a slider 625 configured to support the die attachment portion 610, and a drive portion 630 configured to move the die. The die attachment portion 610 has an upper attachment portion 611 configured to support an upper die and a lower attachment portion 612 configured to support a lower die. The bolster 620 is fixed to a support surface 600a. Furthermore, the slider 625 is fixed to a ceiling surface 600b via the drive portion 630 and can be moved in the third direction Z through the driving of the drive portion 630. In addition, the first upper die 310 has a pair of end dies 310A and a pair of overhanging portions 310C extending from the center die 310B toward both sides in the second direction Y, in addition to the center die 310B. The overhanging portions 310C are fixed to an upper portion of the center die 310B and project in the second direction Y. The pair of end dies 310A are supported by the overhanging portions 310C to be movable in the second direction Y along a lower surface of the corresponding overhanging portions 310C.

The upper attachment portion 611 is fixed to the slider 625. The upper attachment portion 611 has a pair of first upper support portions 611a configured to support the first upper die 310 and a second upper support portion 611b provided between the pair of first upper support portions 611a and configured to support the second upper die 330. The center die 310B and the overhanging portions 310C of the first upper die 310 are supported by the first upper support portions 611a via the drive portion 630. The second upper die 330 is fixed to a lower surface of the second upper support portion 611b. In addition, the upper attachment portion 611 has an upper guide portion 611c disposed on an outer side of the first upper support portions 611a in the first direction X and a pair of cam portions 611d disposed on an outer side of the first upper support portions 611a in the second direction Y to correspond to a pair of first lower dies 320. The movement of the pair of end dies 310A upward is restricted by the overhanging portions 310C, the movement of the pair of end dies 310A in the first direction X is restricted by the upper guide portion 611c and the second upper support portion 611b, and the movement of the pair of end dies 310A in the second direction Y is possible. Furthermore, each of the cam portions 611d projects downward from each of the first upper support portions 611a. A cam surface 611e facing each of the end dies 310A is formed on a distal end side of the cam portion 611d. The cam surfaces 611e are inclined inward in the second direction Y from a lower end toward an upper side.

The lower attachment portion 612 is fixed to the bolster 620.

The lower attachment portion 612 has a pair of first lower support portions 612a configured to support the first lower dies 320 and a second lower support portion 612b provided between the pair of first lower support portions 612a and configured to support the second lower die 340. The second lower die 340 is supported by the second lower support portion 612b via the drive portion 630. Furthermore, center dies 320B of the first lower dies 320 are fixed to the corresponding first lower support portions 612a. End dies 320A of the first lower dies 320 are movably supported on upper surfaces of the corresponding first lower support portions 612a. In addition, the lower attachment portion 612 further has a pair of lower guide portions 612c disposed on an outer side of the pair of first lower support portions 612a in the first direction X and a pair of lower regulation portions 612d disposed an outer side of the pair of first lower support portions 612a in the second direction Y to correspond to the pair of first lower dies 320. The pair of end dies 320A is restricted from moving outward in the second direction Y by the corresponding lower regulation portions 612*d*. Furthermore, the pair of end dies 320A are restricted from moving to both sides in the first direction X by the corresponding lower guide portions 612*c* and center dies 320B, and thus can be moved in the second direction Y along the upper surfaces of the first lower support portions 612*a*. Moreover, inclined surfaces 320*e* facing the cam surfaces 611*e* of the upper attachment portion 611 are formed on outer end portions of the pair of end dies 320A in the second direction Y. The inclined surfaces 320*e* are inclined inward in the second direction Y from the lower end toward the upper side.

The drive portion 630 has a first drive portion 631 configured to move the slider 625 in the third direction Z, a second drive portion 632 provided between the first upper support portion 611*a* and the overhanging portion 310C of the first upper die 310 and configured to provide a reaction force in the third direction Z, and a third drive portion 633 provided between the second lower support portion 612*b* and the second lower die 340 and configured to provide a reaction force in the third direction Z. The first drive portion 631 is immovably fixed to the ceiling surface 600*b*. The first drive portion 631 is, for example, a hydraulic cylinder and can expand in the third direction Z by generating a driving force (hereinafter referred to as a "forming load"). Furthermore, the second drive portion 632 is, for example, a gas cylinder and the inside thereof is filled with a working gas. For this reason, the second drive portion 632 can provide a reaction force according to an amount of compression (hereinafter referred to as a "pad load") to the first upper support portions 611*a* and the overhanging portions 310C of the first upper die 310 while performing compression using a driving force of the first drive portion 631. Furthermore, the third drive portion 633 is, for example, a cushion pin and an inside thereof is filled with hydraulic oil. For this reason, the third drive portion 633 can provide a reaction force according to an amount of compression (hereinafter referred to as a "cushion load") to the second lower support portion 612*b* and the second lower die 340 while performing compression using a driving force of the first drive portion 631. The third drive portion 633 may form through holes in the second lower support portion 612*b* of the lower attachment portion 612 and the bolster 620 and may be supported by the support surface 600*a* through the through holes.

Therefore, when the first drive portion 631 is driven and is expanded, it is possible to move the slider 625, the upper attachment portion 611, the first upper die 310, and the second upper die 330 downward in the third direction Z and it is possible to cause the first intermediate press-formed article 2 which is a workpiece to be disposed between the first upper die 310 and the second upper die 330 and the first lower dies 320 and the second lower die 340. Moreover, when the first drive portion 631 is further expanded, it is possible to apply a pressurization force in which out-of-plane deformation is prevented to the first intermediate press-formed article 2 between the first upper die 310 and the first lower dies 320 in response of a reaction force generated due to the second drive portion 632 while the second drive portion 632 compresses and absorbs the displacement of the first upper support portions 611*a*. Furthermore, it is possible to apply a pressurization force to the first intermediate press-formed article 2 between the second upper die 330 and the second lower die 340 in response of a reaction force generated due to the third drive portion 633 while the third drive portion 633 compresses and absorbs the displacement of the second upper die 330 and the second lower die 340. Moreover, when the second upper die 330 and the second lower die 340 are displaced downward with respect to the first upper die 310 and the first lower dies 320, the first intermediate press-formed article 2 can be processed in the second step S2. At this time, when the cam surfaces 611*e* and the inclined surfaces 320*e* slide, the end dies 320A of the first lower dies 320 and the end dies 310A of the first upper die 310 can move toward a center side in the second direction Y so that gaps M1 and M2 between the center dies 310B and 320B and the end dies 310A and 320A narrow. The drive portion 630 may be constituted to move the second upper die 330 and the second lower die 340 relative to the first upper die 310 and the first lower die 320 from the first upper die 310 side toward the first lower dies 320 side in a state in which an interval between the first upper die 310 and the second upper die 330 and an interval between the first lower die 320 and the second lower die 340 are maintained.

As shown in FIGS. 34 and 35, a second press-forming apparatus 700 used in the third step S3 has the die of the third set 400 shown in FIGS. 17 to 19, a die attachment portion 710 configured to attach the die, a bolster 720 and a slider 725 configured to support the die attachment portion 710, and a drive portion 730 configured to move the die. The die attachment portion 710 has an upper attachment portion 711 configured to support an upper die and a lower attachment portion 712 configured to support a lower die. The bolster 720 is fixed to a support surface 700*a*. In addition, the slider 725 is fixed to a ceiling surface 700*b* via the drive portion 730 and can be moved in the third direction Z through the driving of the drive portion 730.

The upper attachment portion 711 is fixed to the slider 725. The upper attachment portion 711 has a pair of first upper support portions 711*a* configured to support the third upper die 410 and a second upper support portion 711*b* provided between the pair of first upper support portions 711*a* and configured to support the fourth upper die 430. The third upper die 410 is supported by the first upper support portions 711*a* via the drive portion 730. The fourth upper die 430 is fixed to a lower surface of the second upper support portion 711*b*. Furthermore, the upper attachment portion 711 has upper regulation portions 711*c* disposed on both outer sides of the second upper support portion 711*b* in the first direction X and upper guide portions 711*d* disposed an outer side of the pair of first upper support portions 711*a* in the second direction Y. The upper guide portions 711*d* allow the third upper die 410 to move in the third direction Z while restricting the movement outward in the second direction Y.

The lower attachment portion 712 is fixed to the bolster 720. The lower attachment portion 712 has a pair of first lower support portions 712*a* configured to support the third lower die 420 and a second lower support portion 712*b* provided between the pair of first lower support portions 712*a* and configured to support the fourth lower die 440. The third lower die 420 is fixed to upper surfaces of the first lower support portions 712*a*. The fourth lower die 440 is supported by the second lower support portion 712*b* of the lower attachment portion 712 via the drive portion 730. Furthermore, the lower attachment portion 712 has lower guide portions 712*c* disposed on both outer sides of the second lower support portion 712*b* in the first direction X and lower regulation portions 712*d* disposed on both outer sides of the first lower support portions 712*a* in the second direction Y. The lower guide portions 712*c* allow the fourth lower die 440 to move in the third direction Z while restricting the movement outward in the first direction X.

The drive portion 730 has a first drive portion 731 configured to move the slider 725 in the third direction Z, a second drive portion 732 provided between the first upper support portions 711a and the third upper die 410 and configured to provide a reaction force in the third direction Z, and a third drive portion 733 provided between the second lower support portion 712b and the fourth lower die 440 and configured to provide a reaction force in the third direction Z. The first drive portion 731 is immovably fixed to the ceiling surface 700b. The first drive portion 731 is, for example, a hydraulic cylinder and can expand in the third direction Z by generating a driving force (hereinafter referred to as a "forming load"). In addition, the second drive portion 732 is, for example, a gas cylinder and an inside thereof is filled with a working gas. For this reason, the second drive portion 732 can provide a reaction force according to an amount of compression (hereinafter referred to as a "pad load") to the first upper support portions 711a and the third upper die 410 while performing compression through a driving force of the first drive portion 731. Moreover, the third drive portion 733 is, for example, a cushion pin and an inside thereof is filled with hydraulic oil. For this reason, the third drive portion 733 can provide a reaction force according to an amount of compression (hereinafter referred to a "cushion load") to the second lower support portion 712b and the fourth lower die 440 while performing compression through a driving force of the first drive portion 731. The third drive portion 733 may form through holes in the second lower support portion 712b of the lower attachment portion 712 and the bolster 720 and may be supported by the support surface 700a through the through holes.

Therefore, when the first drive portion 731 is driven and expanded, it is possible to cause the second intermediate press-formed article 3 which is a workpiece to be disposed between the third upper die 410 and the fourth upper die 430 and the third lower die 420 and the fourth lower die 440 by moving the slider 725, the upper attachment portion 711, the third upper die 410, and the fourth upper die 430 downward in the third direction Z. Furthermore, when the first drive portion 731 is further expanded, it is possible to apply a pressurization force in which out-of-plane deformation is not prevented to the second intermediate press-formed article 3 between the third upper die 410 and the third lower die 420 in accordance with a reaction force generated due to the second drive portion 732 while the second drive portion 732 compresses and absorbs the displacement of the first upper support portions 711a. In addition, it is possible to apply a pressurization force to the second intermediate press-formed article 3 between the fourth upper die 430 and the fourth lower die 440 in accordance with a reaction force generated due to the third drive portion 733 while the third drive portion 733 compresses and absorbs the displacement of the fourth upper die 430 and the fourth lower die 440. Moreover, when the fourth upper die 430 and the fourth lower die 440 are displaced downward with respect to the third upper die 410 and the third lower die 420, it is possible to subject the second intermediate press-formed article 3 to the processing in the third step S3.

Figure 36:
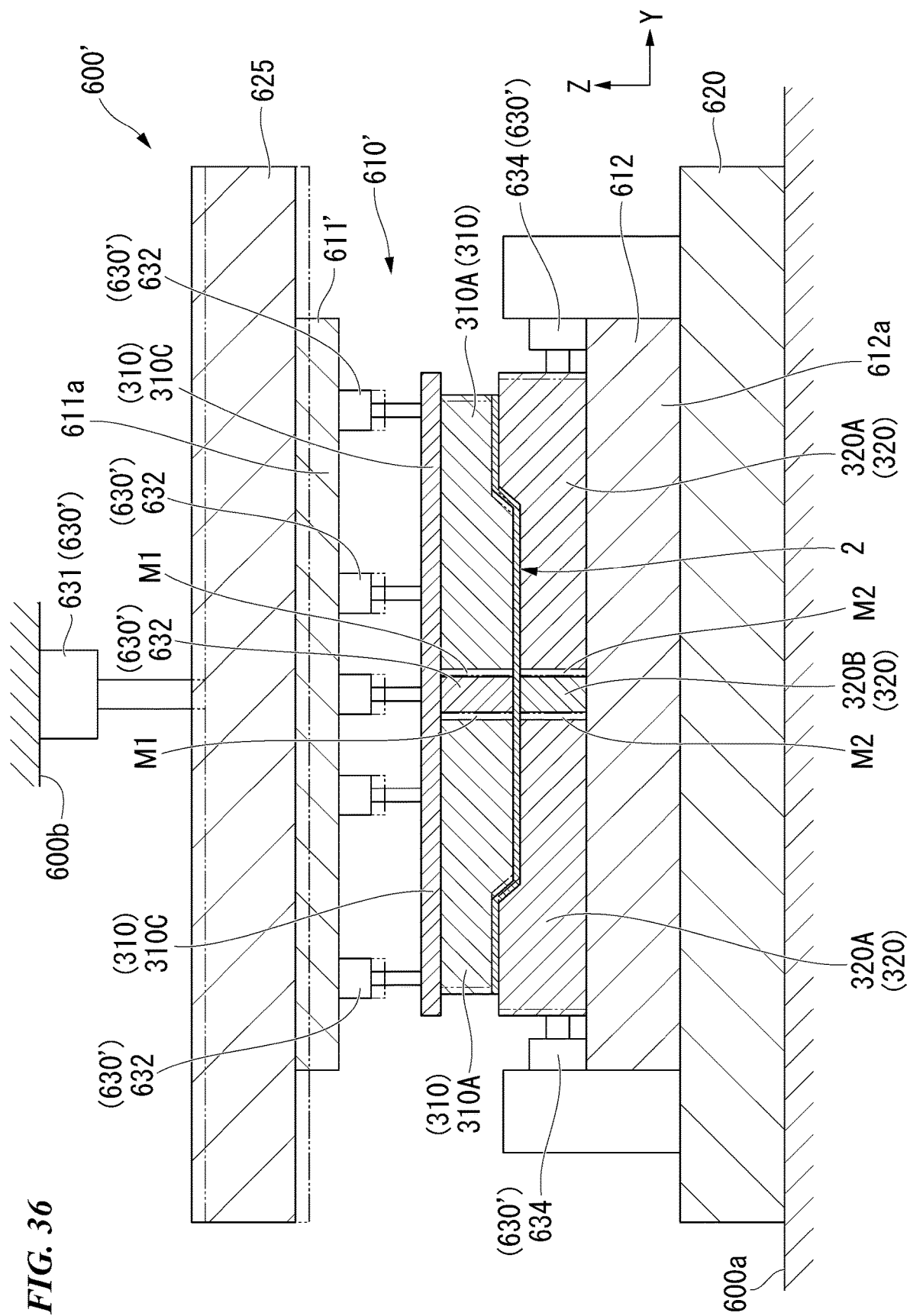
FIG. 36 shows an outline of a press-forming apparatus of a modified example of the second embodiment and an apparatus used in the second step in the method for manufacturing a press-formed article according to the first embodiment.

The first press-forming apparatus 600 and the second press-forming apparatus 700 shown in the embodiment are examples of apparatuses which can perform the second step S2 and the third step S3 and the present invention is not limited thereto. The constitution of each of the upper attachment portions and the lower attachment portions and the constitution of each of the drive portions can be appropriately changed. Furthermore, although a mechanism in which the cam surfaces 611e and the inclined surfaces 320e move the end dies 310A and 320A in the second direction Y is provided in the first press-forming apparatus 600 in the embodiment, the present invention is not limited thereto. FIG. 36 shows a first press-forming apparatus 600' of a modified example. As shown in FIG. 36, the first press-forming apparatus 600' has a constitution in which an upper attachment portion 611' of a die attachment portion 610' does not have a cam portion. Furthermore, a drive portion 630' has fourth drive portions 634, in addition to the first drive portion 631, the second drive portion 632, and the third drive portion 633. The fourth drive portions 634 are, for example, hydraulic cylinders and are provided on both outer sides of a pair of end dies 320B of the first lower dies 320 in the second direction Y to correspond to end dies 320B. Moreover, it is possible to move the corresponding end dies 320B toward a center in the second direction Y by driving the fourth drive portions 634 together with the driving of the first drive portion 631. Independent fourth drive portions 634 may move the end dies 310A and 320A in the second direction Y, instead of the mechanism for moving the end dies 310A and 320A in the second direction Y using the cam in this way.

Also, although the first press-forming apparatus 600 which performs the second step S2 and the second press-forming apparatus 700 which performs the third step S3 are separate apparatuses in the embodiment, the present invention is not limited thereto and the die may be able to be replaced as a single apparatus. For example, a first unit is composed of the die attachment portion 610 and the dies of the second set 300 and the second drive portion 632 and the third drive portion 633 shown in FIGS. 32 and 33. Furthermore, a second unit is composed of the die attachment portion 710 and the dies of the third set 400 and the second drive portion 732 and the third drive portion 733. Moreover, the first unit and the second unit may be interchangeable between the slider 625 and the bolster 620 shown in FIGS. 32 and 33.

EXAMPLES

Example 1 in which a stress state when the press-formed article 100 is manufactured by the method for manufacturing a press-formed article in the first embodiment was analyzed will be described below. In the example of the present invention shown in Example 1, a GA590DP material (tensile strength of 626 MPa, yield strength of 342 MPa, Young's modulus of 21000 mPa, and Poisson ratio of 0.30) was used for the press-formed article 100. A thickness of the blank 1 was 2 mm. As a specific shape, heights of the first wall portion 110 and the second wall portion 120 (distances from the upper surface 102 of the bottom sheet portion 101 to the first upper surface 131 of the first flange 130 and the second upper surface 141 of the second flange 140 in the third direction Z) were 100 mm. Furthermore, widths of the first flange 130 and the second flange 140 were 30 mm. In a size of the bottom sheet portion 101, a width thereof in the first direction X was 910 mm and a width thereof in the second direction Y was 1500 mm. R1 shown in FIG. 1 was 40 mm, R2 was 10 mm, and R3 was 10 mm.

First, the first step S1 was performed until a height of the first rising portion 10A (distance from the upper surface of the base sheet portion 30A to the upper surface of the first strip portion 20A in the third direction Z) was 60 mm. Subsequently, the second step S2 was performed until a height of the second rising portion 40A (distance from the upper surface of the base sheet portion 30A to the upper surface of the second strip portion 50A in the third direction Z) was 150 mm. At this time, a pad load was 25.7 tonf, a cushion load was 56.8 tonf, and a forming load was 250.0 tonf.

Figure 37:
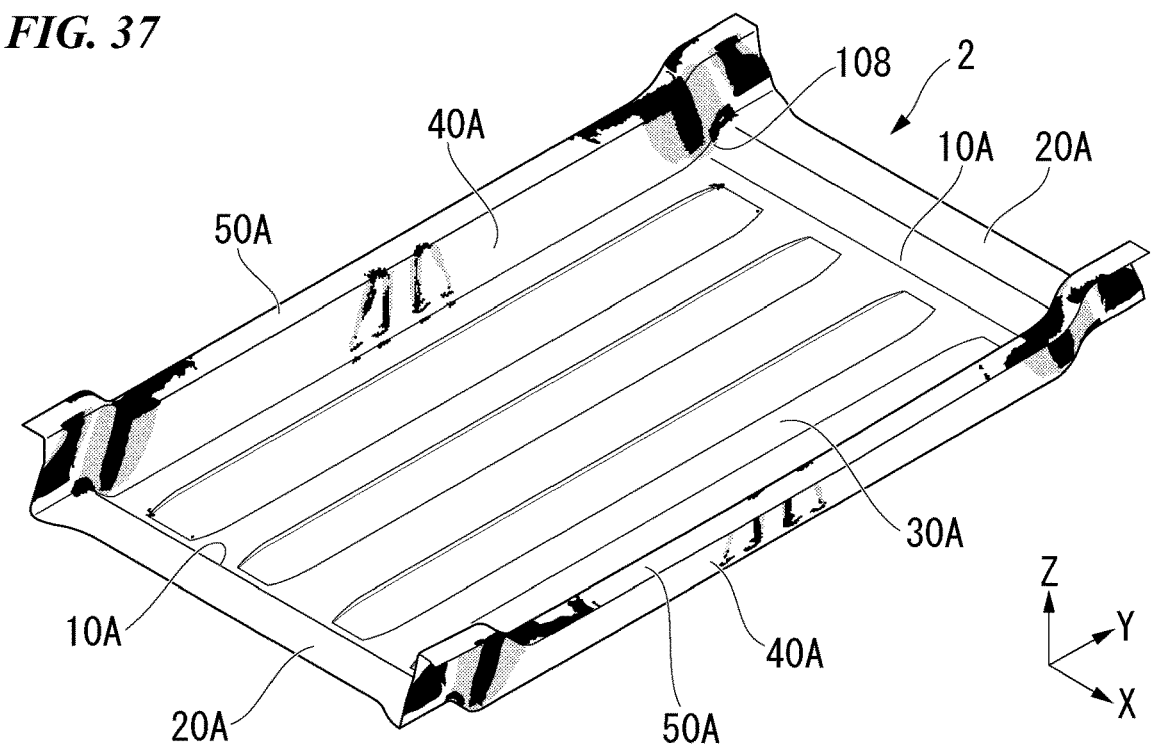
FIG. 37 is a perspective view showing an analysis result of strain of a second intermediate press-formed article which has been subjected to a second step in a method for manufacturing a press-formed article according to a first example when viewed from above.
Figure 38:
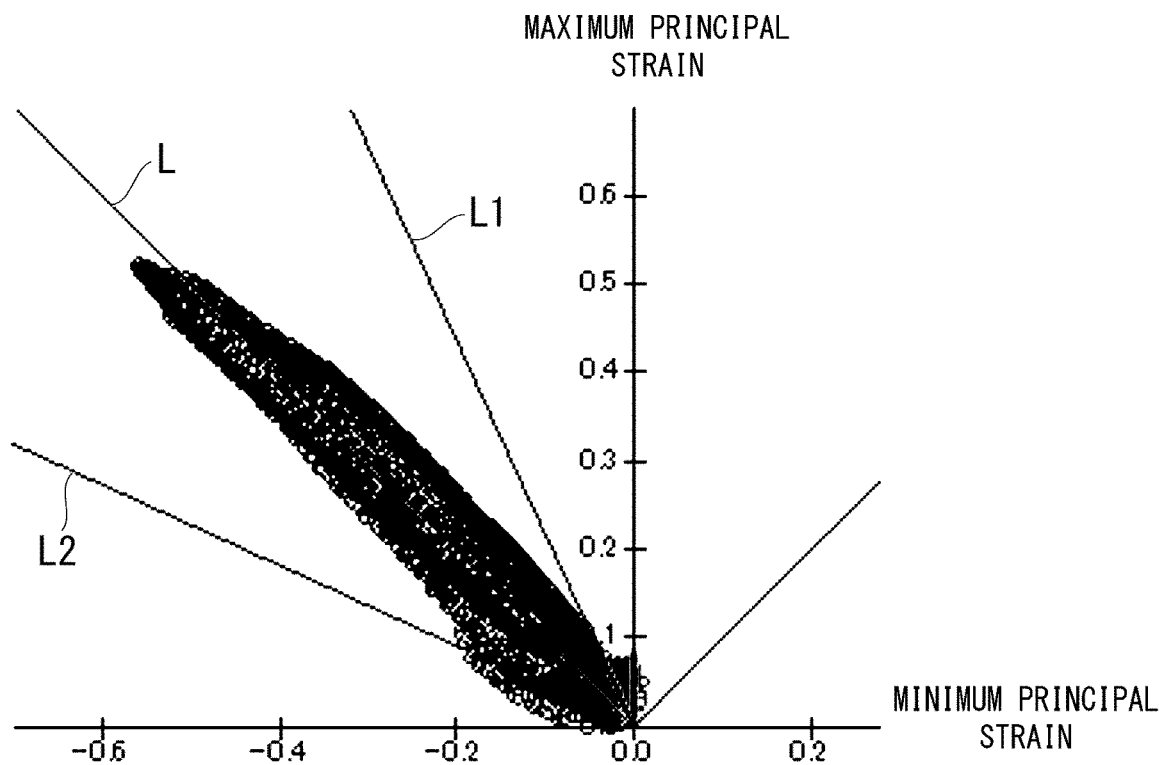
FIG. 38 is a graph showing a relationship between a minimum principal strain and a maximum principal strain of the second intermediate press-formed article which has been subjected to the second step in the method for manufacturing a press-formed article according to the first example.

FIG. 37 shows a magnitude of strain of the first intermediate press-formed article 2 after the second step S2 was performed using a color depth. The darker the color, the greater the strain. Strain does not occur in the thinnest zone (colorless portion) including the base sheet portion 30A. On the other hand, it is shown that strain occurs in a zone of the second rising portion 40A formed in the second step S2 adjacent to the first rising portion 10A. FIG. 38 is a plot of the strain at each position of the first intermediate press-formed article 2 shown in FIG. 37 and has a horizontal axis indicating minimum principal strain and a vertical axis indicating maximum principal strain. A straight line L is a straight line inclined by 45 degrees with respect to the horizontal axis and the vertical axis, that is, a straight line having |maximum principal strain|=|minimum principal strain|. A straight line L1 is a straight line having |maximum principal strain|=2×|minimum principal strain|. A straight line L2 is a straight line in which |maximum principal strain|=0.5×|minimum principal strain|. Since the straight line L satisfies |maximum principal strain|=|minimum principal strain|, it means that contraction is caused at the same ratio in the direction orthogonal to the expansion direction with respect to the expansion in a certain direction. That is to say, in a portion in which strain is generated as plotted on the straight line L, there is no change in the thickness direction of the member because the shear deformation occurs. On the other hand, in the zone outside the straight lines L1 and L2 with respect to the straight line L, the expansion/contraction ratio of the strain was significantly different, a thickness of the member decreases on the straight line L1 side, and a thickness of the member increases on the straight line L2 side. In addition, when the strain increases, the significant influence on formability can be shown. Referring to a plot distribution for the example of the present invention, it is clear that all of the strains are distributed in the vicinity of the straight line L and the thickness reduction due to shear deformation was minimized. Since the strains at the positions are distributed along the straight line L in this way, it is clear that strain due to shear deformation also occur in a portion of the first intermediate press-formed article 2 in which strain has occurred, and thus a decrease in thickness was minimized.

Figure 39:
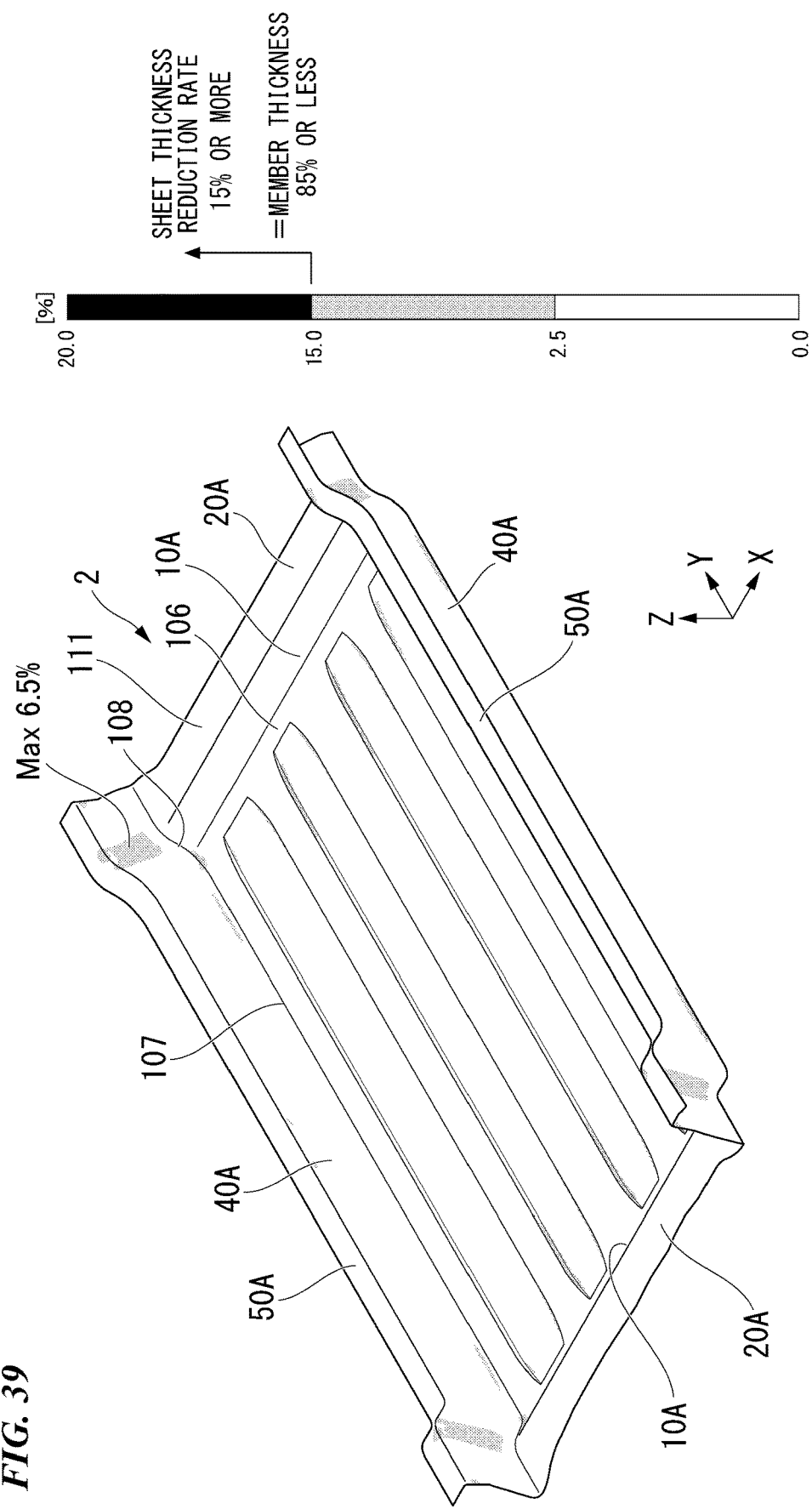
FIG. 39 is a perspective view showing an analysis result of a thickness of the second intermediate press-formed article which has been subjected to the second step in the method for manufacturing a press-formed article according to the first example when viewed from above.

FIG. 39 shows a thickness reduction rate of the member after the second step S2 was performed using a color depth. The thickness reduction rate indicates a reduction rate of a thickness at the same position after the second step is performed to a thickness before the second step S2 is performed. The darker the color, the greater the thickness reduction rate. In a zone which includes the base sheet portion 30A and in which the color is the lightest (colorless portion), a reduction rate of the thickness was maintained at less than 2.5%. The thickness reduction rate was maintained at less than 2.5% also in a corner portion in which the first ridge line 106, the second ridge line 107, and the vertical ridge line 108 were connected to each other and in which shear deformation occurs. On the other hand, the thickness reduction rate can be minimized to 6.5% also at the portion connected to the third ridge line 115 in the second rising portion 40A which has the smallest thickness.

Subsequently, the third step S3 was performed until the height of the first rising portion 10B (distance from the upper surface of the base sheet portion 30A to the upper surface of the first strip portion 20B in the third direction Z) was 100 mm. At this time, a pad load was 59.7 tonf, a cushion load was 99.4 tonf, and a forming load was 318.0 tonf.

Figure 40:
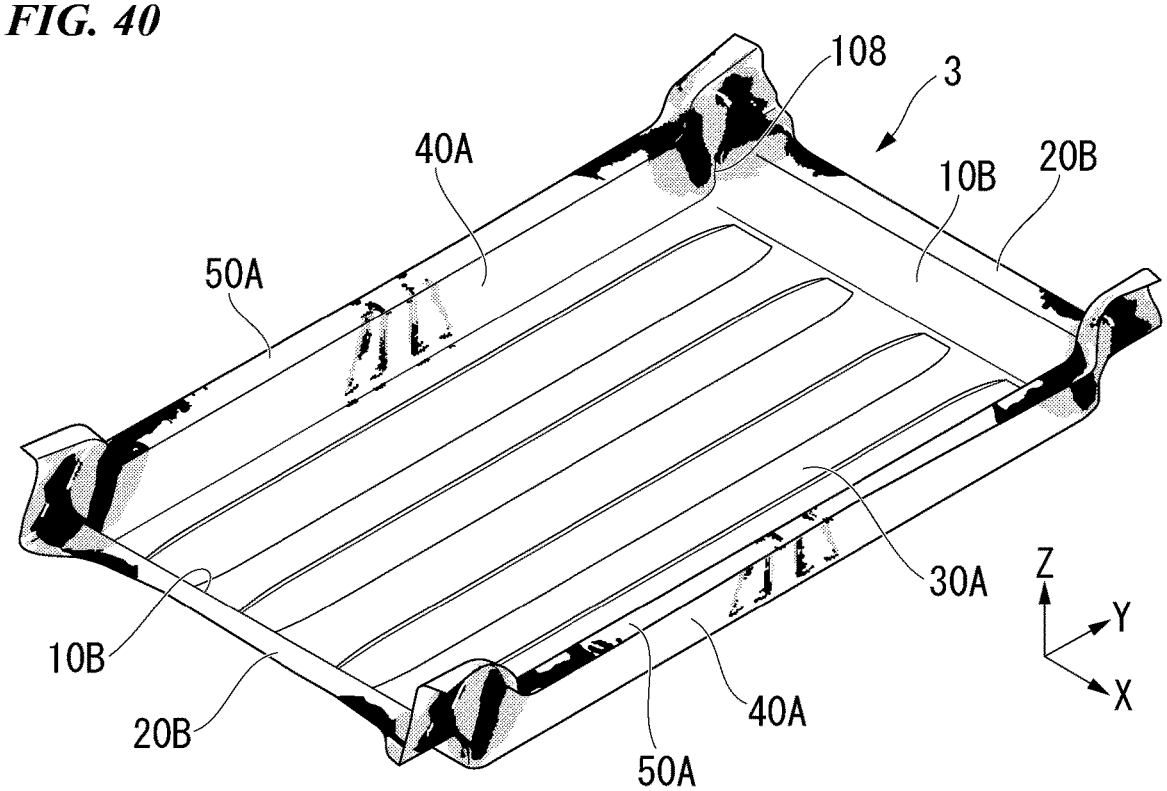
FIG. 40 is a perspective view showing an analysis result of strain of a third intermediate press-formed article which has been subjected to a third step in the method for manufacturing a press-formed article according to the first example when viewed from above.
Figure 41:
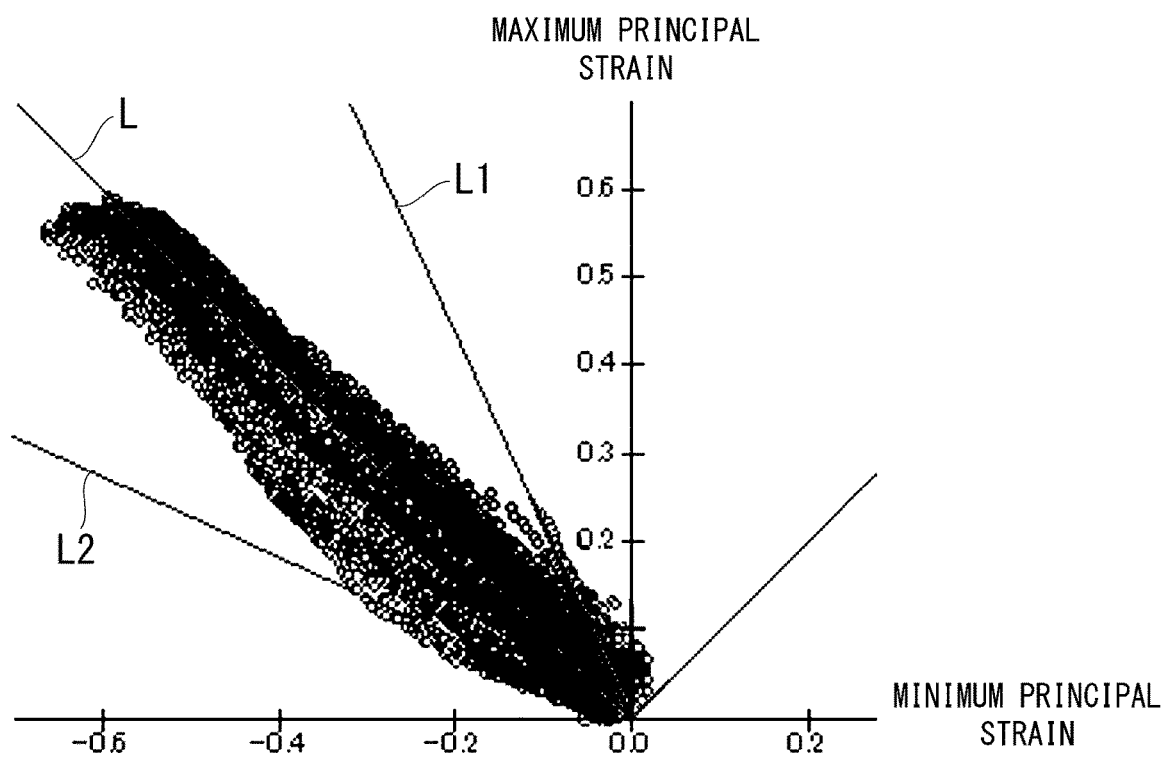
FIG. 41 is a graph showing a relationship between minimum principal strain and maximum principal strain of the third intermediate press-formed article which has been subjected to the third step in the method for manufacturing a press-formed article according to the first example.

FIG. 40 shows a magnitude of strain of the second intermediate press-formed article 3 which has been subjected to the third step S3 in accordance with the color depth. The darker the color, the greater the strain. Strain does not occur in the thinnest zone (colorless portion) including the base sheet portion 30A. On the other hand, it is shown that strain occurs in a zone of the second rising portion 40A including a portion in which shear deformation has been caused in the second step S2 and a zone of the second rising portion 40A connected to the first strip portion 20B. FIG. 41 is a plot of the strain at each position of the second intermediate press-formed article 3 shown in FIG. 40 and has a horizontal axis indicating minimum principal strain and a vertical axis indicating maximum principal strain. The details are the same as in FIG. 37. As shown in FIG. 41, the strains at all of the positions are distributed along the straight line L in a second quadrant. Since the strains at the positions are all distributed along the straight line L in this way, it is clear that strain due to shear deformation also occur in a portion of the second intermediate press-formed article 3 in which strain has occurred, and thus a decrease in thickness was minimized.

Figure 42:
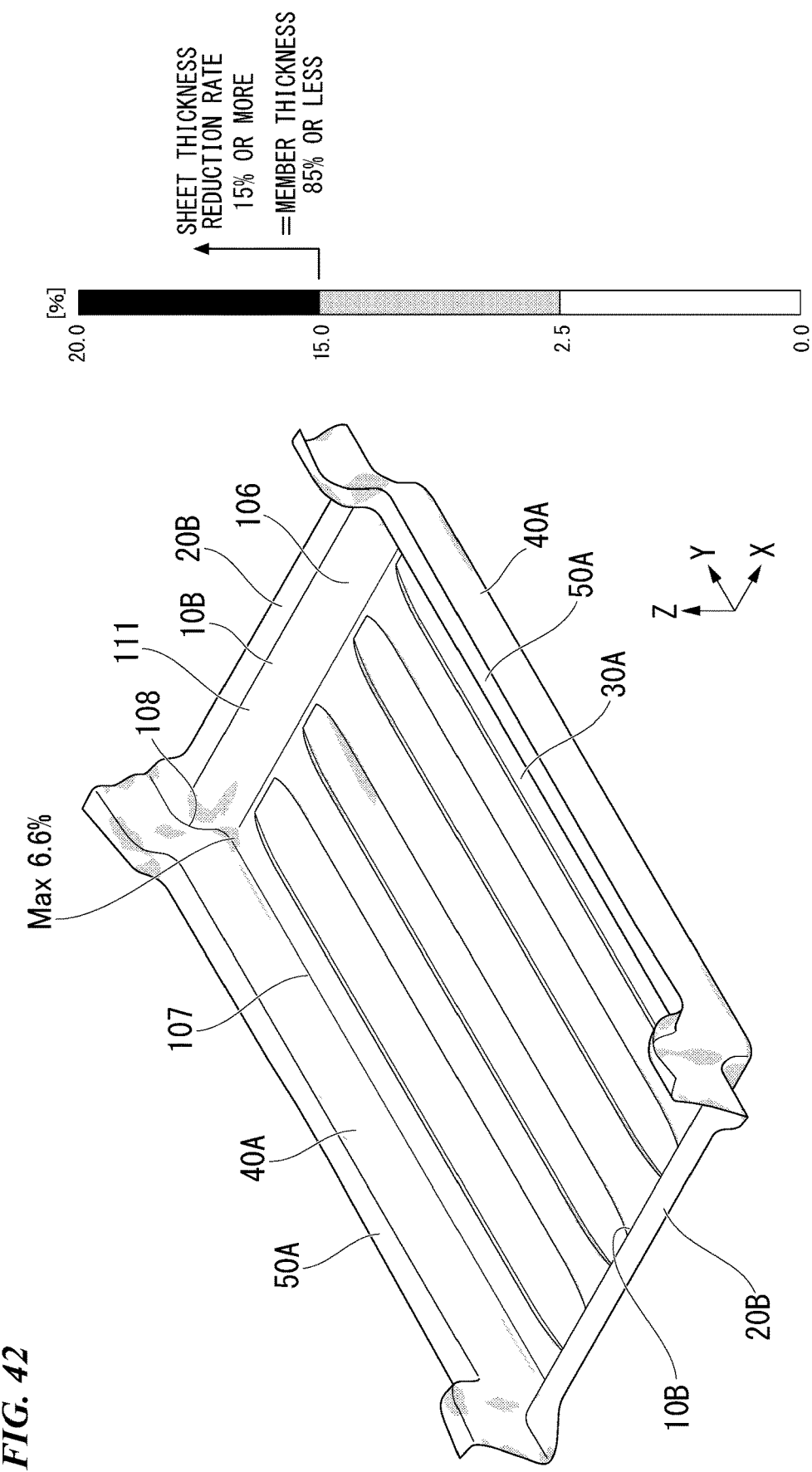
FIG. 42 is a perspective view showing an analysis result of a thickness of the third intermediate press-formed article which has been subjected to the third step in the method for manufacturing a press-formed article according to the first example when viewed from above.

FIG. 42 shows a thickness reduction rate of the member which has been subjected to the third step S3 using a color depth. The darker the color, the greater the thickness reduction rate. A reduction rate of the thickness was maintained at less than 2.5% in a zone which includes the base sheet portion 30A and in which the color is the lightest (colorless portion). On the other hand, it is acknowledged that the thickness was slightly smaller in zones of the first rising portion 10B and the second rising portion 40A adjacent to each other and a zone in which the second rising portion 40A and the second strip portion 50A were connected. However, the thickness reduction rate can be minimized to 6.6% also in a corner portion which was the thinnest and in which the first ridge line 106, the second ridge line 107, and the vertical ridge line 108 were connected.

Figure 43:
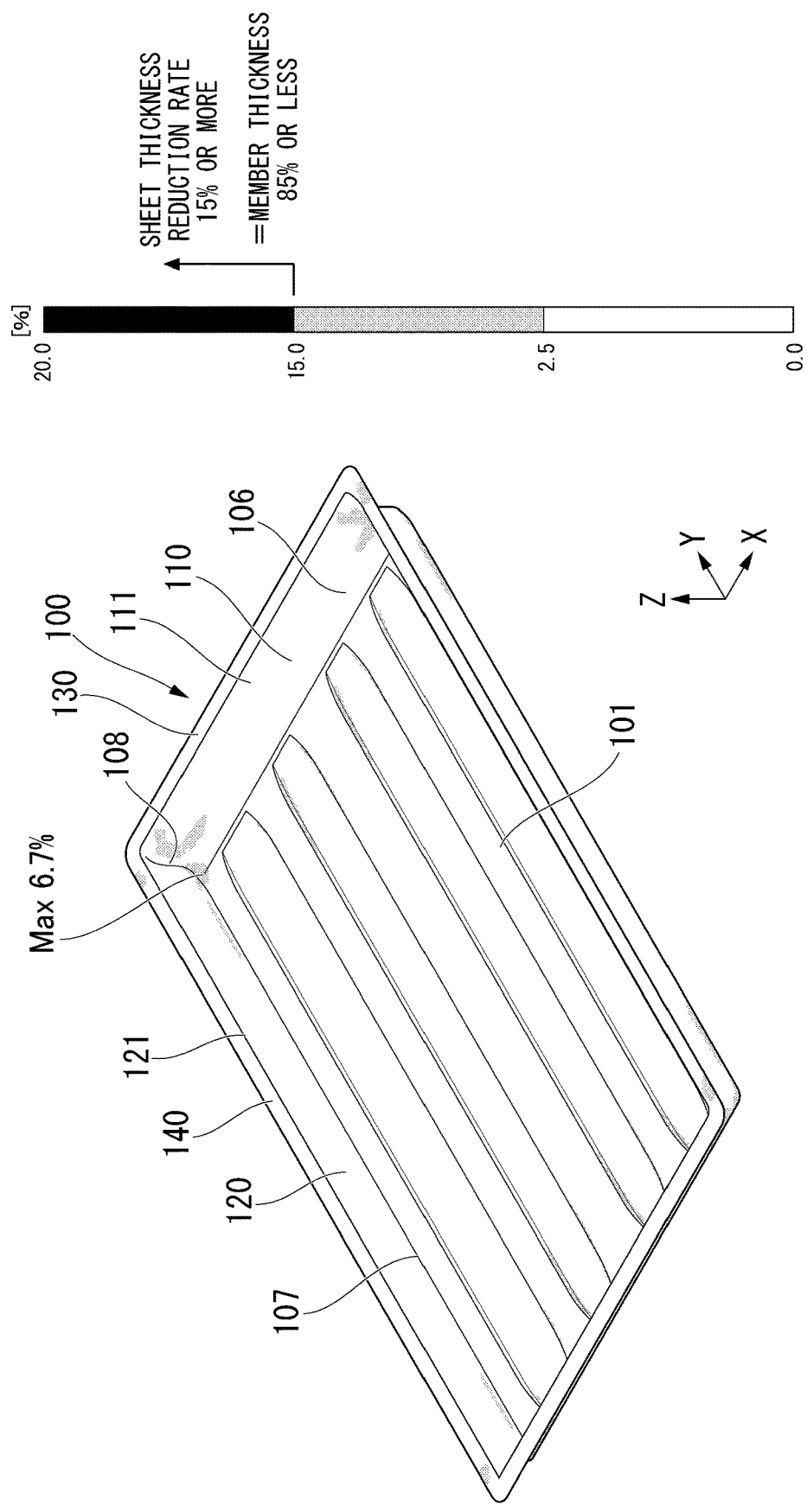
FIG. 43 is a perspective view showing an analysis result of a thickness of a completed press-formed article in the method for manufacturing a press-formed article according to the first example when viewed from above.
Figure 44:
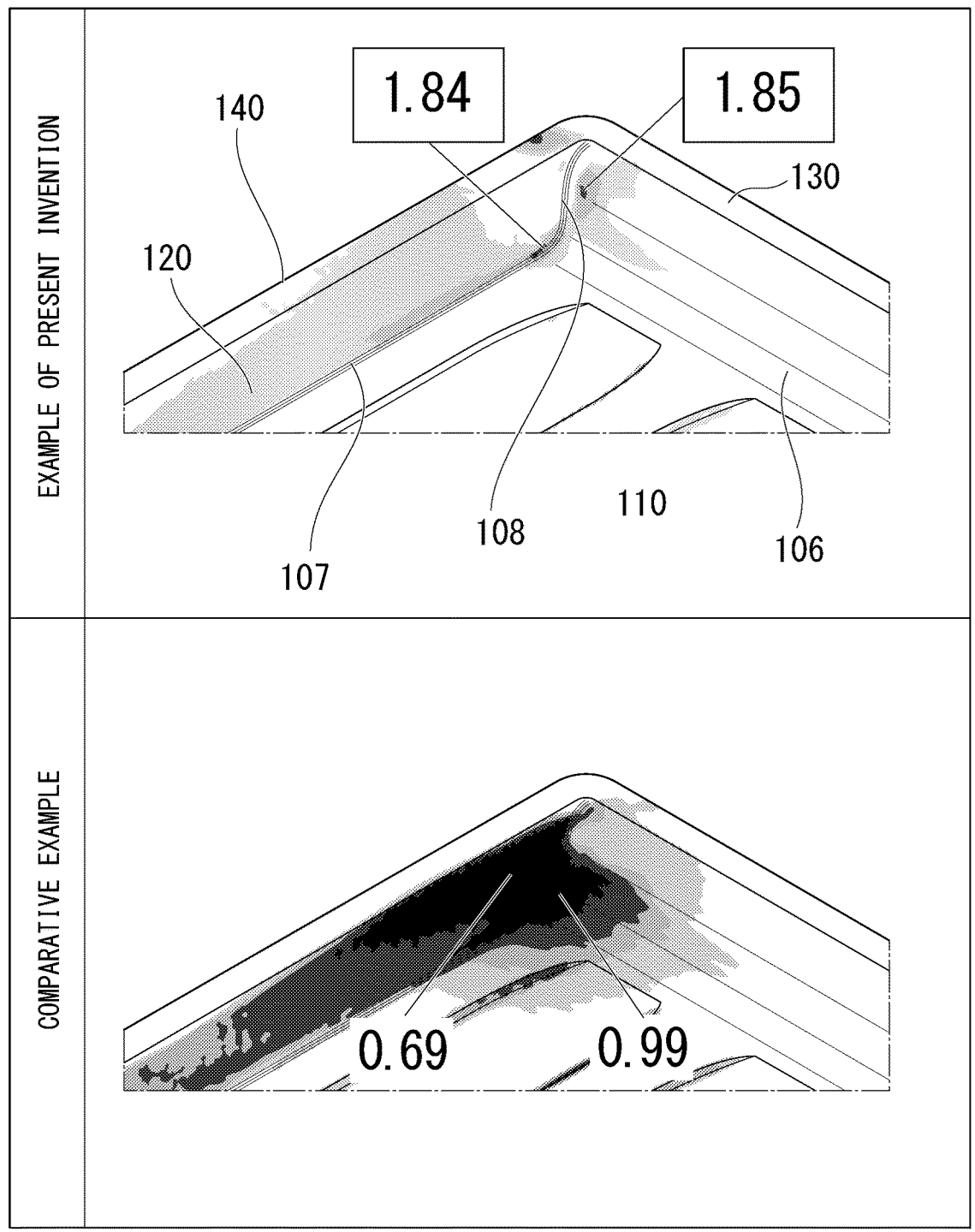
FIG. 44 is a table showing an analysis result of a thickness of a press-formed article when a radius of curvature R3 of an inner portion of a vertical ridge line is 5 mm in a method for manufacturing a press-formed article according to a second example.
Figure 45:
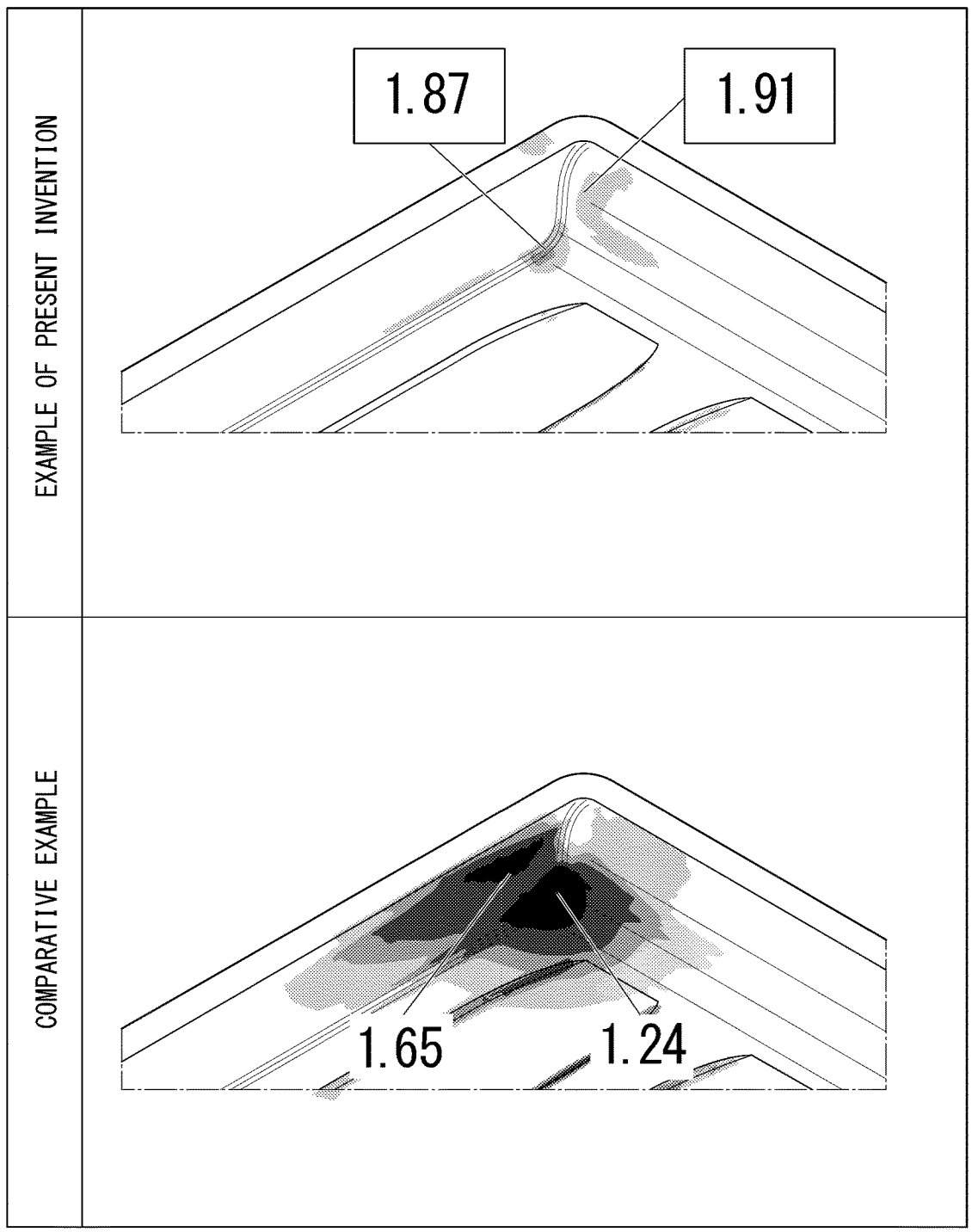
FIG. 45 is a table showing an analysis result of a thickness of a press-formed article when a radius of curvature R3 of an inner portion of a vertical ridge line is 10 mm in the method for manufacturing a press-formed article according to the second example.
Figure 46:
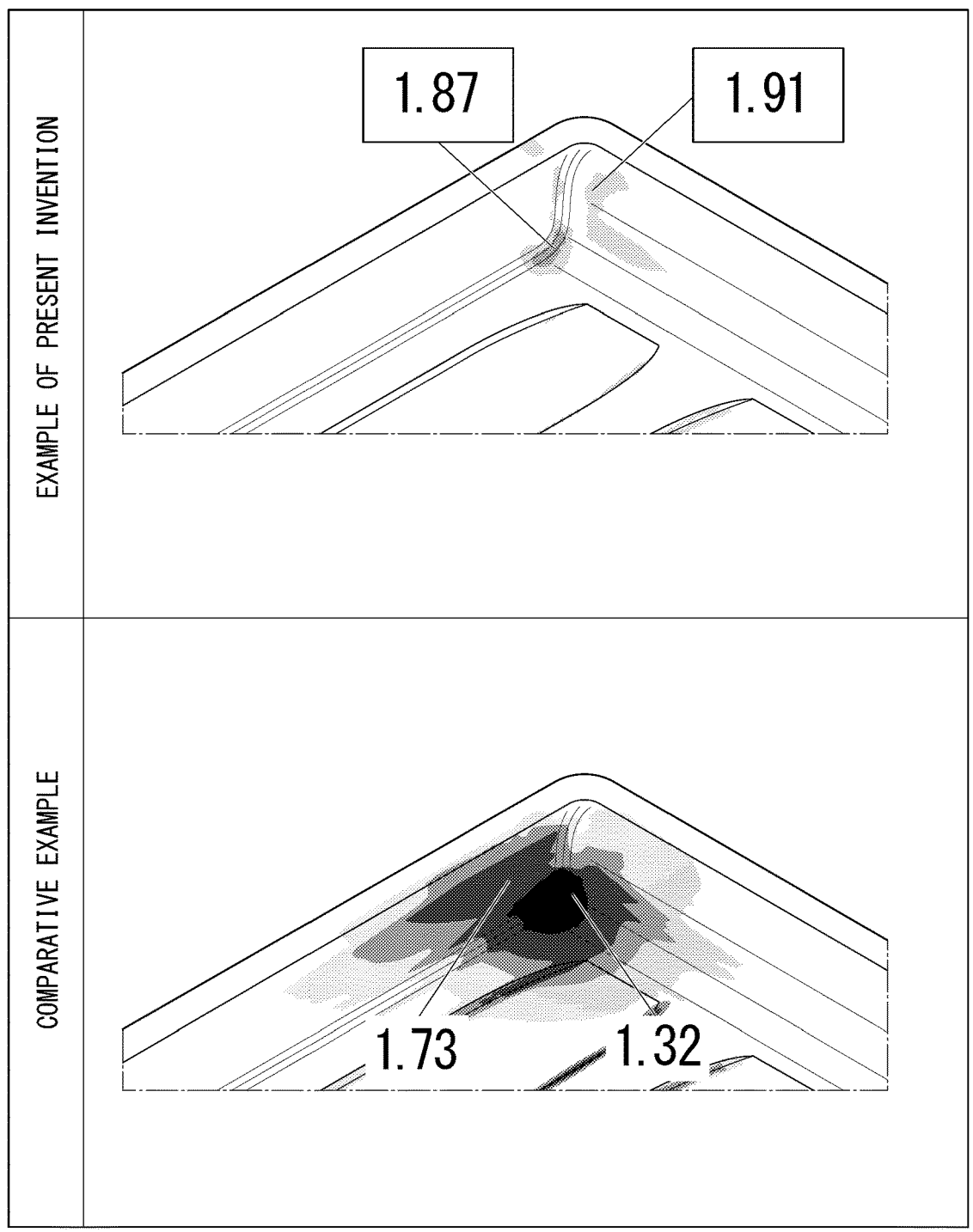
FIG. 46 is a table showing an analysis result of a thickness of a press-formed article when a radius of curvature R3 of an inner portion of a vertical ridge line is 15 mm in the method for manufacturing a press-formed article according to the second example.
Figure 47:
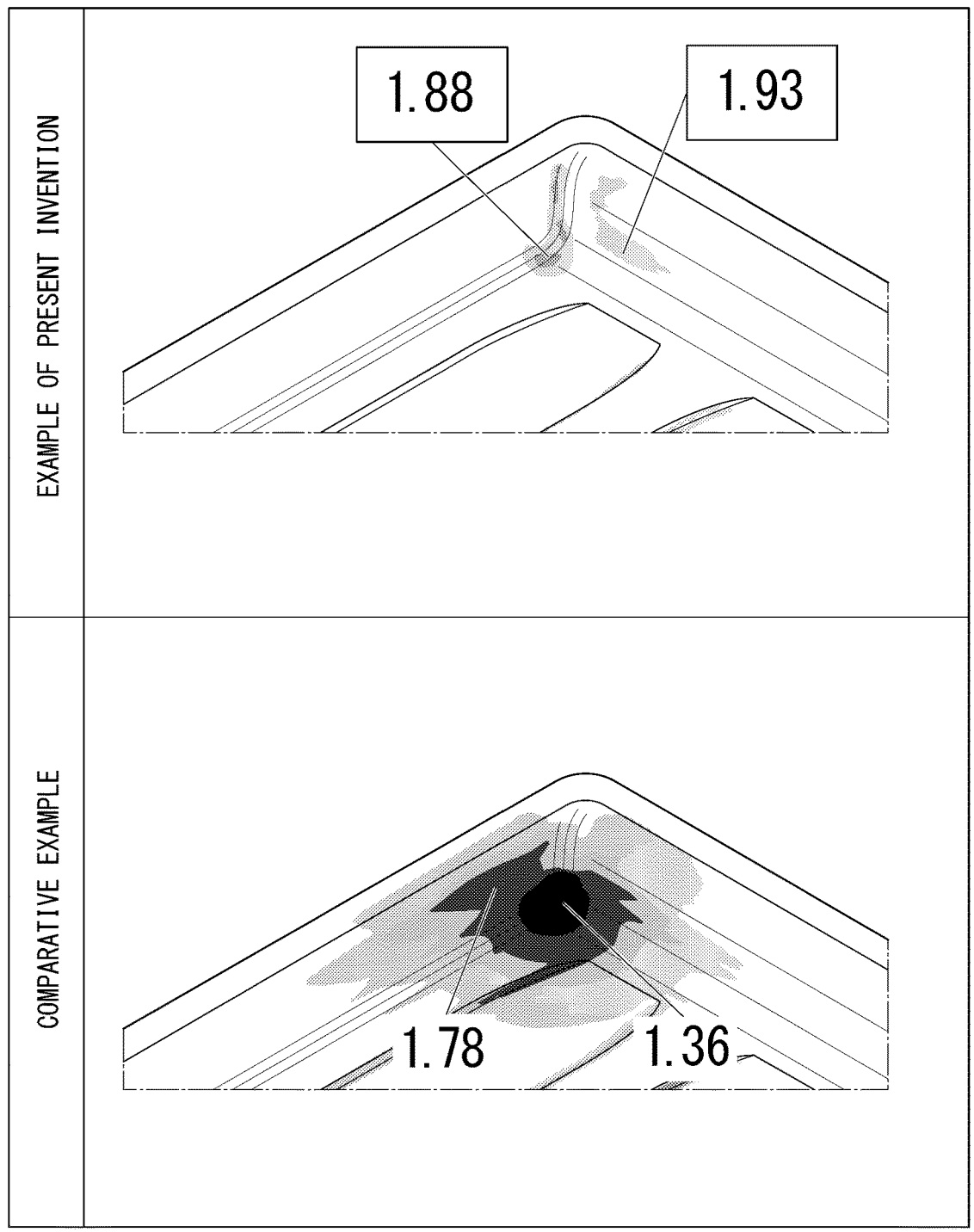
FIG. 47 is a table showing an analysis result of a thickness of a press-formed article when a radius of curvature R3 of an inner portion of a vertical ridge line is 20 mm in the method for manufacturing a press-formed article according to the second example.

FIG. 43 shows a thickness reduction rate of the member which has been subjected to the sixth step S6 using a color depth. The darker the color, the greater the thickness reduction rate. The thickness reduction rate was maintained to less than 2.5% in a zone which includes the base sheet portion 30A and in which the color was the lightest (colorless portion). On the other hand, it is acknowledged that the thickness was slightly smaller in zones of the first wall portion 110 and the second wall portion 120 adjacent to each other and zone of the second flange 140 close to the vertical ridge line 108. However, although the thickness was the thinnest at the corner in which the first ridge line 106, the second ridge line 107, and the vertical ridge line 108 were connected, the thickness reduction rate can be minimized to 6.7%.

As described above, it is possible to minimize a change in thickness before and after each process so that the thickness after the process was 85% or more of the thickness before the process. In addition, it is possible to minimize a change in thickness throughout the entire process so that the thickness of each position after completion as the press-formed article 100 was 85% or more with respect to the thickness of the blank.

As Example 2, changes in thickness before and after processing were analyzed in an example of the present invention in which the press-formed article 100 was manufactured by the method for manufacturing a press-formed article in the embodiment while changing a size of R3 of the vertical ridge line 108 and a comparative example in which the first wall portion 110 and the second wall portion 120 were simultaneously formed through drawing below. A size of R3 was 5, 10, 15, or 20 mm. FIGS. 44 to 47 show the analysis results. In addition, the smaller the thickness, the darker the result. In the analysis result of FIG. 44, R3 was set to 5 mm. In the analysis result of FIG. 45, R3 was set to 10 mm. In the analysis result of FIG. 46, R3 was set to 15 mm. In the analysis result of FIG. 47, R3 was set to 20 mm. As shown in FIGS. 44 to 47, in the example of the present invention, processing was possible so that the thickness with respect to the blank 1 was 85% or more regardless of the conditions of a radius of curvature R3. On the other hand, since drawing was performed in the comparative example, the thickness with respect to the blank 1 was less than 85% at any site regardless of the conditions of R3. The portions in which the thickness was significantly reduced were the corner portion in which the first ridge line 106, the second ridge line 107, and the vertical ridge line 108 were connected and the portion of the second wall portion 120 close to the vertical ridge line 108. In the example of the present invention, as described above, since the processing was performed at the site through shear deformation, a decrease in the member thickness was minimized. On the other hand, in the comparative example, it is conceivable that tension deformation was dominant in this part as well, and as a result, the member thickness was reduced due to the compression deformation caused in the direction orthogonal to the direction of tension deformation, that is, in the thickness direction.

Although the embodiments and the examples of the present invention have been described in detail with reference to the drawings, the specific constitution is not limited to this embodiment and includes design changes and the like without departing from the gist of the present invention.

INDUSTRIAL APPLICABILITY

In the present invention, the corner at which the three ridge lines which include the two ridge lines connecting the bottom sheet and each of the two vertical walls and the ridge line connecting the vertical walls intersect is press-formed while minimizing a decrease in member thickness. Thus, the present invention is industrially useful.

BRIEF DESCRIPTION OF THE REFERENCE SYMBOLS

1 Blank (workpiece)
1a First edge portion
1b Second edge portion
10A, 10B First rising portion
20A, 20b First strip portion
30A Base sheet portion
40A Second rising portion
50A Second strip portion
100 Press-formed article
101 Bottom sheet portion
106 First ridge line
107 Second ridge line
108 Vertical ridge line
110 First wall portion
120 Second wall portion
130 First flange
140 Second flange
310 First upper die
320 First lower die
330 Second upper die
340 Second lower die
310A, 320A End die
310B, 320B Center die
410 Third upper die
420 Third lower die
430 Fourth upper die
440 Fourth lower die
600, 700 Press-forming apparatus
630, 730 Drive portion
M1 gap
S1 First step
S2 Second step
S3 Third step
S4 Fourth step
S5 Fifth step

The invention claimed is:

1. A method for manufacturing a press-formed article, comprising:
a first step of forming, from a sheet-shaped workpiece having one or more of first edge portion and one or more of second edge portion extending in a direction intersecting the first edge portion and is connected to the first edge portion, a base sheet portion, one or more of first rising portion rising from the base sheet portion on a side of the first edge portion via a first ridge line and extending to the second edge portion, and a first strip portion extending on a side opposite to the base sheet portion via a second ridge line extending to the second edge portion along an upper edge portion of the first rising portion;
a second step of forming one or more of second rising portion which rises between a first lower die and a second upper die as a whole on the same side as the first rising portion and connected to the first rising portion via a vertical ridge line by causing a strip-shaped first zone including the base sheet portion, the first rising portion, and the second edge portion of the first strip portion to be disposed between a first upper die and the first lower die from both sides along the second edge portion, causing a second zone adjacent to the first zone and including the base sheet portion, the first rising portion, and the first strip portion to be disposed between the second upper die and a second lower die from both sides, and moving the first upper die and the first lower die relative to the second upper die and the second lower die toward a side at which the first rising portion rises with respect to the base sheet portion,
wherein, in the second step, a portion of the second rising portion connected to the vertical ridge line is shear-deformed; and
a third step of increasing a rising height of the first rising portion by causing the first strip portion side of the workpiece which has been subjected to the second step to be disposed between a third upper die and a third lower die using the first ridge line as a boundary, causing the base sheet portion side to be disposed between a fourth upper die and a fourth lower die, and moving the third upper die and the third lower die relative to the fourth upper die and the fourth lower die,
wherein, in the third step, shear deformation is caused in a zone of the second rising portion adjacent to the first strip portion and adjacent to a zone in which the shear deformation has been caused in the second step in a direction along the second edge portion.

2. The method for manufacturing the press-formed article according to claim 1, wherein, after the third step is performed, the second step is further performed and the second step and the third step are alternately performed at least once each.

3. The method for manufacturing the press-formed article according to claim 1, wherein the workpiece comprises two of the first edge portion so that the two of the first edge portion face each other and two of the second edge portion so that the two of the second edge portion face each other, and
- a box body whose one side is open so that two of the first rising portion and two of second rising portions surround the base sheet portion is formed by subjecting each of the two of the first edge portion to the first step, subjecting each of the two of the second edge portion to the second step, and subjecting each of the two of the first edge portion to the third step.

4. The method for manufacturing the press-formed article according to claim 1, comprising:
- a fourth step of cutting out the second rising portion along the second edge portion at a height position between a second strip portion disposed between the first upper die and the first lower die and the first strip portion after the step of the second step and the third step which is performed last; and
- a fifth step of bending a portion of the second rising portion rising above the first strip portion so that a surface continuous with the first strip portion is obtained after the fourth step is performed.

5. The method for manufacturing the press-formed article according to claim 1, wherein, in the second step, each of the first upper die and the first lower die is composed of one or more of end die having at least the first strip portion and the first rising portion of the workpiece disposed therebetween and a center die disposed at an interval with respect to the end die and having the base sheet portion side of the workpiece disposed therein with respect to the first rising portion, and the end dies of the first upper die and the first lower die are moved to become closer to the center die as the first upper die and the first lower die are moved relative to the second upper die and the second lower die.

6. The method for manufacturing the press-formed article according to claim 5, wherein a gap between the end die and the center die is formed to have a portion along the second edge portion in the middle of a direction along the first edge portion.

7. The method for manufacturing the press-formed article according to claim 1, wherein an inner portion of the vertical ridge line is formed in a concave curved shape having a radius of curvature of 20 mm or less when viewed in a top view.

8. The method for manufacturing the press-formed article according to claim 1, wherein, in the second step, surface pressure of causing the workpiece to be disposed between the first upper die and the first lower die and surface pressure for causing the workpiece to be disposed between the second upper die and the second lower die are obtained on the basis of Expression (1):

$$P = Y/590 \times t/1.4 \times P0 \quad (1)$$

where, P: surface pressure (MPa) for causing workpiece to be disposed therebetween
Y: tensile strength (MPa) of workpiece
t: thickness (mm) of workpiece
P0: reference surface pressure=0.1 MPa.

9. The method for manufacturing the press-formed article according to claim 1, wherein a tensile strength of a steel material forming the workpiece is 440 MPa or more.

10. The method for manufacturing the press-formed article according to claim 1, wherein the portion of the second rising portion in which shear deformation is caused is formed to have a thickness of 85% or more of a thickness of the workpiece which has not been subjected to the first step.

11. The method for manufacturing the press-formed article according to claim 1, wherein only the second rising portion is shear-deformed.

12. A press-forming apparatus, comprising:
- a first lower die including a first bottom surface, a first wall surface rising from the first bottom surface, and a first flange surface extending from an upper edge of the first wall surface toward a side opposite to the first bottom surface;
- a first upper die formed in a shape corresponding to the first lower die and having a workpiece disposed between the first upper die and the first lower die;
- a second lower die comprising a second bottom surface, a second wall surface rising from the second bottom surface, and a second flange surface extending from an upper edge of the second wall surface toward a side opposite to the second bottom surface and disposed adjacent to the first lower die;
- a second upper die formed in a shape corresponding to the second lower die and having the workpiece disposed between the second upper die and the second lower die; and
- a drive portion configured to move the second upper die and the second lower die relative to the first upper die and the first lower die from the first upper die side toward the first lower die side in a state in which an interval between the first upper die and the second upper die and an interval between the first lower die and the second lower die are maintained,
- wherein the first lower die comprises a lower end die comprising at least the first wall surface and the first flange surface and a lower center die having an interval with respect to the lower end die and holding a portion of the workpiece opposite to the first flange surface with respect to the first wall surface,
- the first upper die includes an upper end die corresponding to the lower end die of the first lower die and an upper center die corresponding to the lower center die of the first lower die, and
- the drive portion moves the lower end die and the upper end die to become closer to the lower center die and the upper center die with respect to the first lower die and the first upper die, respectively, as the second upper die and the second lower die are moved relative to the first upper die and the first lower die.

13. The press-forming apparatus according to claim 12, further comprising:
- a third lower die including a third bottom surface, a third wall surface rising from the third bottom surface, and a third flange surface extending from an upper edge of the third wall surface toward a side opposite to the third bottom surface;
- a third upper die formed in a shape corresponding to the third lower die and having a workpiece between the third upper die and the third lower die;
- a fourth lower die including a fourth bottom surface, a fourth wall surface rising from the fourth bottom surface, and a fourth flange surface extending from an upper edge of the fourth wall surface toward a side opposite to the fourth bottom surface and disposed adjacent to the third lower die; and a fourth upper die formed in a shape corresponding to the fourth lower die and having a workpiece between the fourth upper die and the fourth lower die, wherein a set of the first lower die, the first upper die, the second lower die, and the second upper die is capable of being replaced with a set of the third lower die, the third upper die, the fourth lower die, and the fourth upper die, and the drive portion moves the fourth upper die and the fourth lower die relative to the third upper die and the third lower die.

* * * * *